(12) United States Patent  
Pierson et al.

(10) Patent No.: US 7,802,959 B2  
(45) Date of Patent: Sep. 28, 2010

(54) COMPACT PALLETIZER

(75) Inventors: Cary Michael Pierson, Milwaukie, OR (US); Stephen L. Heston, West Linn, OR (US)

(73) Assignee: TopTier Inc., Portland, OR (US)

( * ) Notice: Subject to any disclaimer, the term of this patent is extended or adjusted under 35 U.S.C. 154(b) by 0 days.

(21) Appl. No.: 11/497,084

(22) Filed: Jul. 31, 2006

(65) Prior Publication Data

US 2008/0025832 A1    Jan. 31, 2008

(51) Int. Cl.
B65G 57/00 (2006.01)
B65G 57/22 (2006.01)
B65G 1/18 (2006.01)

(52) U.S. Cl. .................. 414/789.5; 414/792.6; 414/927; 414/924; 414/792.8; 414/799

(58) Field of Classification Search .................. 198/430; 271/189; 414/792.1, 790.3, 791.4, 791.6, 414/792, 792.6, 789.5, 789.8, 792.8, 793.4, 414/798.9, 799, 927, 928, 929; 53/157
See application file for complete search history.

(56) References Cited

U.S. PATENT DOCUMENTS

| | | | | |
|---|---|---|---|---|
| 2,767,863 A | * | 10/1956 | Botley | 414/788.8 |
| 2,780,340 A | * | 2/1957 | Hynson | 198/374 |
| 2,813,638 A | * | 11/1957 | Miller, Jr. | 414/790.3 |
| 2,875,907 A | * | 3/1959 | Locke et al. | 414/789.9 |
| 2,977,002 A | * | 3/1961 | Rudolf | 414/790.3 |
| 3,164,080 A | * | 1/1965 | Miller, Jr. | 100/35 |
| 3,200,969 A | * | 8/1965 | Madden | 414/791.7 |
| 3,682,338 A | * | 8/1972 | Von Gai et al. | 414/796.2 |
| 3,833,132 A | * | 9/1974 | Alduk | 414/793.8 |
| 4,067,456 A | * | 1/1978 | Schmitt | 414/792 |
| 4,255,074 A | * | 3/1981 | Meratti et al. | 414/792 |
| 4,439,097 A | * | 3/1984 | Mebus | 414/789.5 |
| 5,096,369 A | * | 3/1992 | Ouellette | 414/788.7 |
| 5,435,690 A | * | 7/1995 | Binning | 414/791.6 |
| 5,462,400 A | * | 10/1995 | Bonnet | 414/796.5 |
| 2003/0026682 A1 | * | 2/2003 | Heston et al. | 414/791.6 |
| 2005/0063815 A1 | * | 3/2005 | Pierson et al. | 414/799 |
| 2007/0071589 A1 | * | 3/2007 | Yagi | 414/799 |

FOREIGN PATENT DOCUMENTS

FR    2573401 A    *  5/1986
JP    60244712 A   * 12/1985

* cited by examiner

Primary Examiner—Gregory W Adams  
(74) Attorney, Agent, or Firm—Peter A. Haas, Esquire LLC

(57) ABSTRACT

A compact palletizer combines a plate apron and an apron conveyor as a layer build area positionable both vertically and horizontally to implement receipt and organization of items as layers and to stack item layers on a pallet. A puller bar serves to pull item rows into layers in a layer building operation and to act as a backstop in delivering an item layer onto a stack of items. An apron serves to also deliver empty pallets to a stack build area.

15 Claims, 50 Drawing Sheets

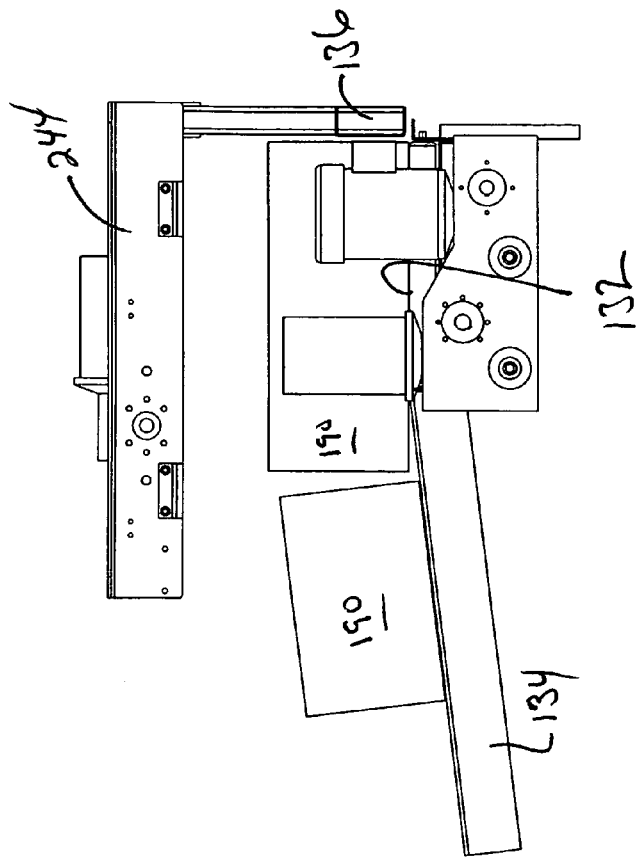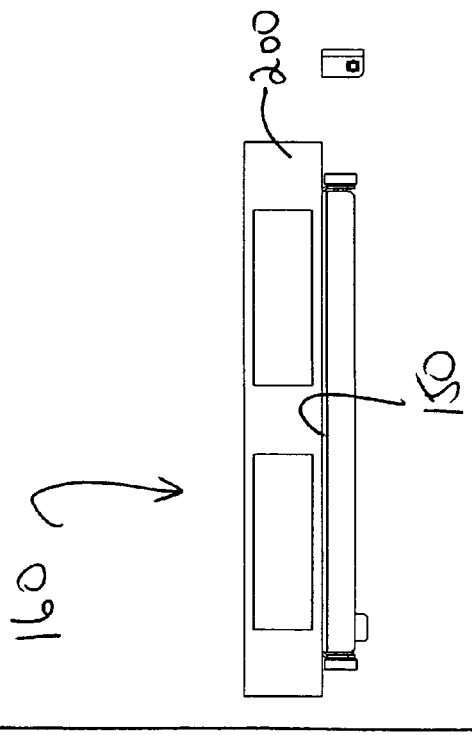
Fig. 21

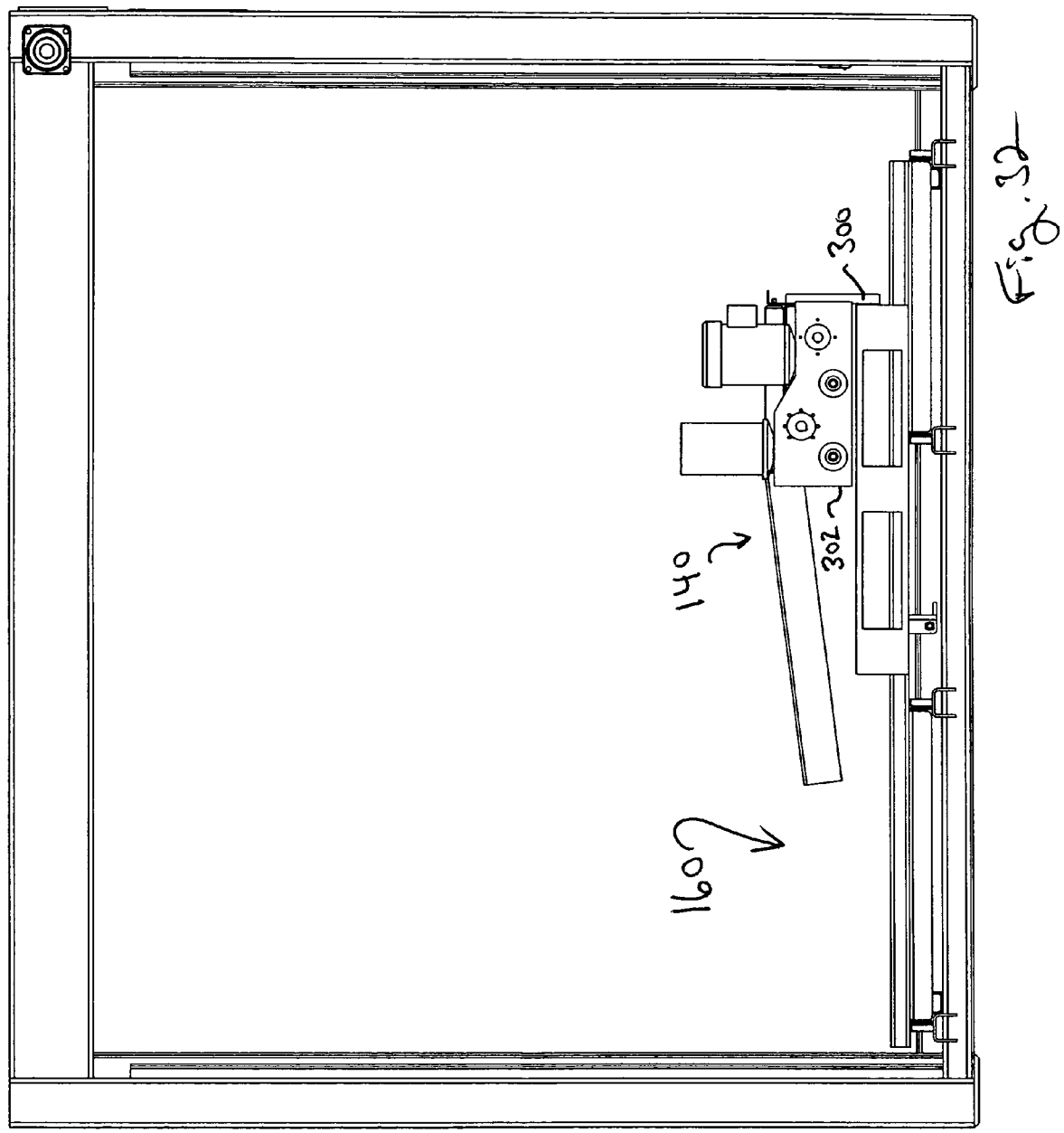

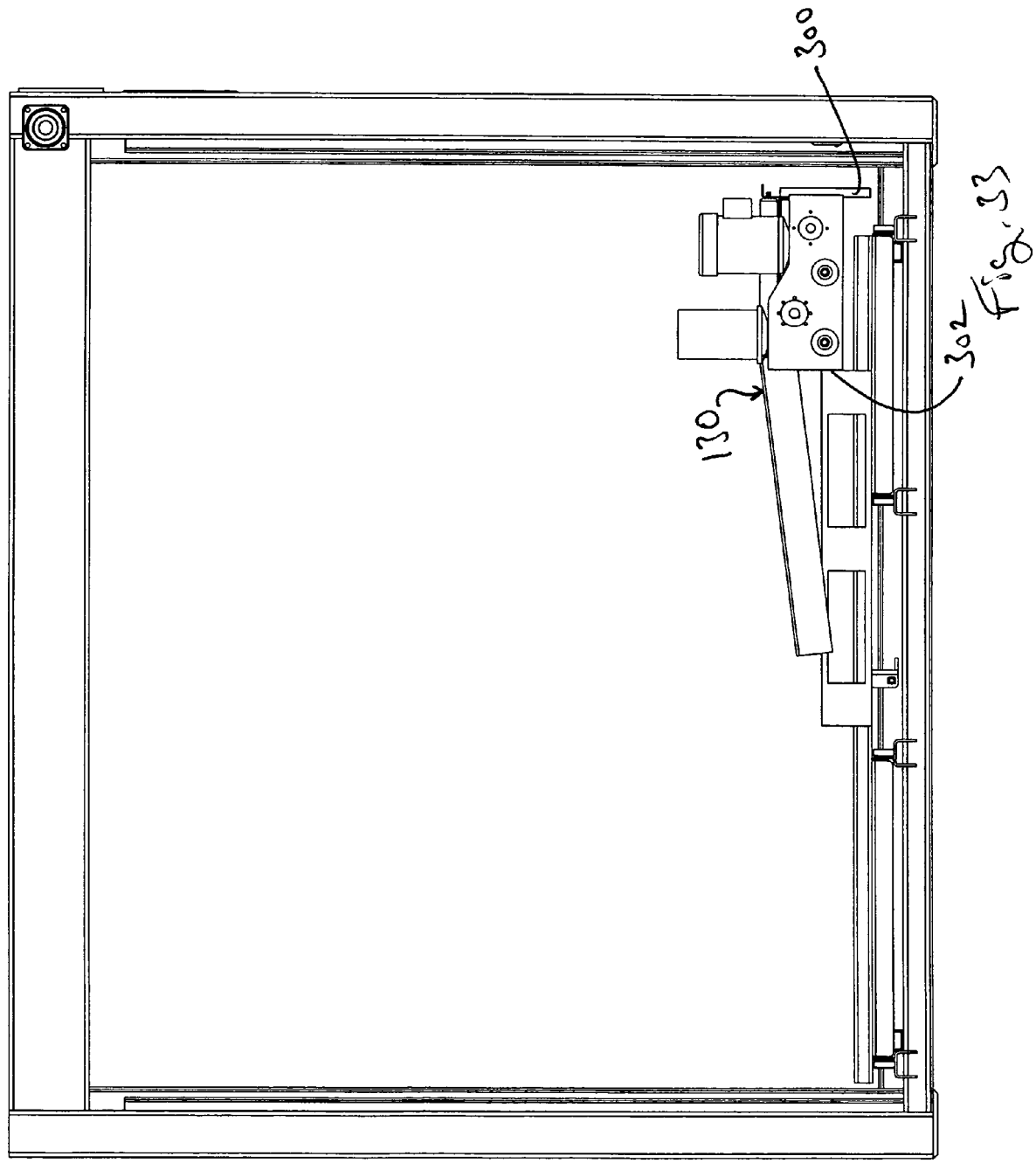

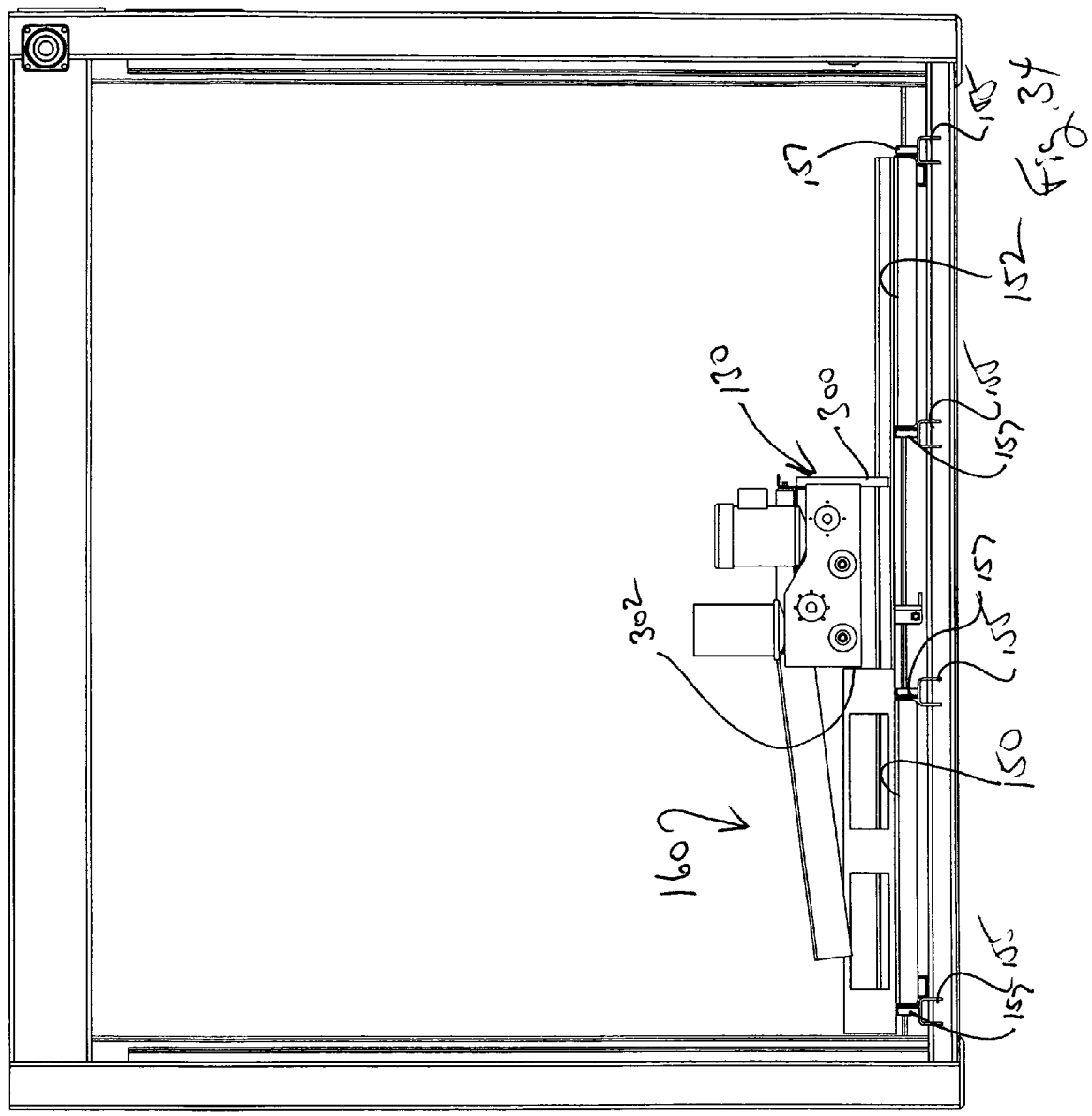

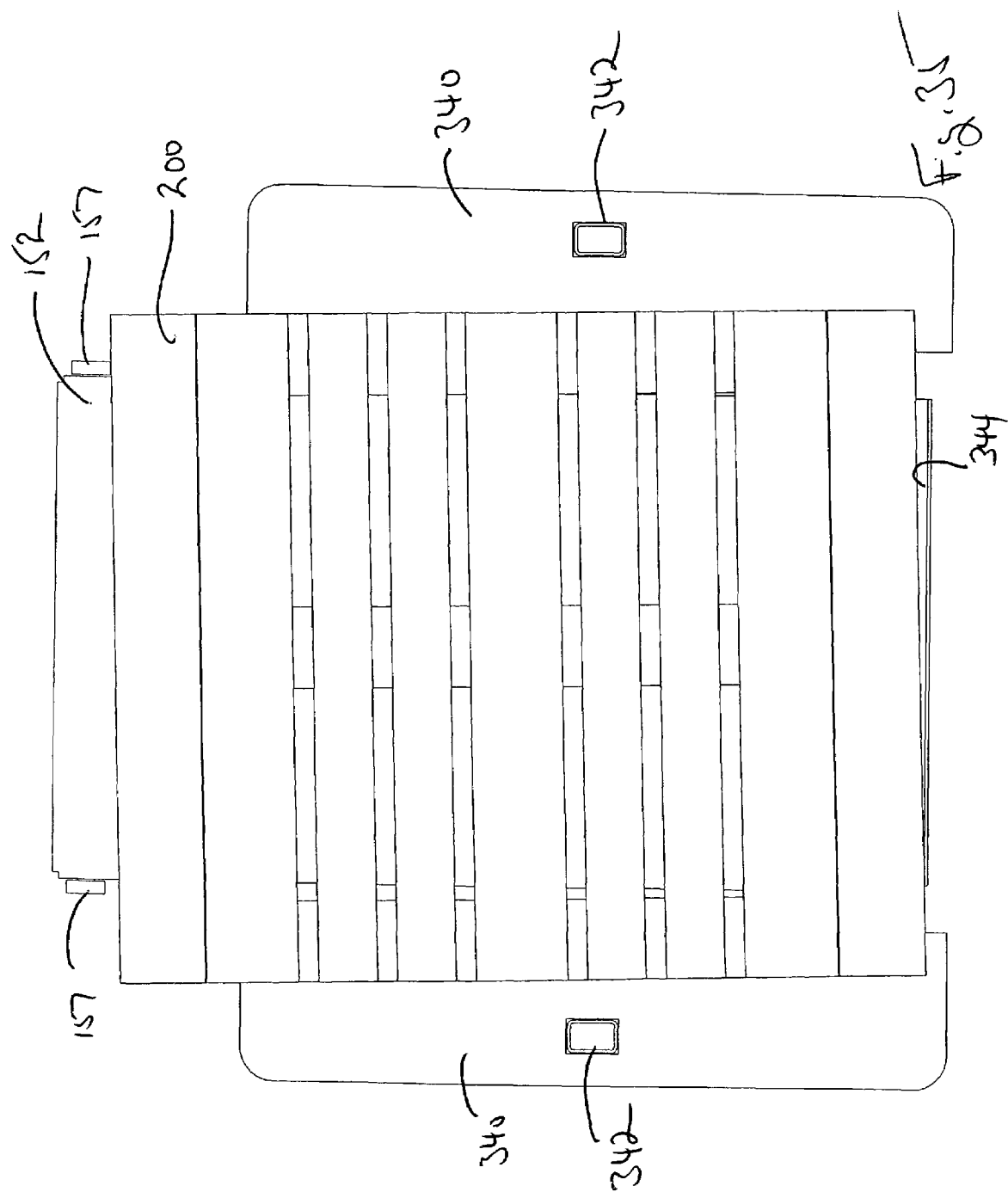

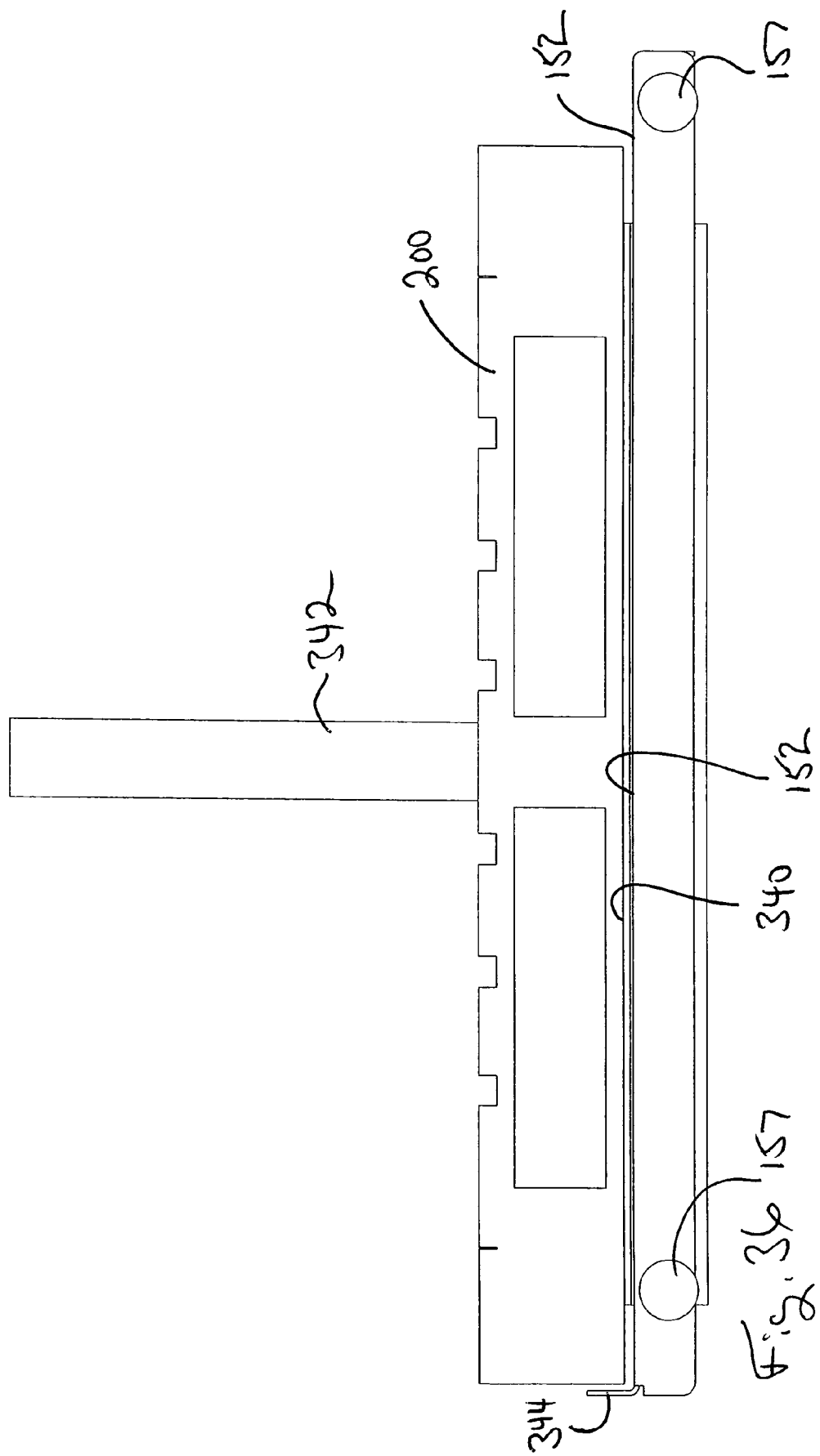

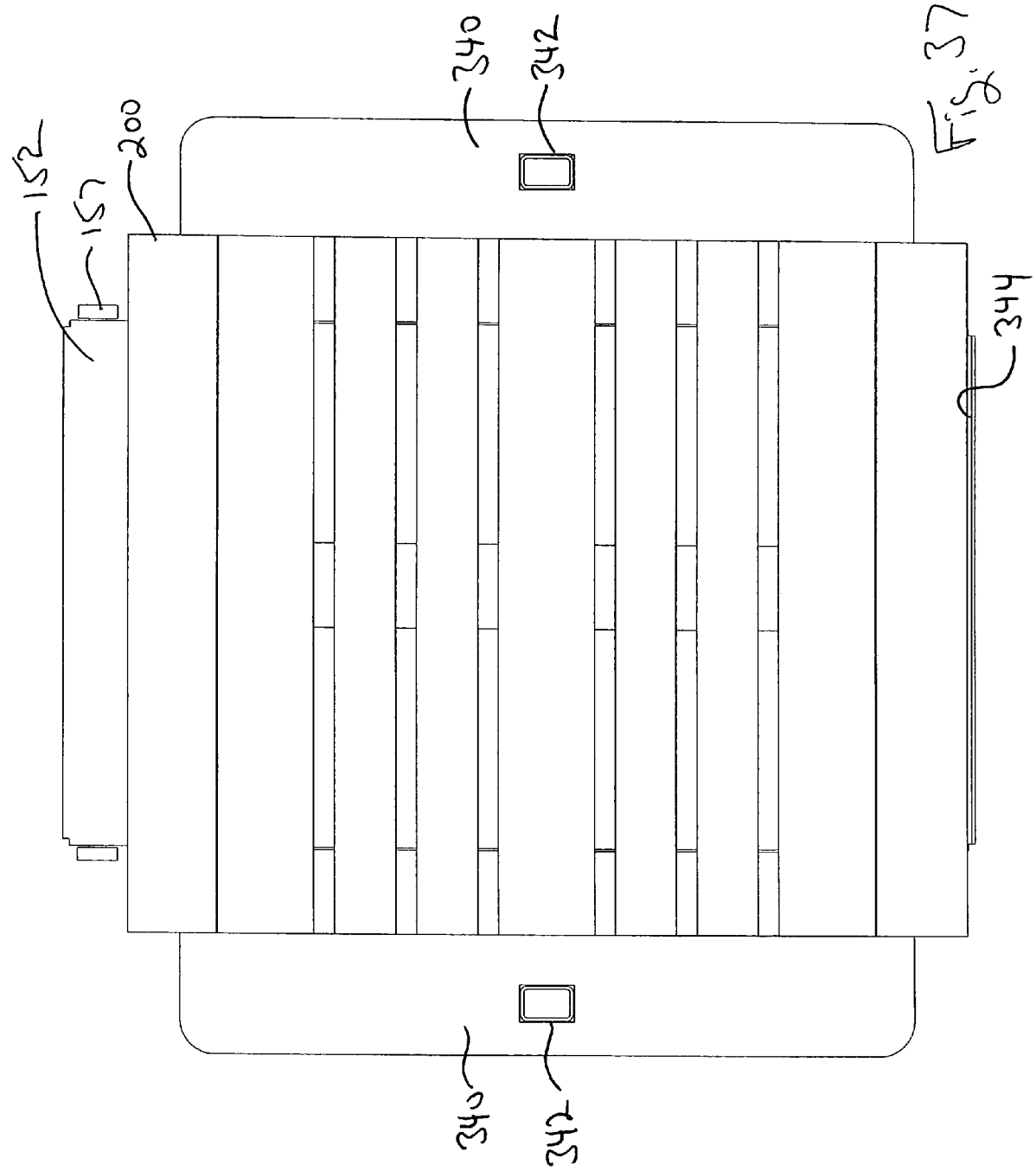

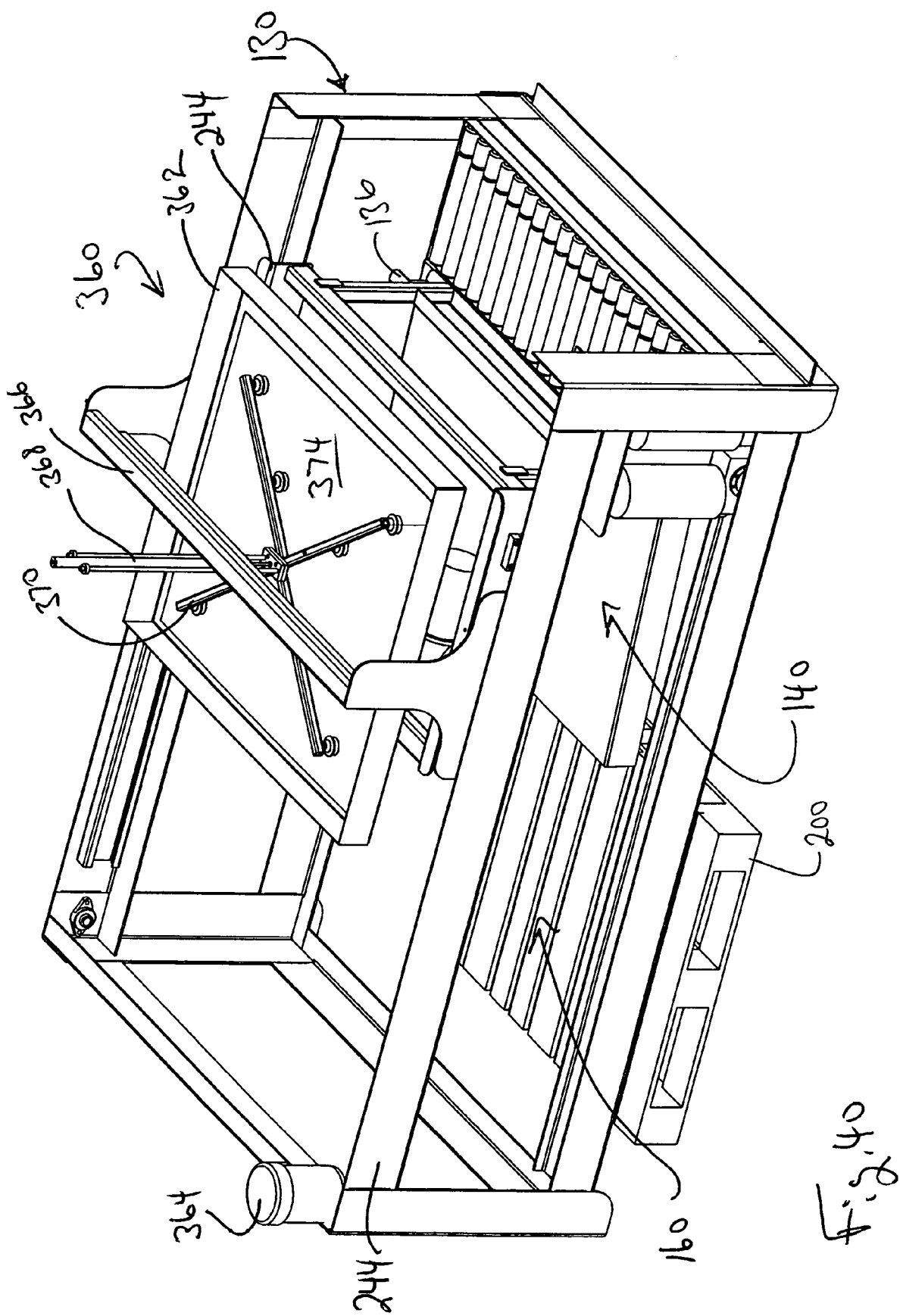

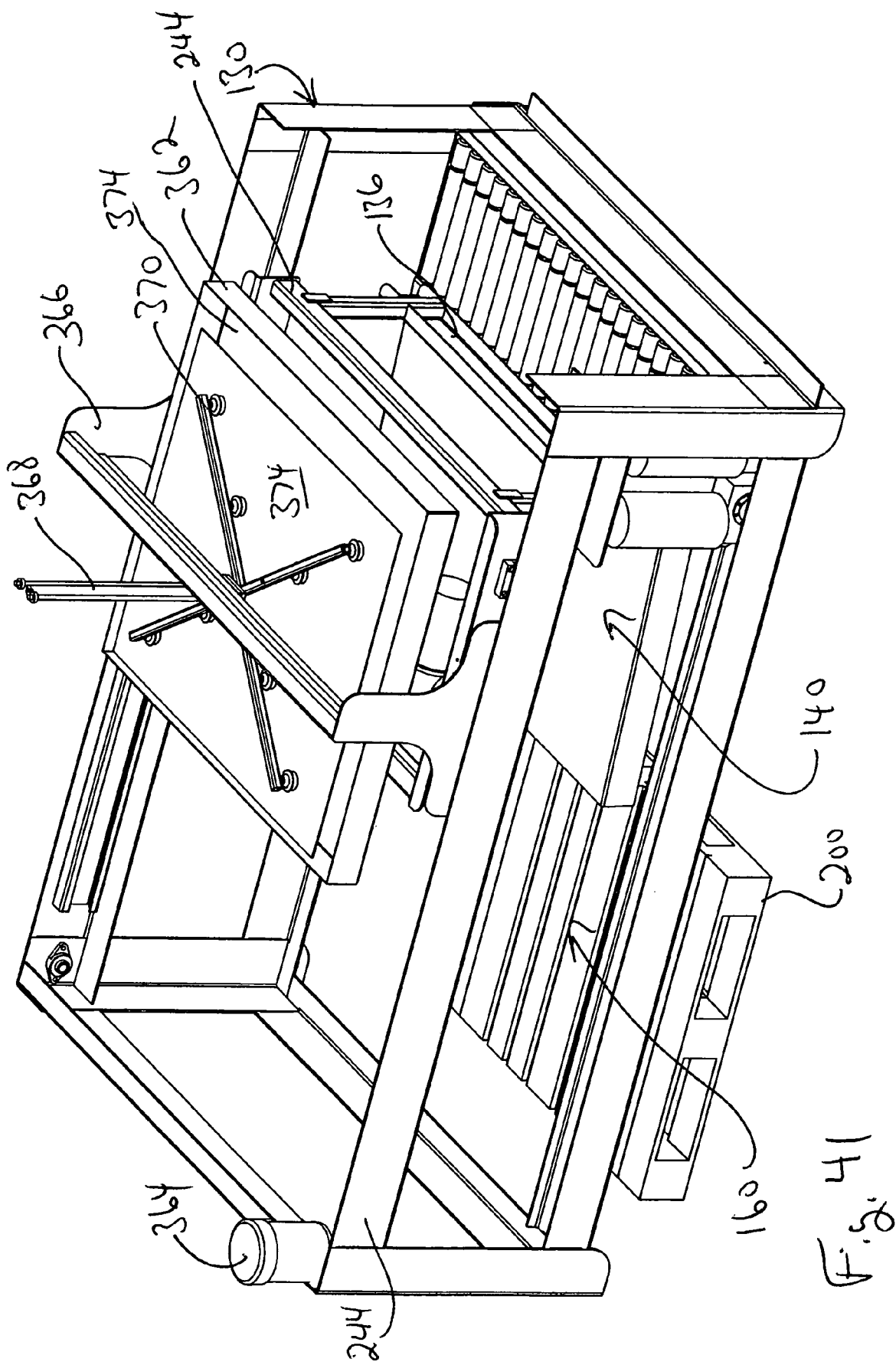

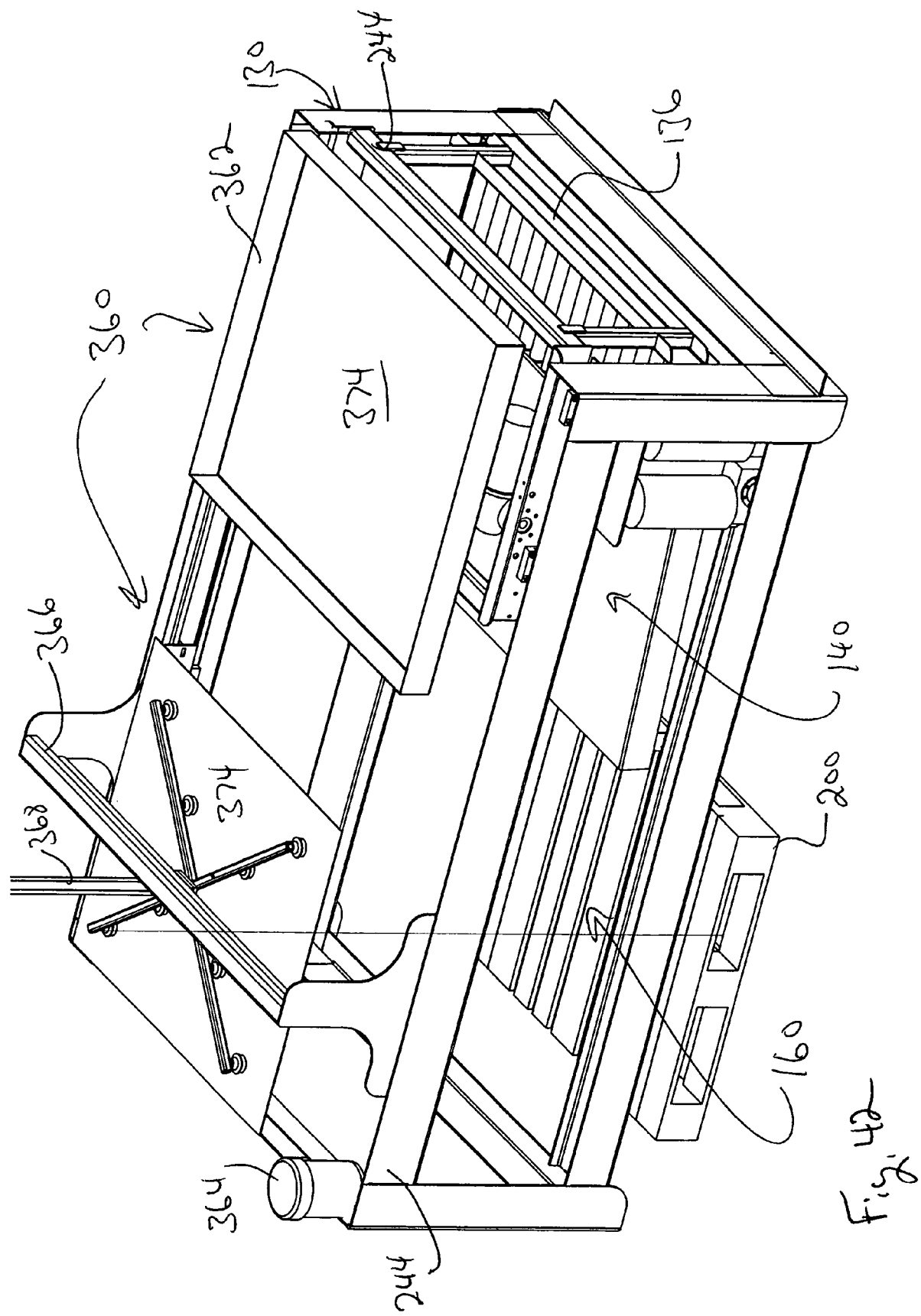

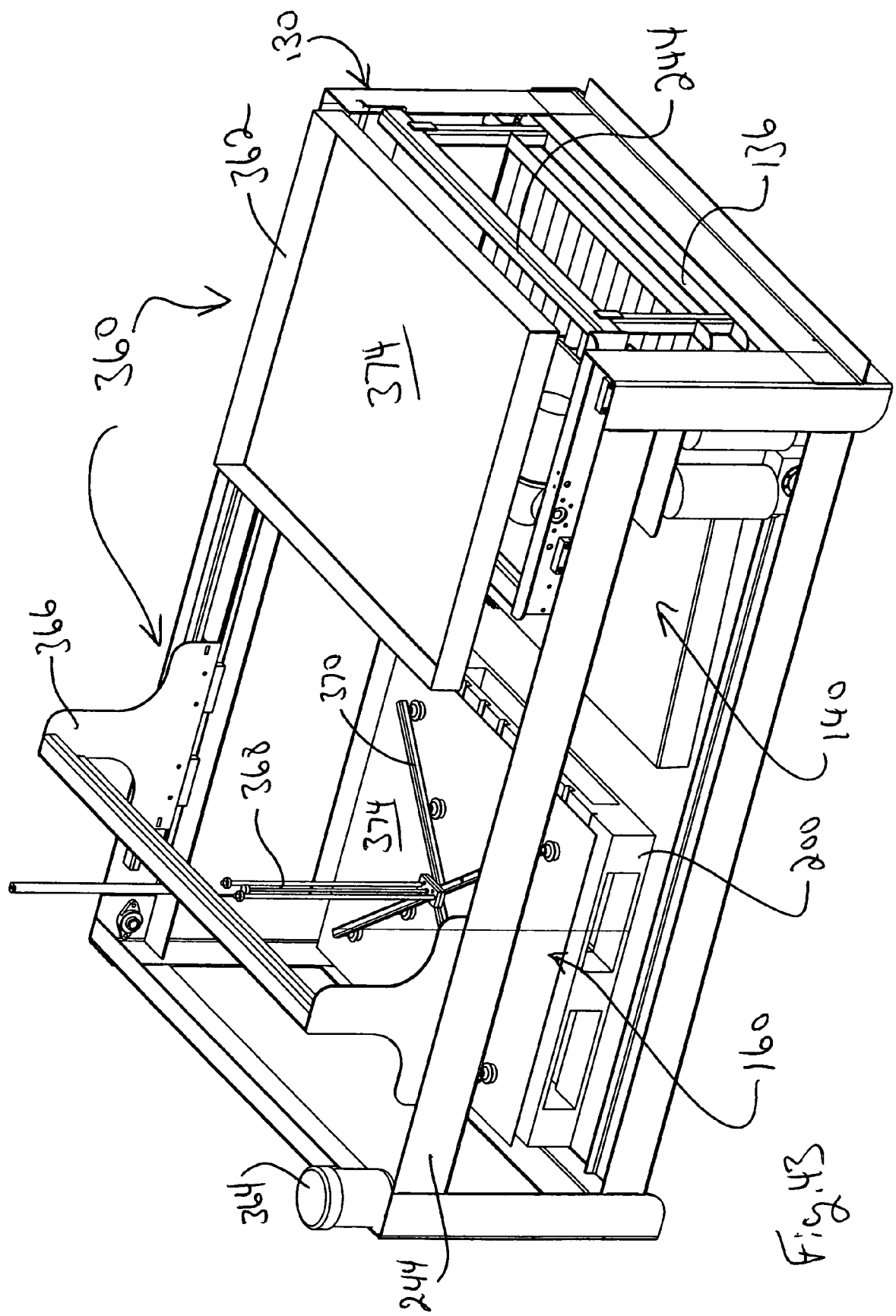

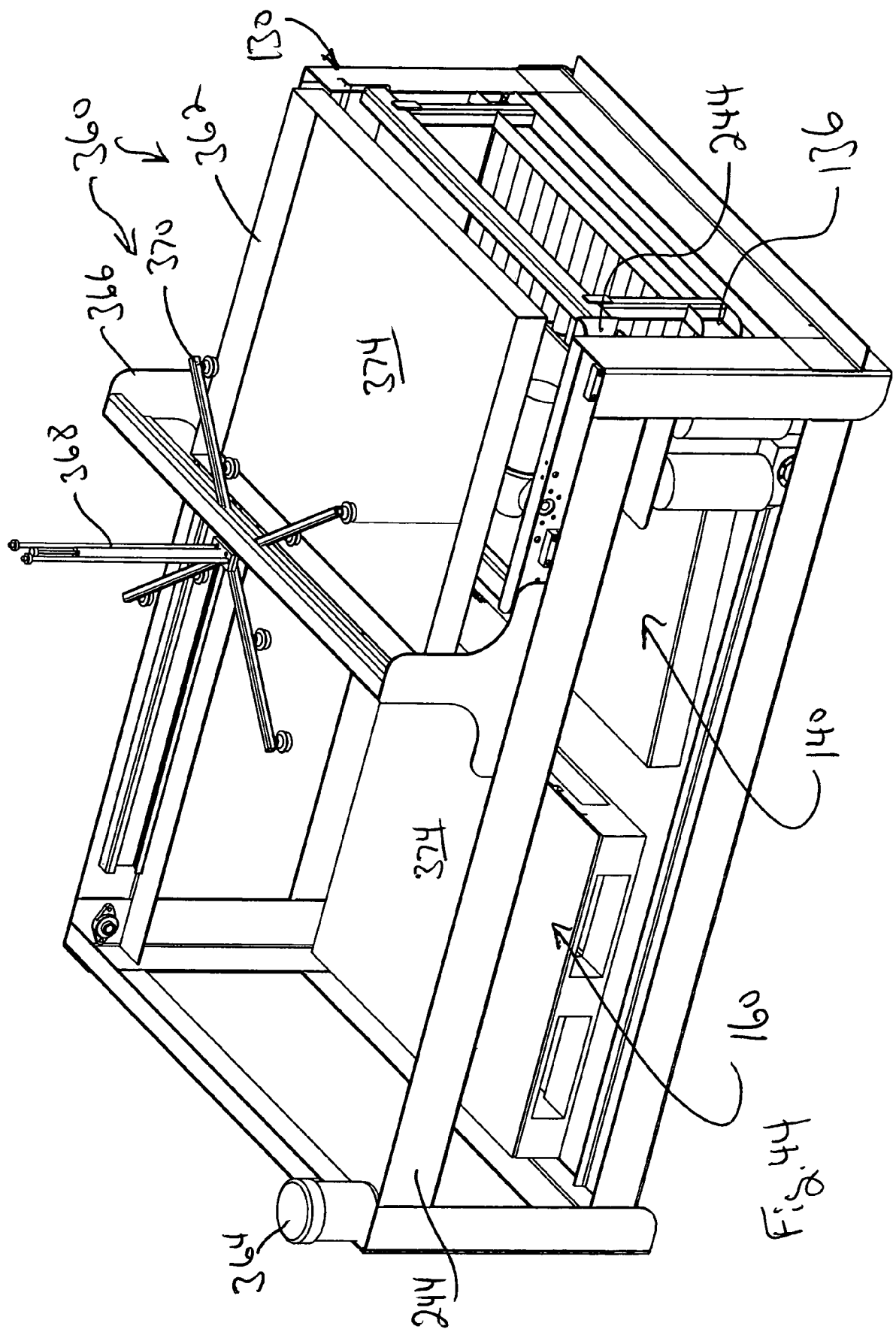

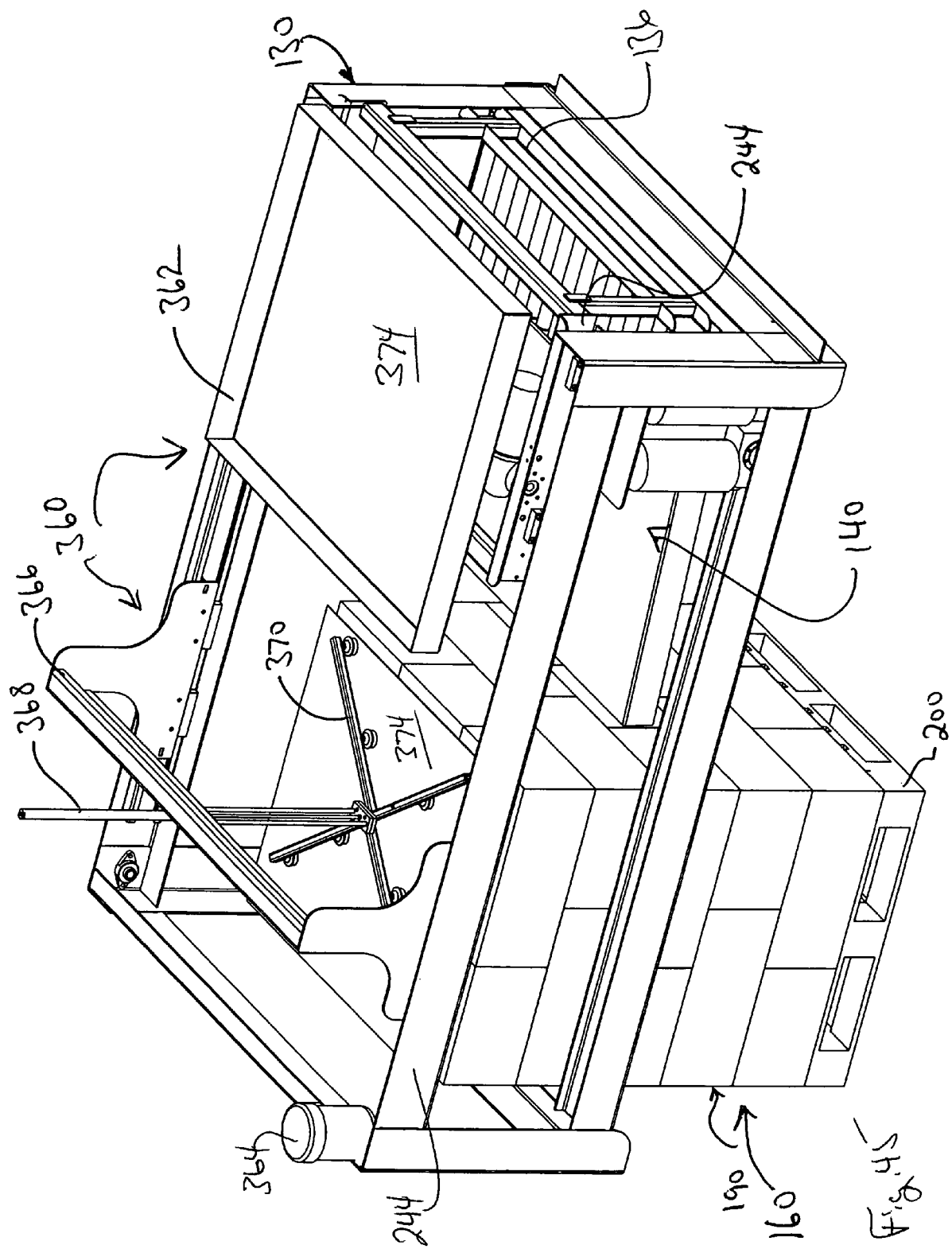

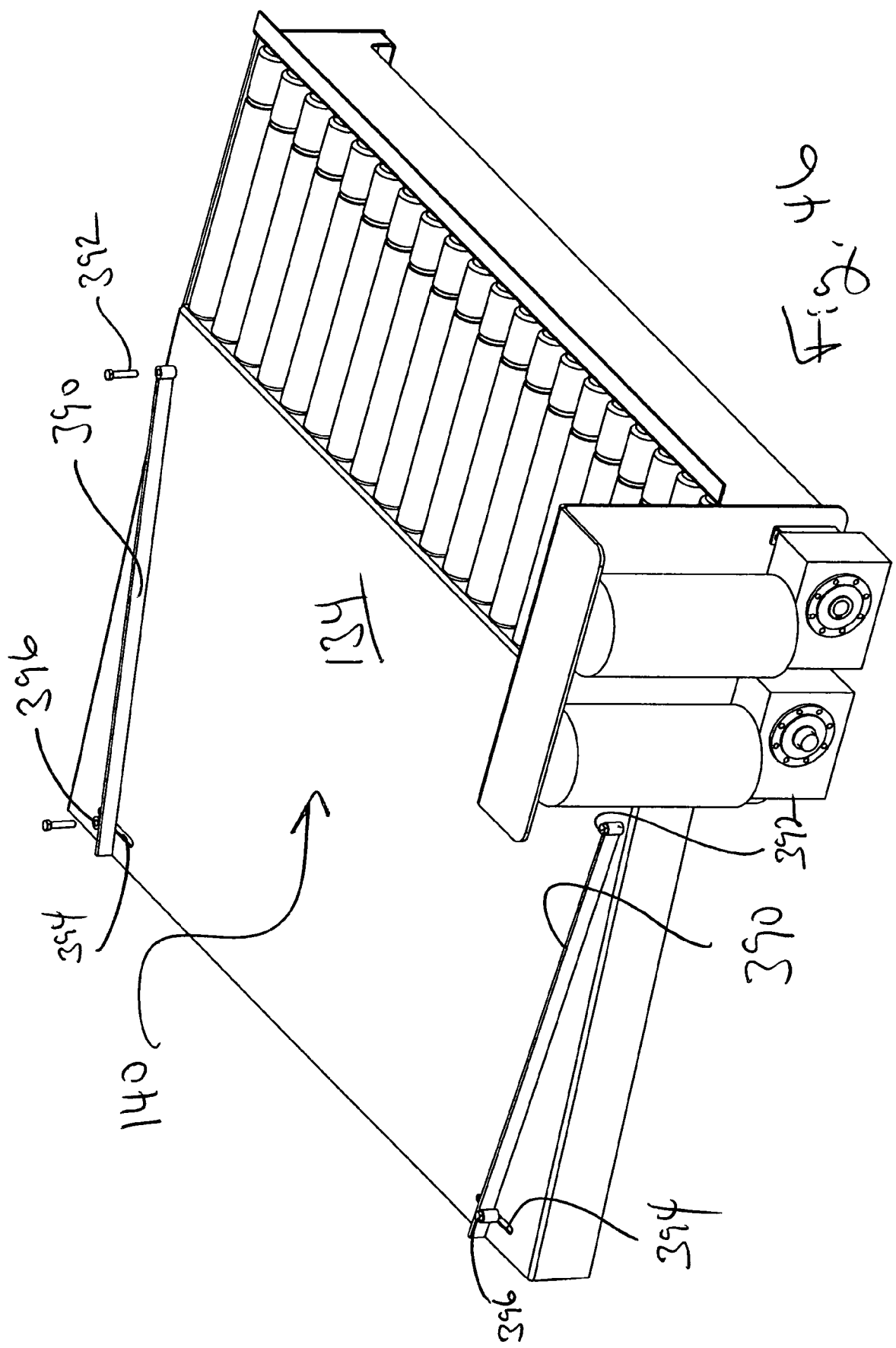

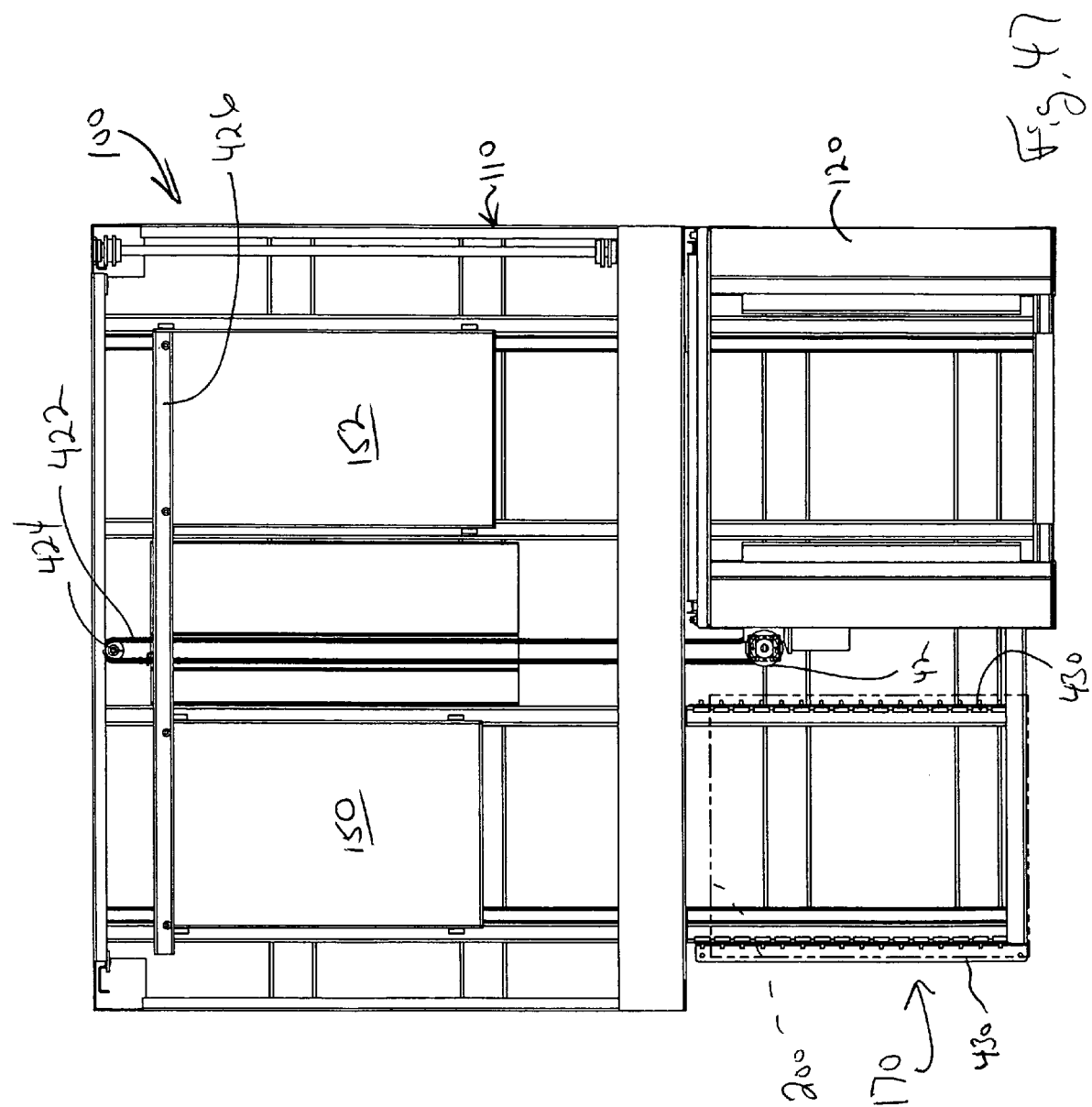

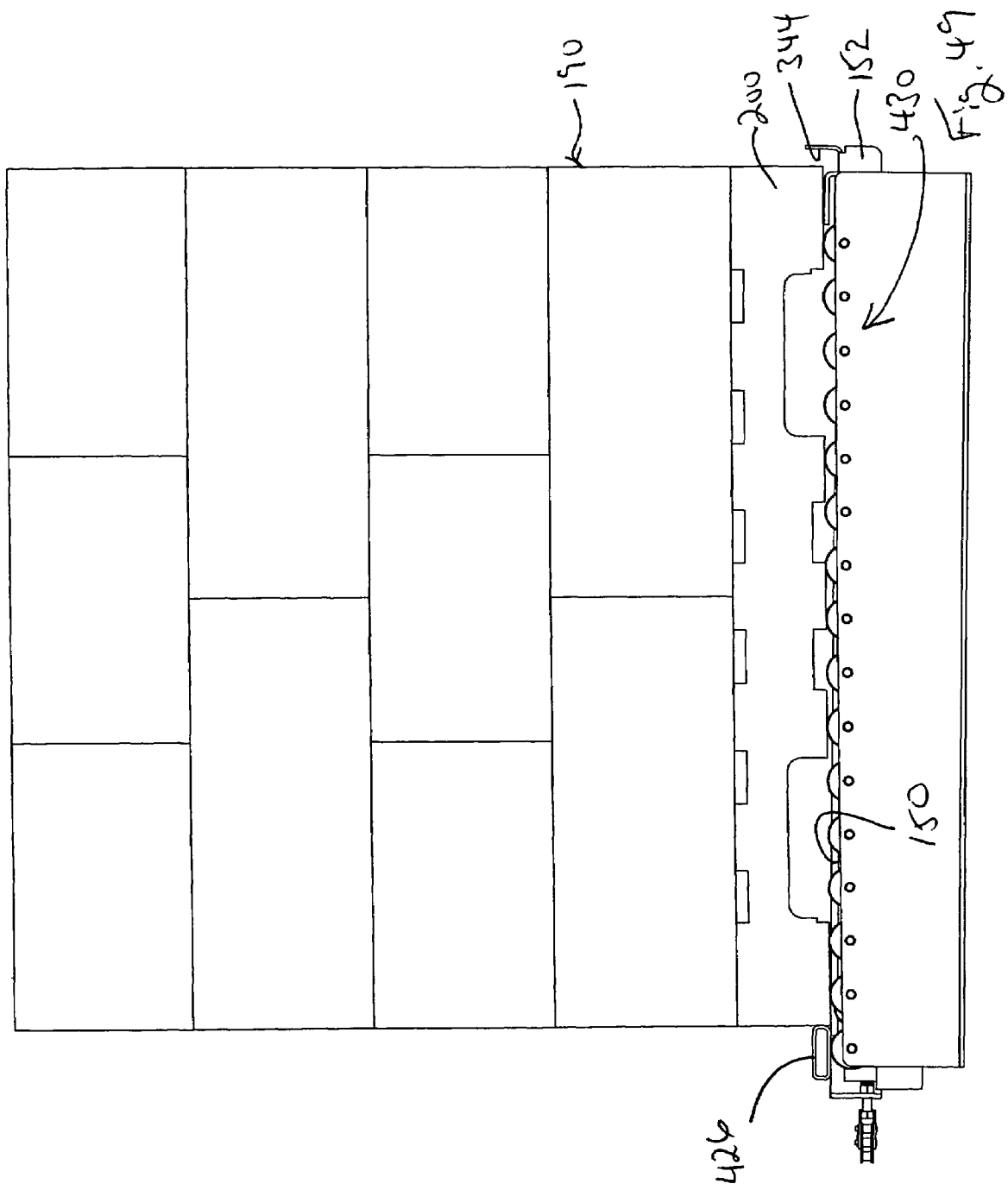

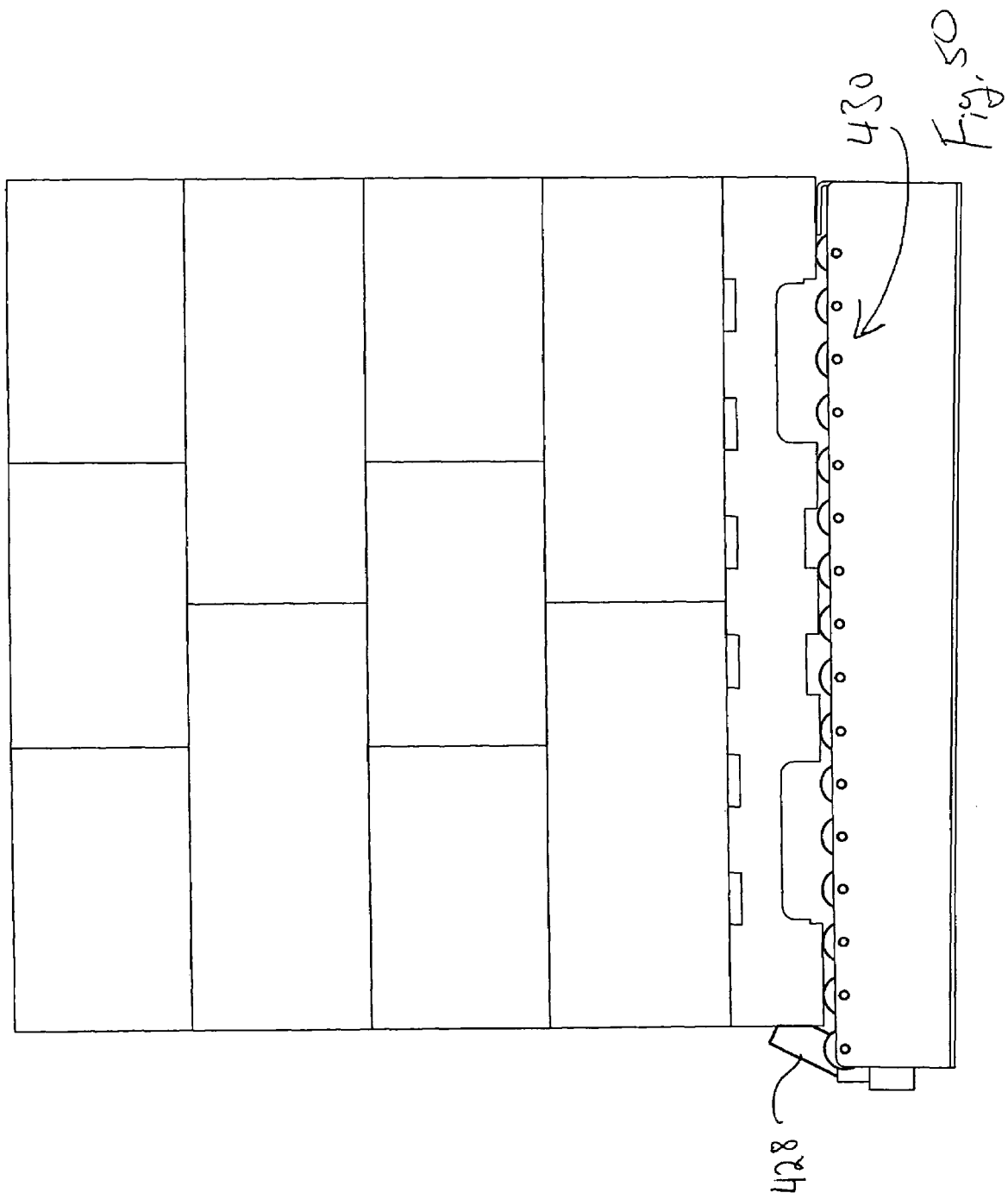

COMPACT PALLETIZER

BACKGROUND OF THE INVENTION

The present invention relates generally to article manipulation devices and particularly to a palletizing device and method of operation.

Palletizers receive a sequence of items and produce a palletized stack of items, e.g., an organized stack of items resting on a pallet. Generally, items are formed into rows, rows formed into layers, and layers stacked upon a pallet to form a palletized stack of items. Thus, a typical palletizer receives a series of items and organizes the items by row, by layer, and ultimately as a palletized stack of items on a pallet.

An important consideration in palletizer design is size. A more compact machine takes less floor space and, if necessary, accommodates more palletizing machines in the same area as would be occupied by relatively larger palletizing machines. Compact size is, therefore, a desirable feature in a palletizer.

Accordingly, it would be desirable to provide a palletizer having reduced overall size relative to conventional palletizing devices. The subject matter of the present invention provides such a palletizer.

SUMMARY OF THE INVENTION

A compact palletizer combines a plate apron and an apron conveyor as a layer build area positionable both vertically and horizontally to implement receipt and organization of items as layers and to stack item layers on a pallet. A puller bar serves to pull item rows into layers in a layer building operation and to act as a backstop in delivering an item layer onto a stack of items. An apron serves to also deliver empty pallets to a stack build area.

BRIEF DESCRIPTION OF THE DRAWINGS

For a better understanding of the invention, and to show how the same may be carried into effect, reference will now be made, by way of example, to the accompanying drawings in which:

FIG. 21 illustrates in front view the apron carriage and pallet of FIG. 20 as taken along lines 21-21 of FIG. 20.

FIGS. 28-34 illustrate empty pallet movement from a pallet dispenser to a stack building area.

FIGS. 35-39 illustrate empty pallet transfer from a pallet dispenser to pallet support platform.

FIGS. 40-45 illustrate a tie sheet dispenser and operation thereof.

FIG. 46 illustrates a layer conditioning structure.

FIGS. 47-50 illustrate a pallet discharge station.

DETAILED DESCRIPTION OF THE PREFERRED EMBODIMENT

Figure 1:
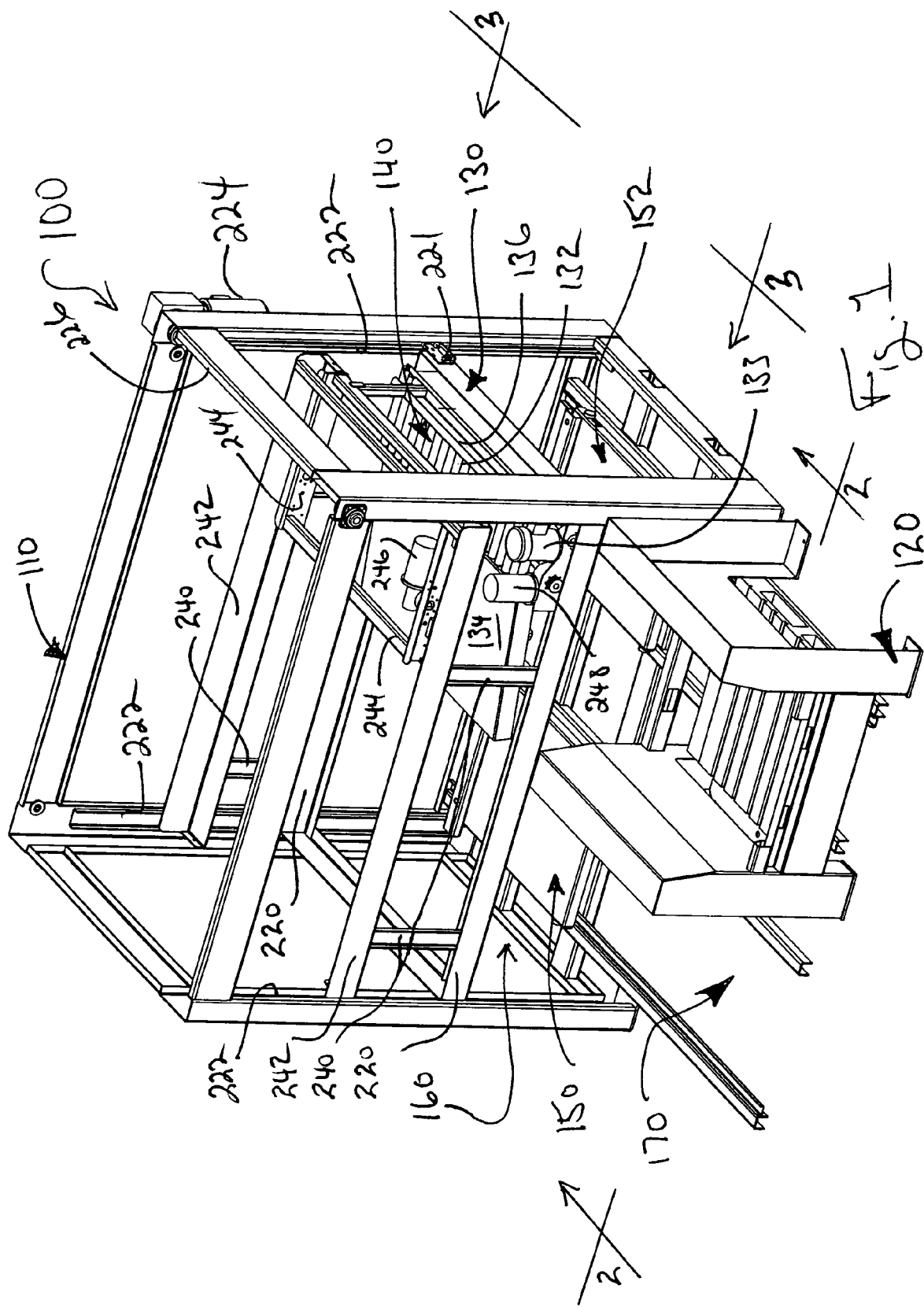
FIG. 1 illustrates in perspective a compact palletizer according to a preferred embodiment of the present invention.
Figure 2:
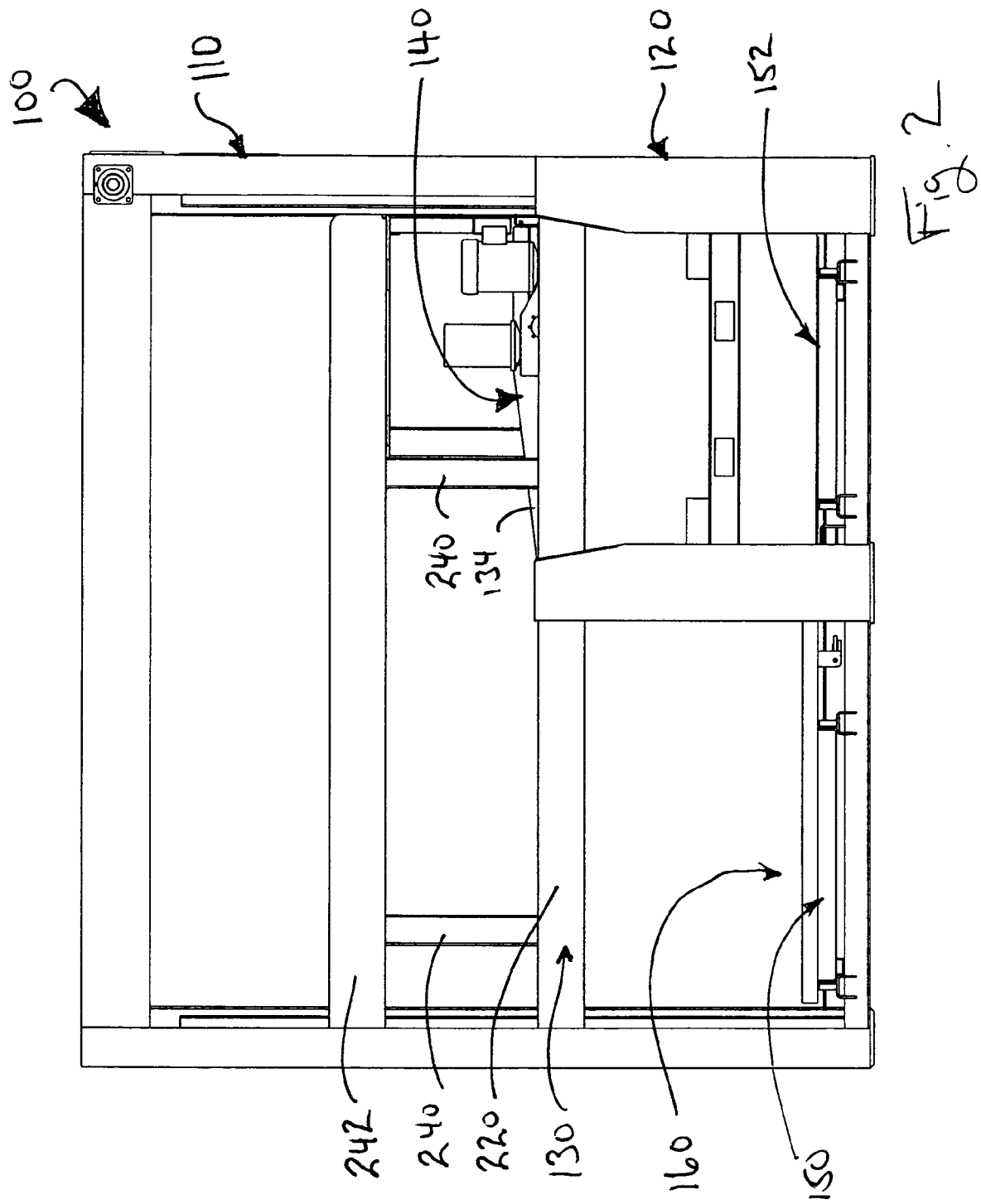
FIG. 2 illustrates a front view of the compact palletizer of FIG. 1 as taken along lines 2-2 of FIG. 1.
Figure 3:
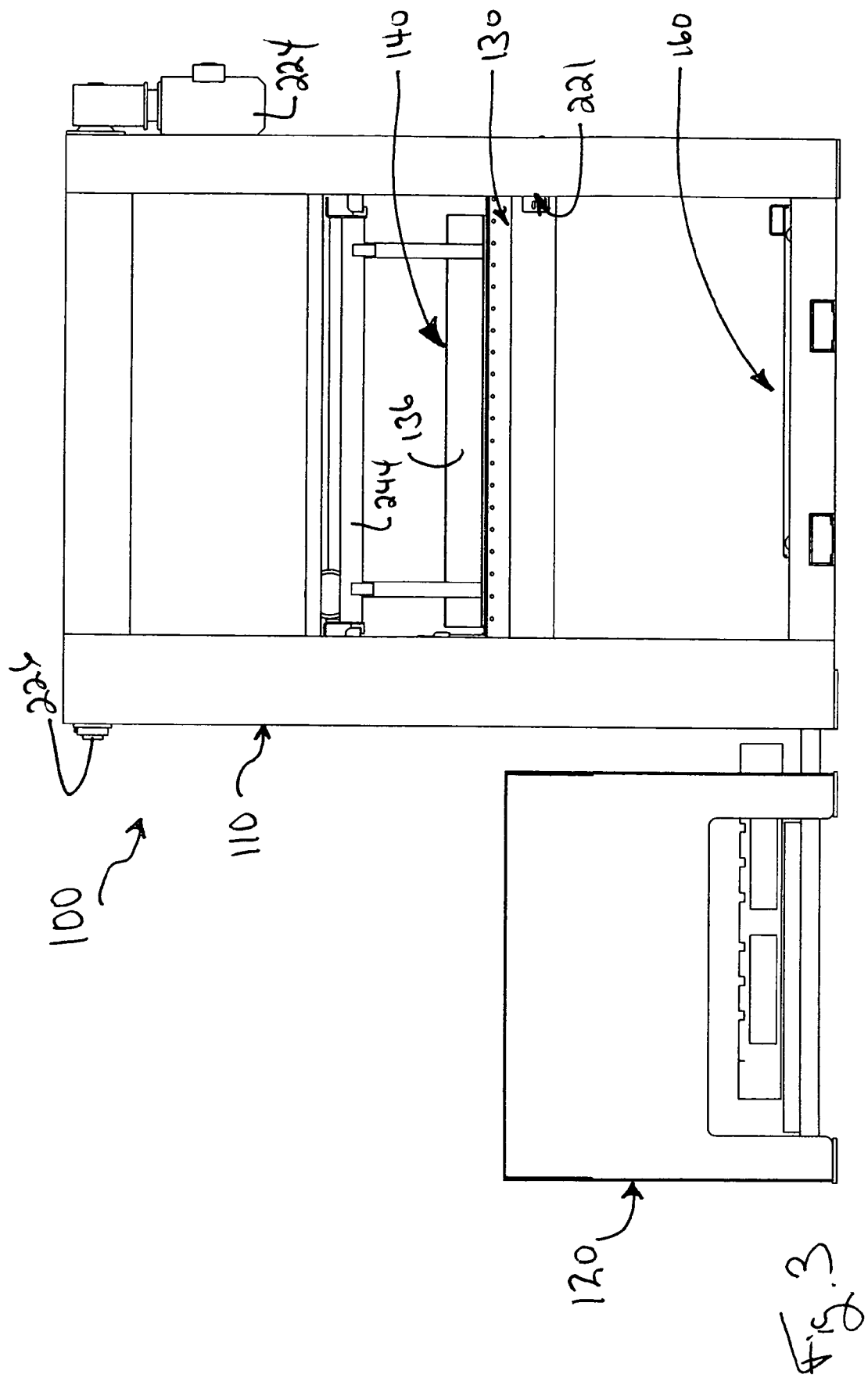
FIG. 3 illustrates a right view of the compact palletizer of FIG. 1 as taken along lines 3-3 of FIG. 1.
Figure 4:
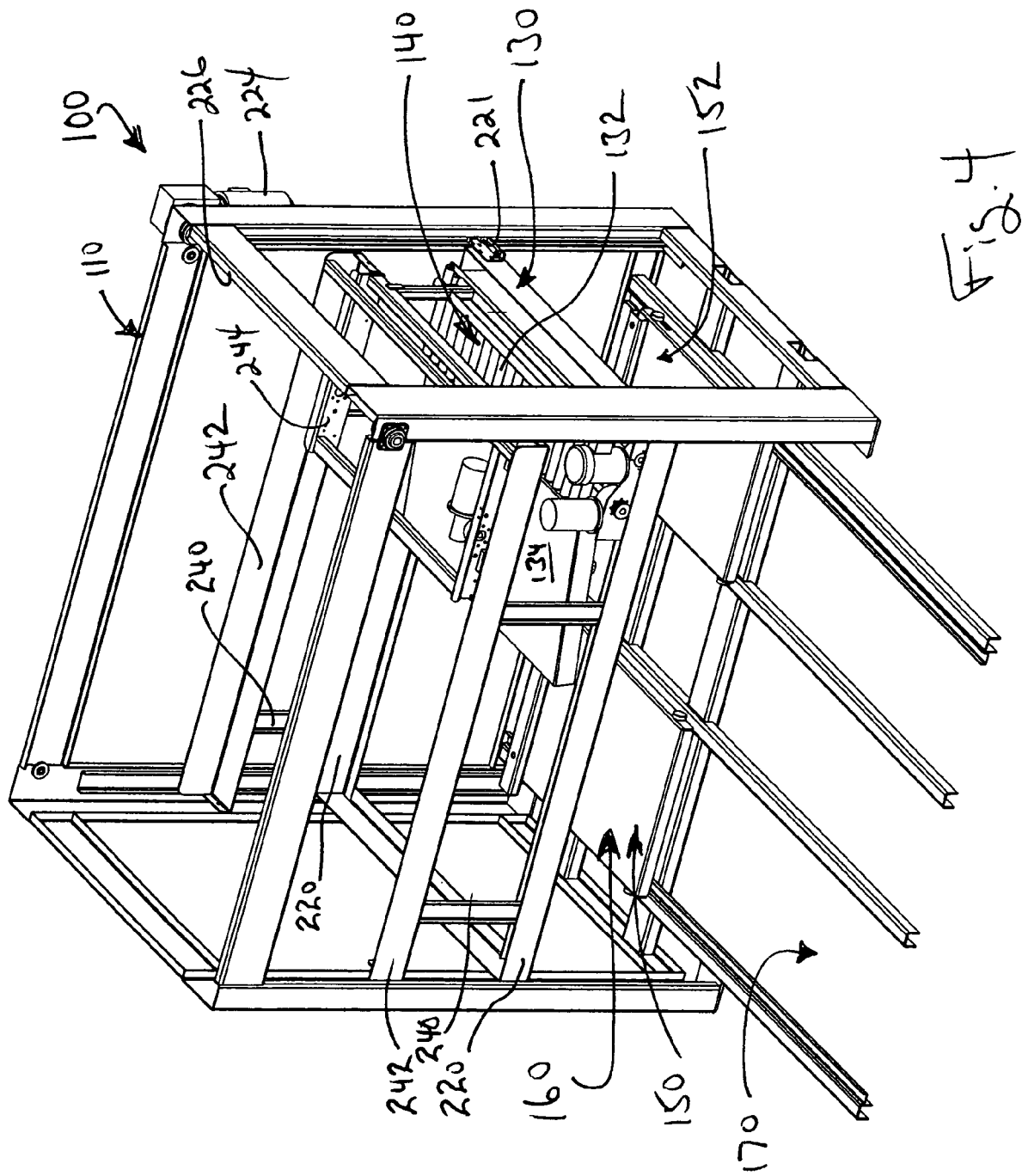
FIG. 4 illustrates in perspective the compact palletizer as in FIG. 1, but omitting for clarity an empty pallet dispenser thereof.
Figure 5:
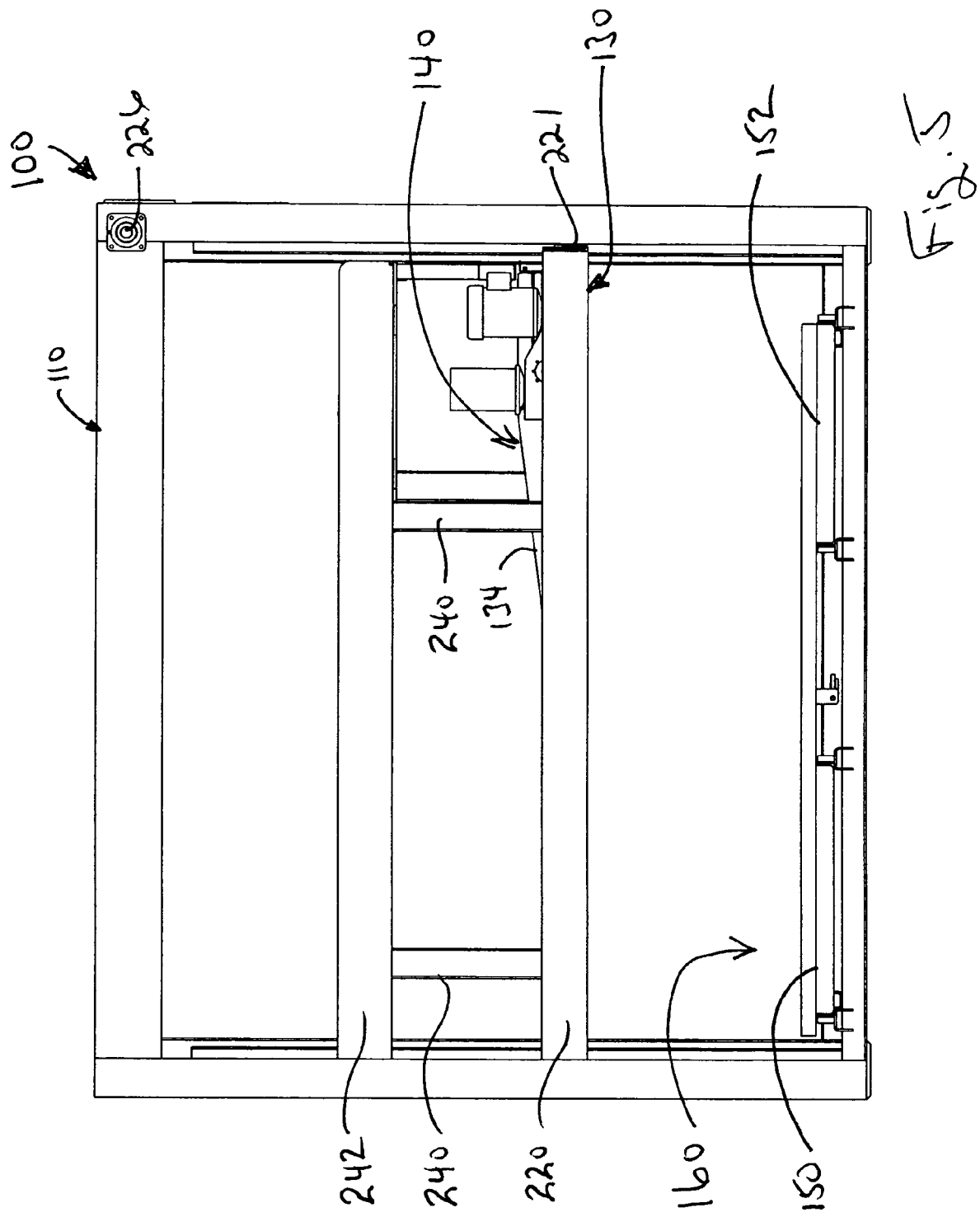
FIG. 5 illustrates the compact palletizer as in FIG. 2, but omitting for clarity an empty pallet dispenser thereof.
Figure 6:
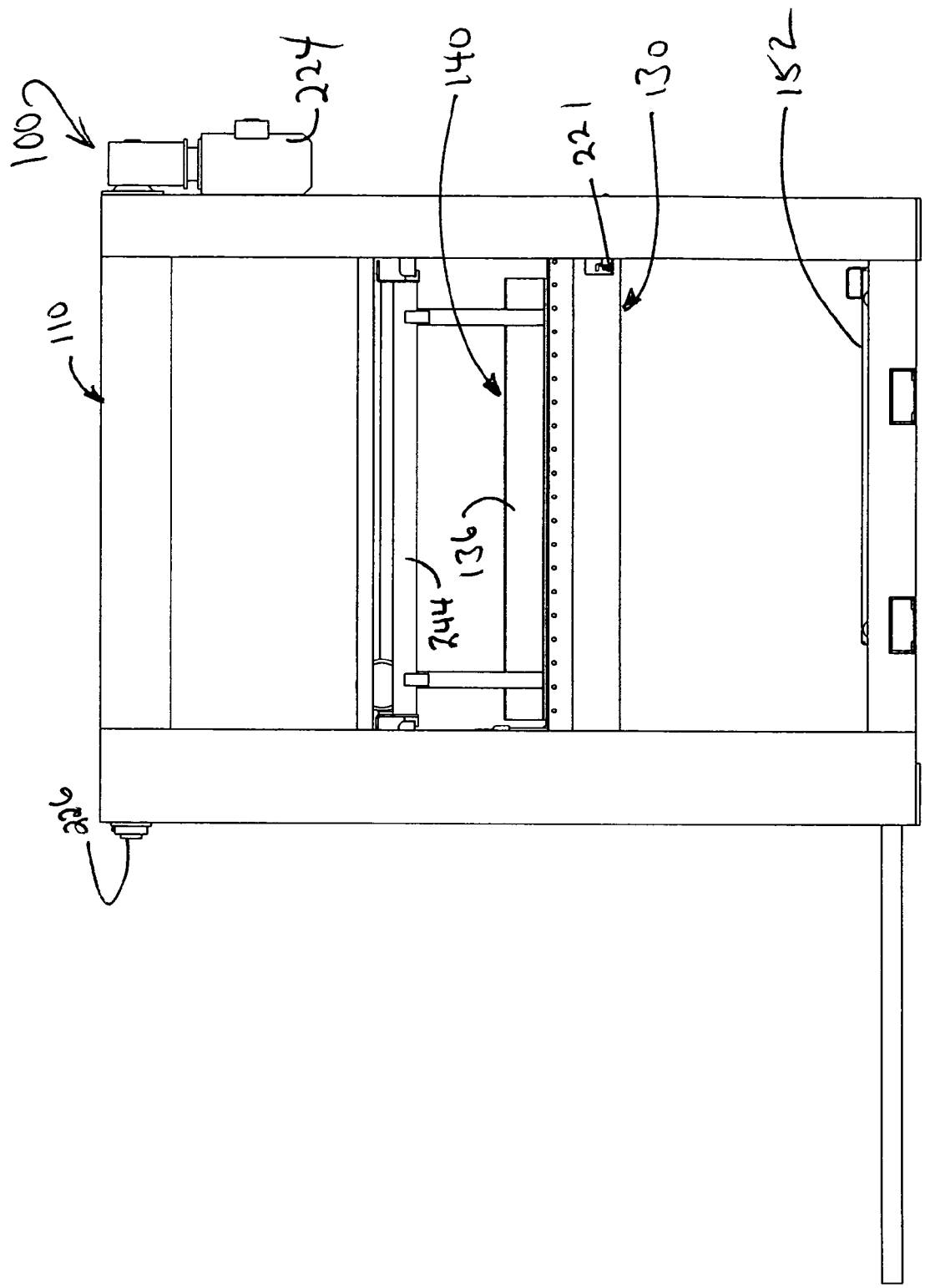
FIG. 6 illustrates the compact palletizer as in FIG. 3, but omitting for clarity an empty pallet dispenser thereof.
Figure 7:
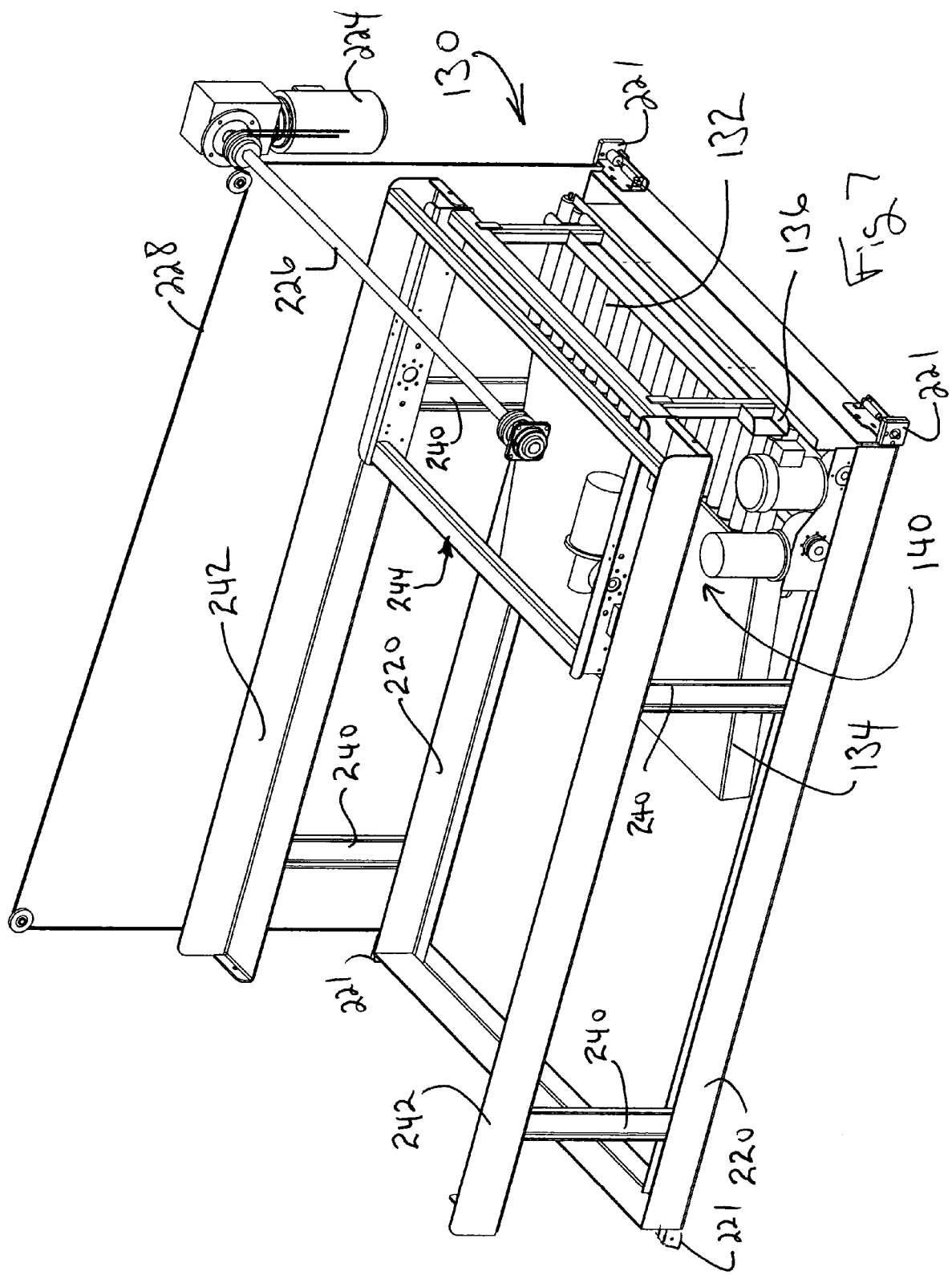
FIG. 7 illustrates in perspective an apron carriage of the palletizer of FIG. 1 including an apron conveyor and apron plate in a fully retracted position and including a puller bar in a fully retracted position.
Figure 8:
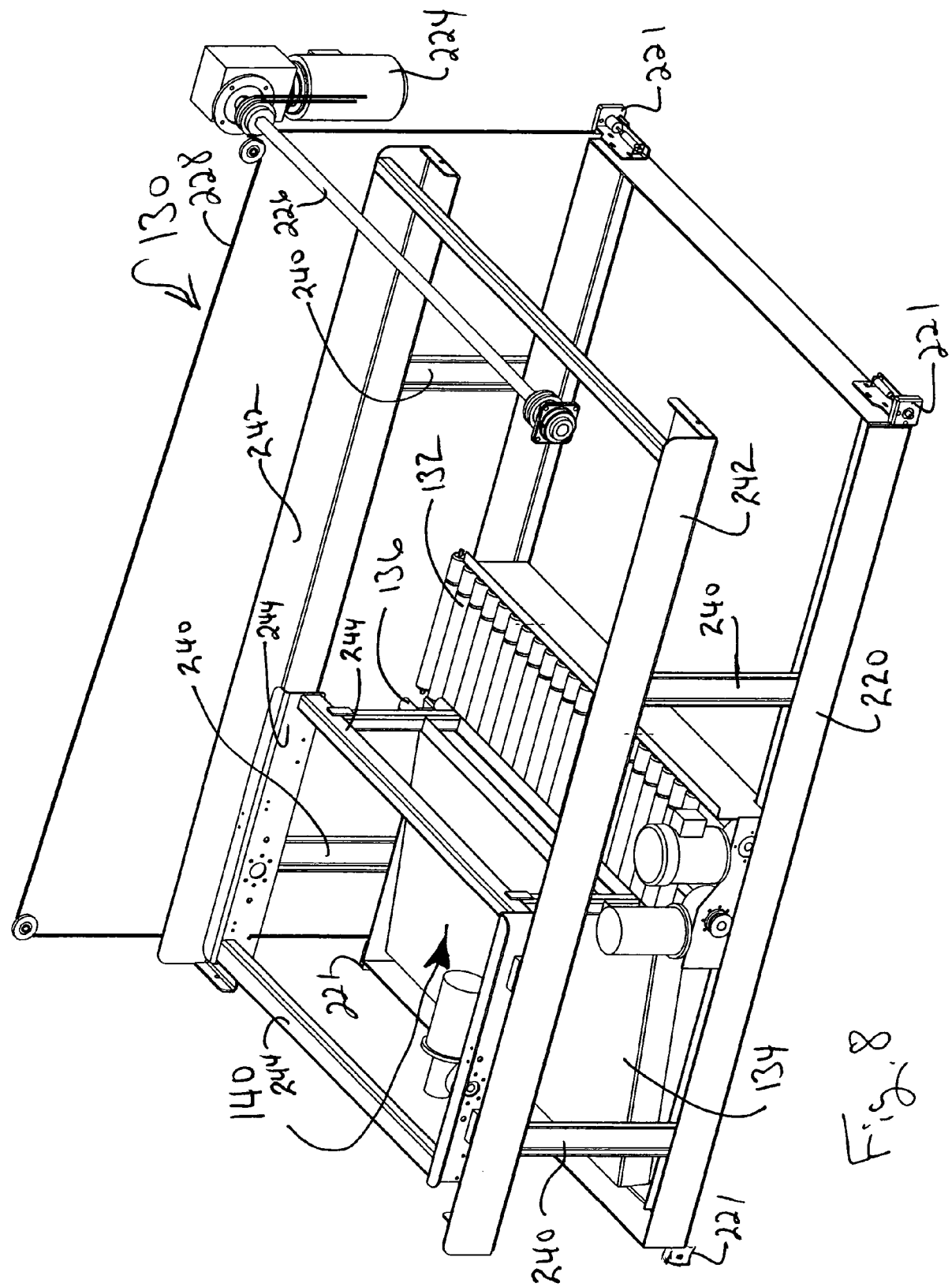
FIG. 8 illustrates in perspective the apron carriage of FIG. 7, but with the apron conveyor and apron plate in a fully advanced position and with the puller bar in a fully advanced position.
Figure 9:
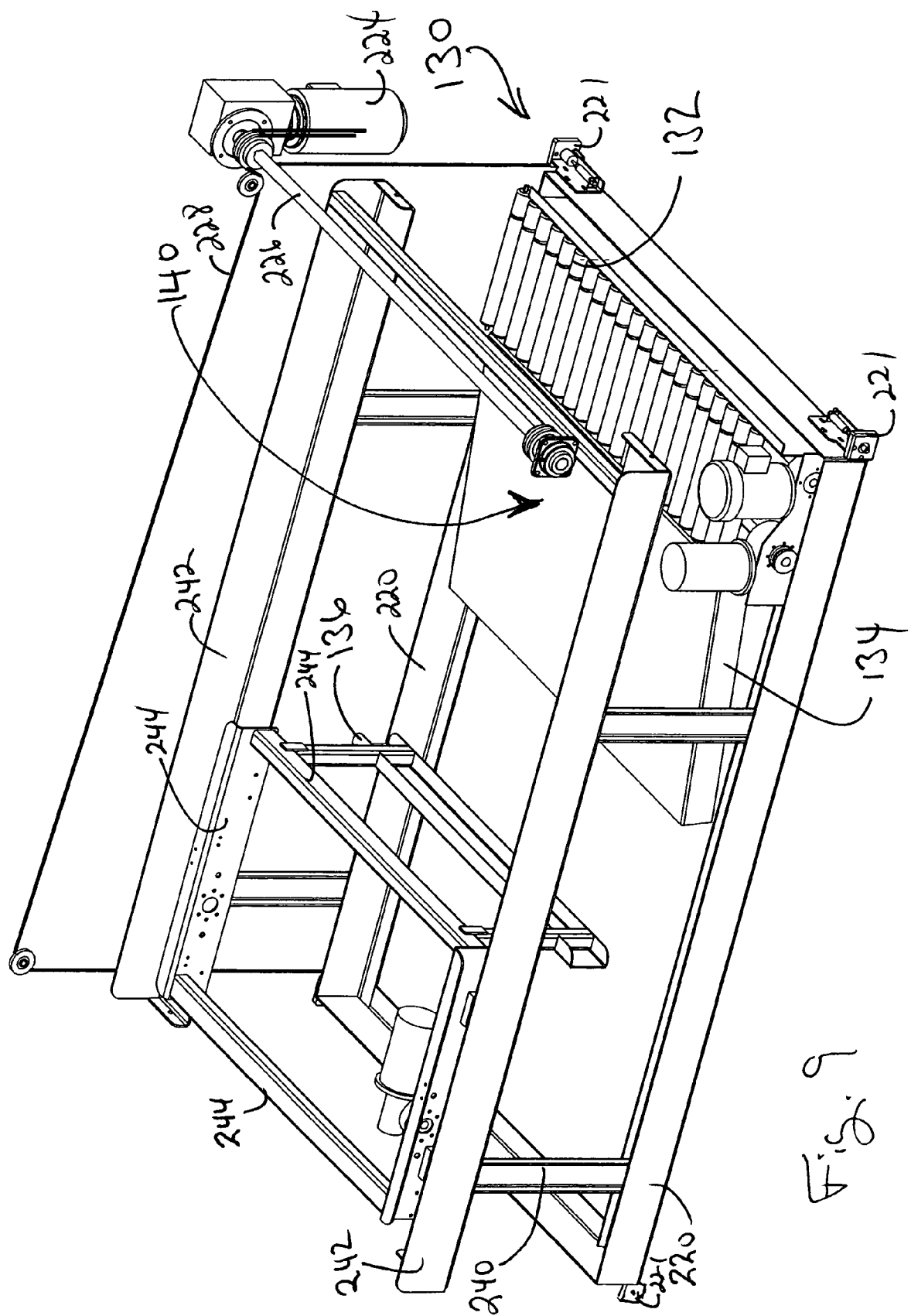
FIG. 9 illustrates in perspective the apron carriage of FIG. 7, but with the apron conveyor and apron plate in the fully retracted position and with the puller bar in the fully advanced position.
Figure 10:
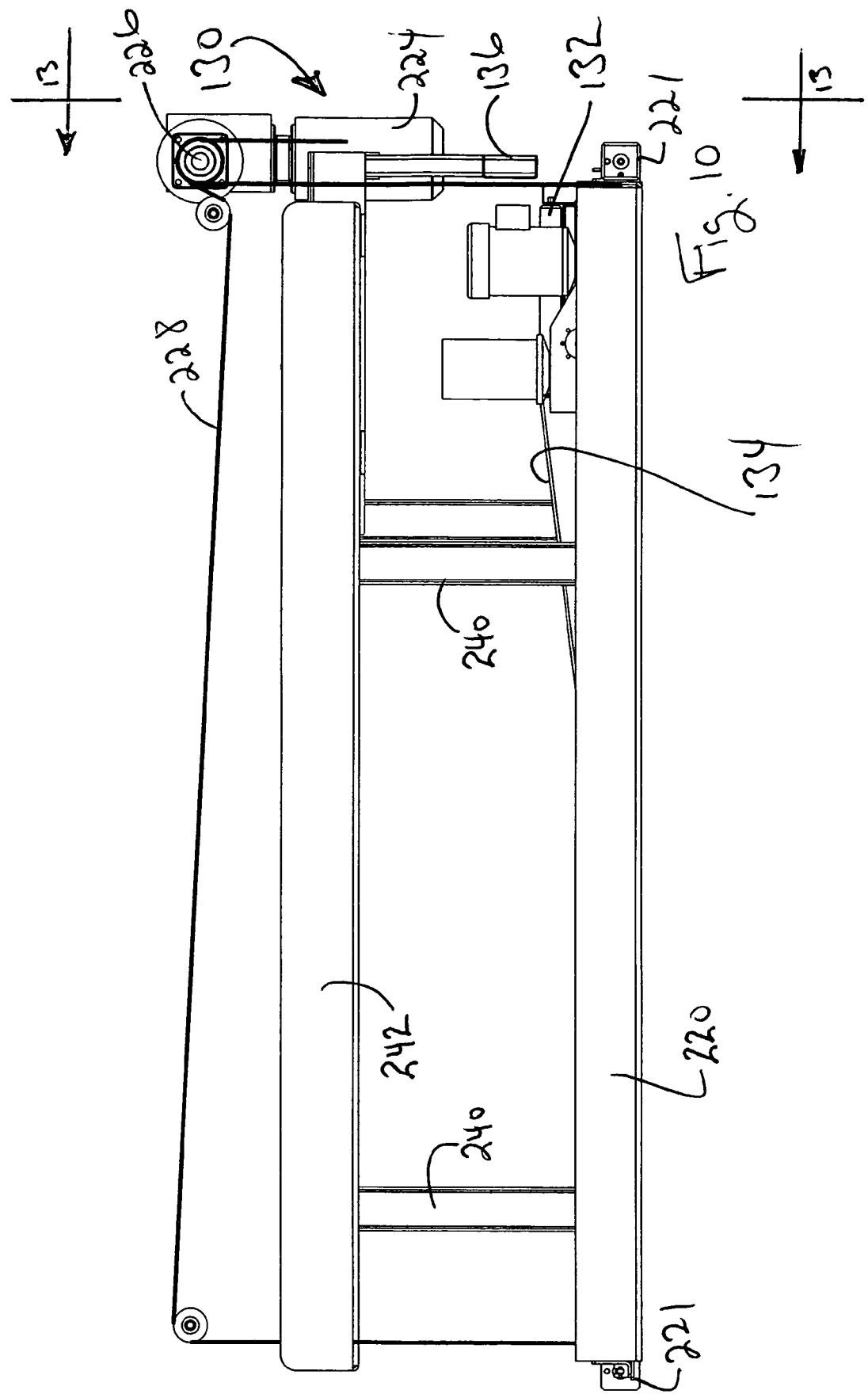
FIG. 10 illustrates the apron carriage as in FIG. 7, but in front view.
Figure 11:
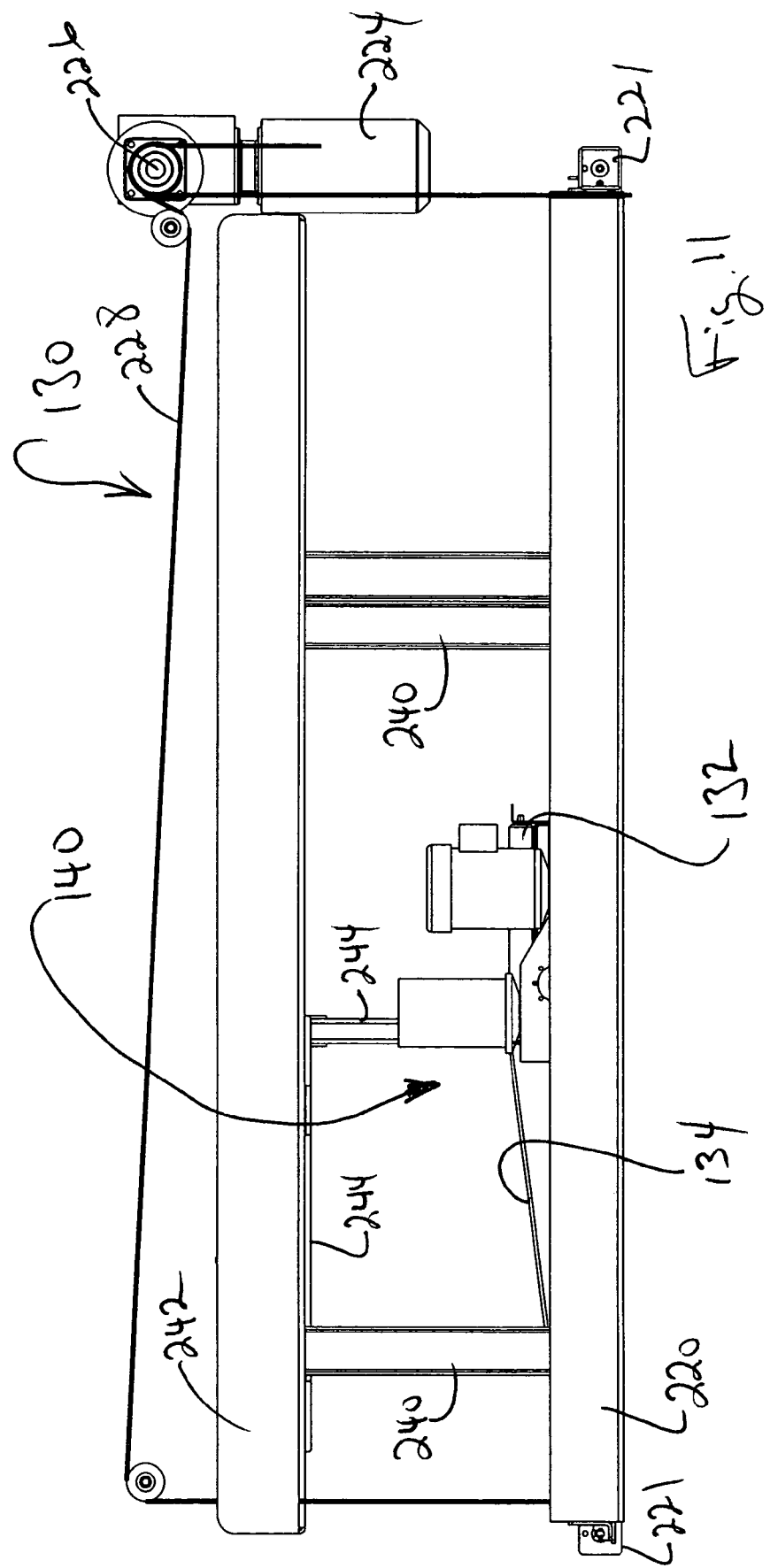
FIG. 11 illustrates the apron carriage as in FIG. 8, but in front view.
Figure 12:
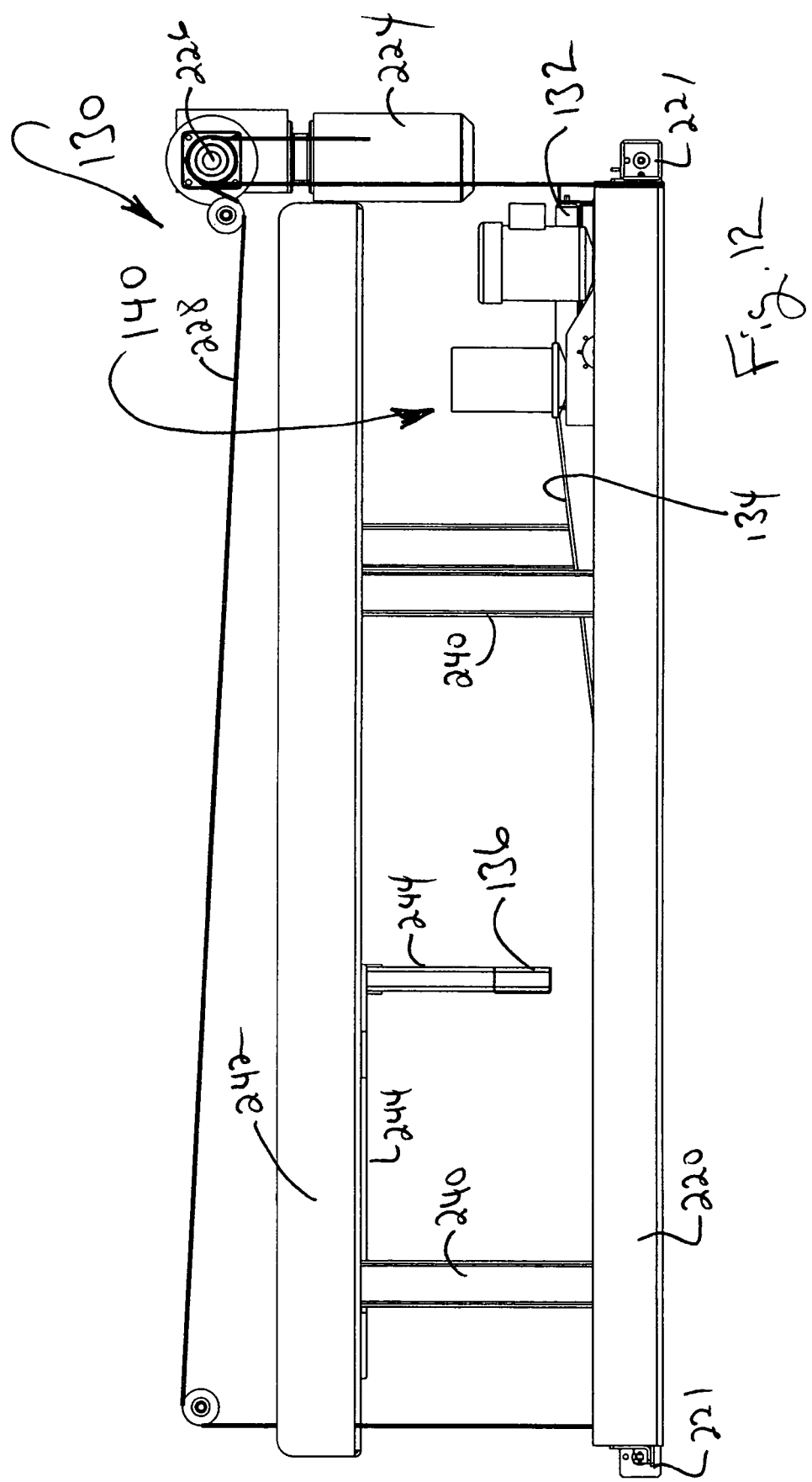
FIG. 12 illustrates the apron carriage as in FIG. 9, but in front view.
Figure 13:
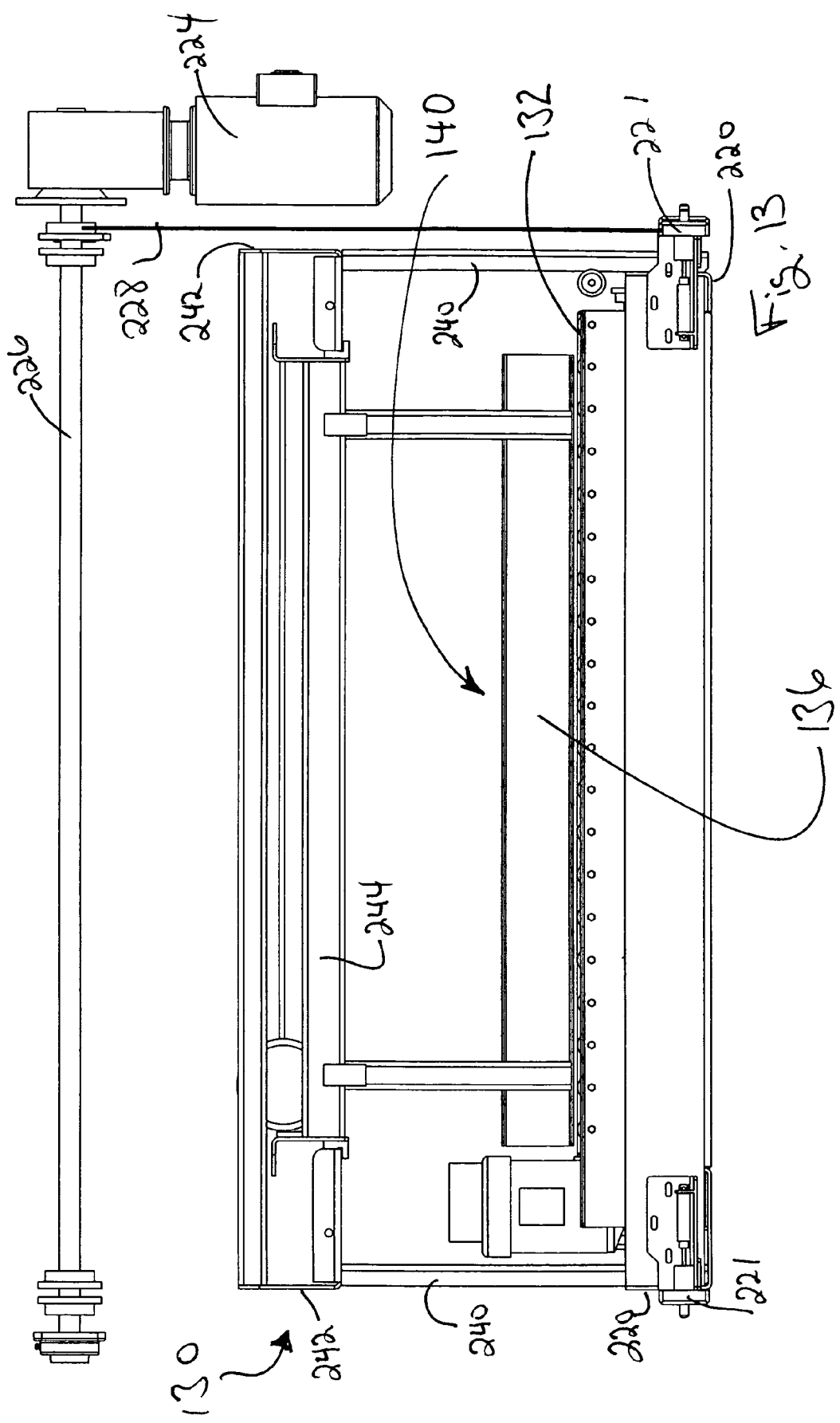
FIG. 13 illustrates the apron carriage in right view as taken along the lines 13-13 in FIG. 10.

With reference to FIGS. 1-6, a compact palletizer 100 according to a preferred embodiment of the present invention includes a generally box-form frame 110, an empty pallet cartridge 120, an apron carriage 130 defining a layer build area 140, a stack build and discharge platform 150 movable between a stack build area 160 and stack discharge area 170, and an empty pallet transfer platform 152 moveable between a location below the empty pallet cartridge 120 and a location adjacent stack build area 160.

Generally, and as described more fully hereafter, empty pallet cartridge 120 delivers empty pallets 200 to platform 152. Platform 152 then positions the empty pallet below apron carriage 130. Apron carriage 130 thereafter transfers empty pallets 200 to stack build area 160. An item infeed conveyor 180 (FIGS. 14-19) delivers a series of items 190 (FIGS. 14-27) to apron carriage 130 for stacking upon pallets 200. With a pallet 200 located at stack build area 160, palletizer 100 sequentially builds item 190 layers upon apron carriage 130 and transfers each item 190 layer by way or apron carriage 130 to a pallet 200 located on platform 150 in stack build area 160. Palletizer 100 thereby forms a stack of item 190 layers upon the pallet 200. Once a stack of item 190 layers has been completed, platform 150 moves the palletized items 190 to discharge area 170 for collection, e.g., by fork lift.

With additional reference to FIGS. 7-13 and as described more fully hereafter, apron carriage 130 includes an apron conveyor 132, a plate apron 134, and a pull bar 136. Apron conveyor 132 and plate apron 134 collectively define layer build area 140. Apron conveyor 132 receives items 190 from infeed conveyor 180 and apron carriage 130 builds an item 190 layer at layer build area 140 thereof. A motor 133 activates apron conveyor 132 in coordination with operation of infeed conveyor 180 whereby items 190 arrive in series, e.g., row-by-row, upon apron conveyor 132 of apron carriage 130. Puller bar 136 moves relative to layer build area 140 to transfer items 190 row-by-row in a layer building operation. More particularly, as rows of items 190 arrive on apron conveyor 132, puller bar 136 pulls each row onto apron plate 134, except for the last row, which may remain on apron conveyor 132. Thus, under normal operation a complete item 190 layer resides on both apron conveyor 132 and apron plate 134. Once a complete item 190 layer is formed, apron carriage 130 delivers the formed item 190 layer to the stack build area 160. Thus, apron carriage 130 reciprocates both vertically and horizontally to implement receipt of incoming items 190 relative to infeed conveyor 180 and stacking of item 190 layers to form an item 190 stack at stack build area 160.

As may be appreciated, items 190 as delivered to apron carriage 130 by way of infeed conveyor 180 may arrive according to a variety of patterns, e.g., as implemented by known box turning devices (not shown), to establish a desired item 190 stack pattern.

Apron carriage 130 includes a pair of carriage support rails 220 having a guide follower 221 at each end thereof. Vertical guides 222 of frame 110 slidably receive followers 221. Carriage support rails extend substantially to length of frame 110. A vertical drive motor 224 mounts to frame 110 and couples, e.g., by way of drive shaft 226 and interconnecting lift cables 228, to rails 220. Thus, motor 224 operates in a first direction to lift carriage support rails 220 and in a second direction to lower carriage support rails 220. In this manner, motor 224 operates to selectively vertically position apron carriage 130.

Carriage support rails 220 allow independent horizontal movement of layer build area 140 and pull bar 136 within apron carriage 130. Thus, apron conveyor 132 and plate apron 134, i.e., collectively layer build area 140, move horizontally in unison while puller bar 136 enjoys independent horizontal movement relative to layer build area 140. A set of vertical stands 240 mount to carriage support rails 220 and extend upward therefrom. A pair of bar support rails 242 mounts to stands 240. More particularly, each of bar support rails 242 lies generally directly above and parallel to a corresponding one of carriage support rails 220. A bar support frame 244 slidably mounts to bar support rails 242. Puller bar 136 depends from frame 244.

A motor 246 operates to horizontally reciprocate frame 244 and, therefore, reciprocate puller bar 136 relative to carriage 130. Thus, puller bar 136 may be selectively positioned horizontally relative to layer build area 140, e.g., between a retracted position most distant from stack build area 160, e.g., as in FIGS. 1, 4, 7, and 10, and an advanced position near stack build area 160, e.g., as in FIGS. 8, 9, 11, and 12.

Apron conveyor 132 and plate apron 134 remain stationary relative to one another, but slidably mount to carriage support rails 220. A motor 248 operates to horizontally reciprocate apron conveyor 132 and plate apron 134 in unison, e.g., between a horizontally retracted position most distant from stack build area 160, e.g., as in FIGS. 1, 2, 4, 5 7, 9 10 and 12, and a horizontally advanced position, e.g., overlapping stack build area 160 as in FIGS. 8 and 11.

Thus, as apron carriage 130 moves vertically, layer build area 140, i.e., collectively apron conveyor 132 and apron plate 134, and puller bar 136 move vertically in unison. However, and as previously noted, each of layer build area 140 and puller bar 136 selectively move independently and horizontally relative to one another within apron carriage 130.

FIG. 14-19 illustrate partially apron carriage 130, i.e., illustrate layer build area 140 and puller bar 136 in relation to incoming items 190 arriving by way of infeed conveyor 180 and in relation to stack build area 160. It will be understood, though not specifically illustrated, that items 190 are suitably turned, e.g., near the end of infeed conveyor 180 according to a given box turning/stacking pattern and associated device. Thus, item 190 illustration on infeed conveyor 180 will be consistent, i.e., without attempting to illustrate box turning, and item 190 illustration upon apron carriage 130 shall be as a result of any applicable box turning procedures. In other words, box turning devices and methods are well known and need not be illustrated herein.

Figure 14:
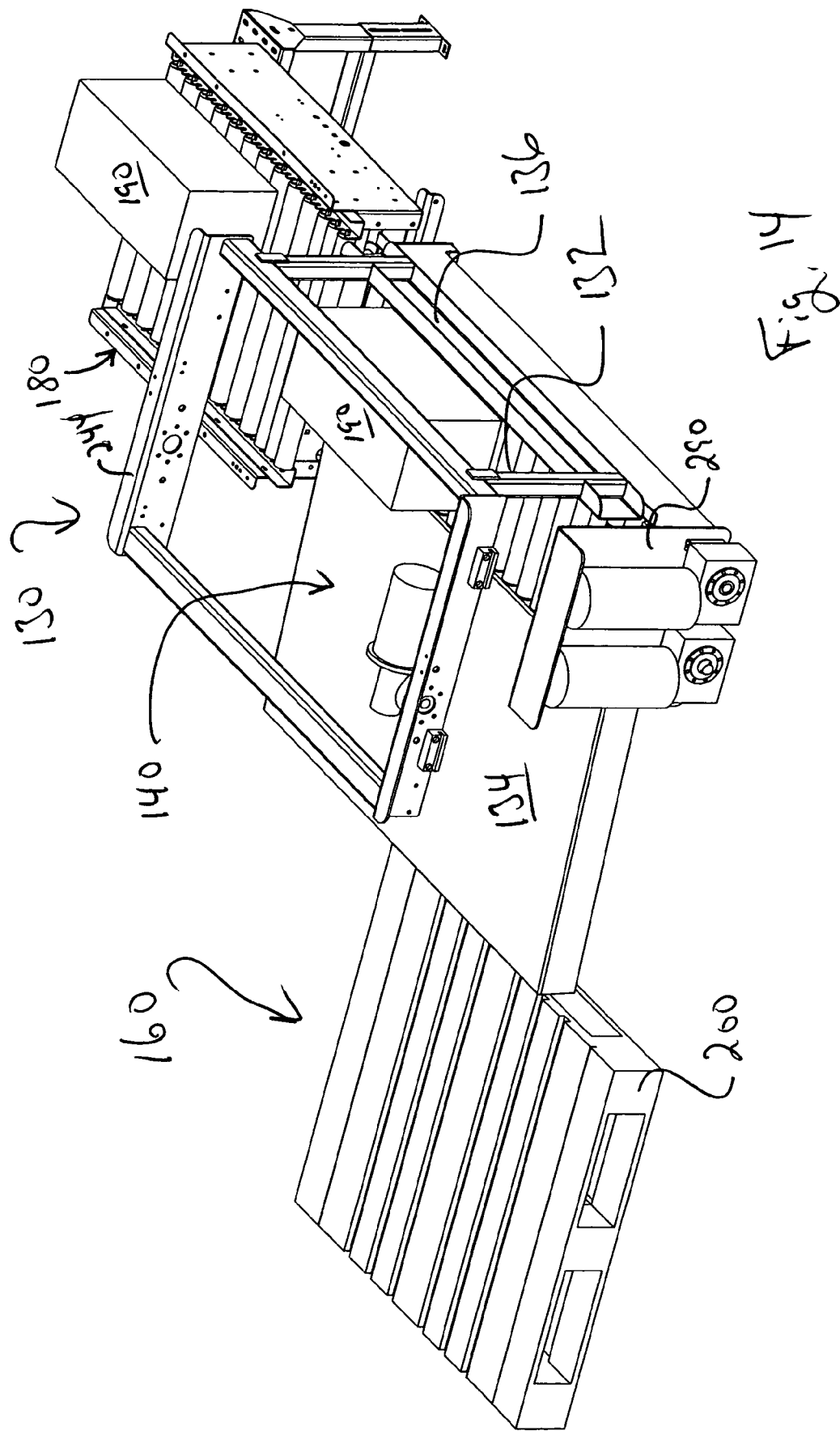
FIGS. 14-19 illustrate a sequence of item layer formation.

In FIG. 14, a first item 190 of a first item 190 row has arrived and is traveling along apron conveyor 132. A block plate 290 (omitted for clarity in other Figs.), at the end of apron conveyor 132, holds the first item 190 of a given item 190 row. It may be noted that puller bar 136 is positioned opposite apron conveyor 132 relative to apron plate 134, i.e., in position to pull a row of items 190 onto apron plate 134.

Figure 15:
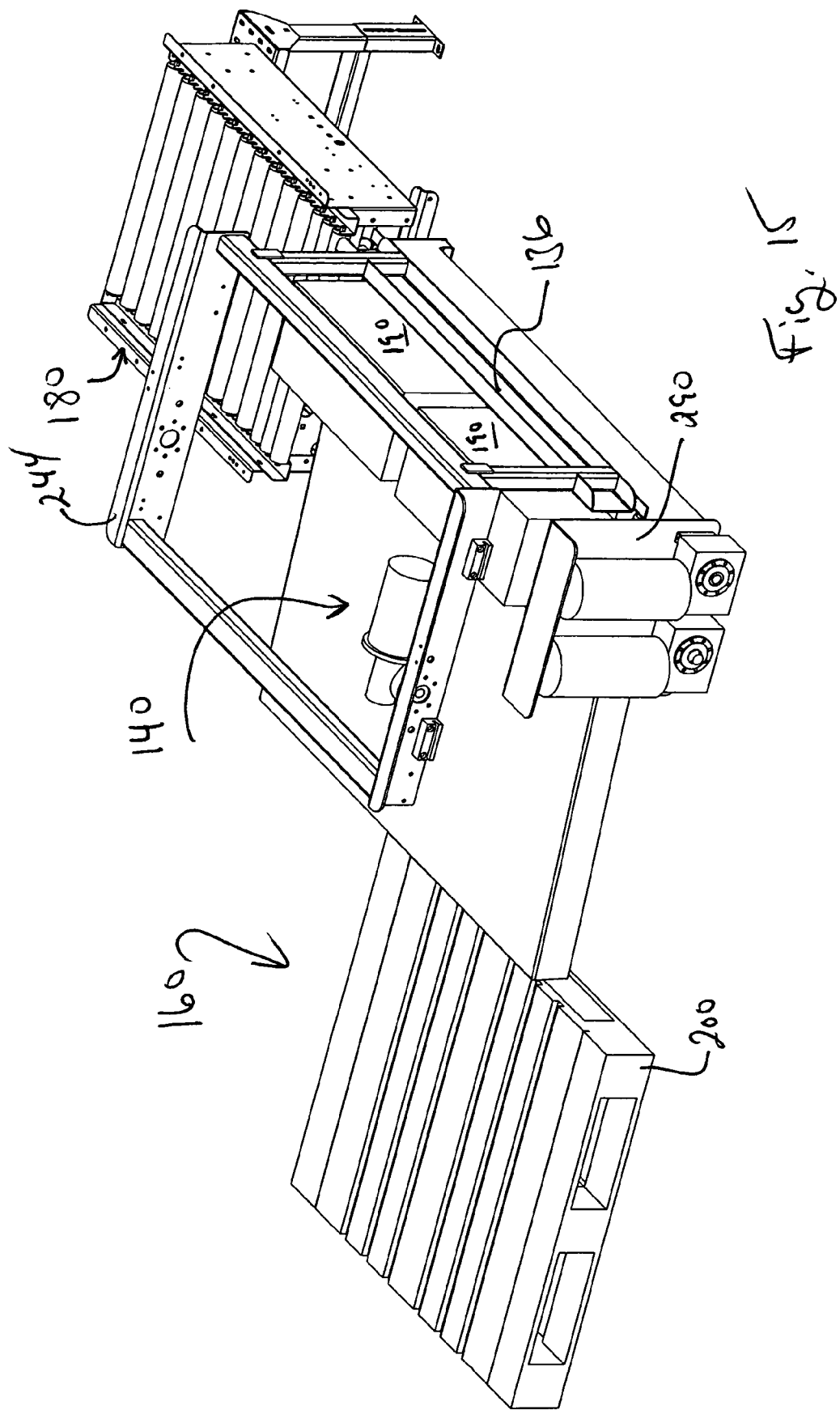

In FIG. 15, a second item 190 has transferred from infeed conveyor 180 to apron conveyor 132. In this particular stacking pattern, these two items 190 constitute a first row of an item 190 layer.

Figure 16:
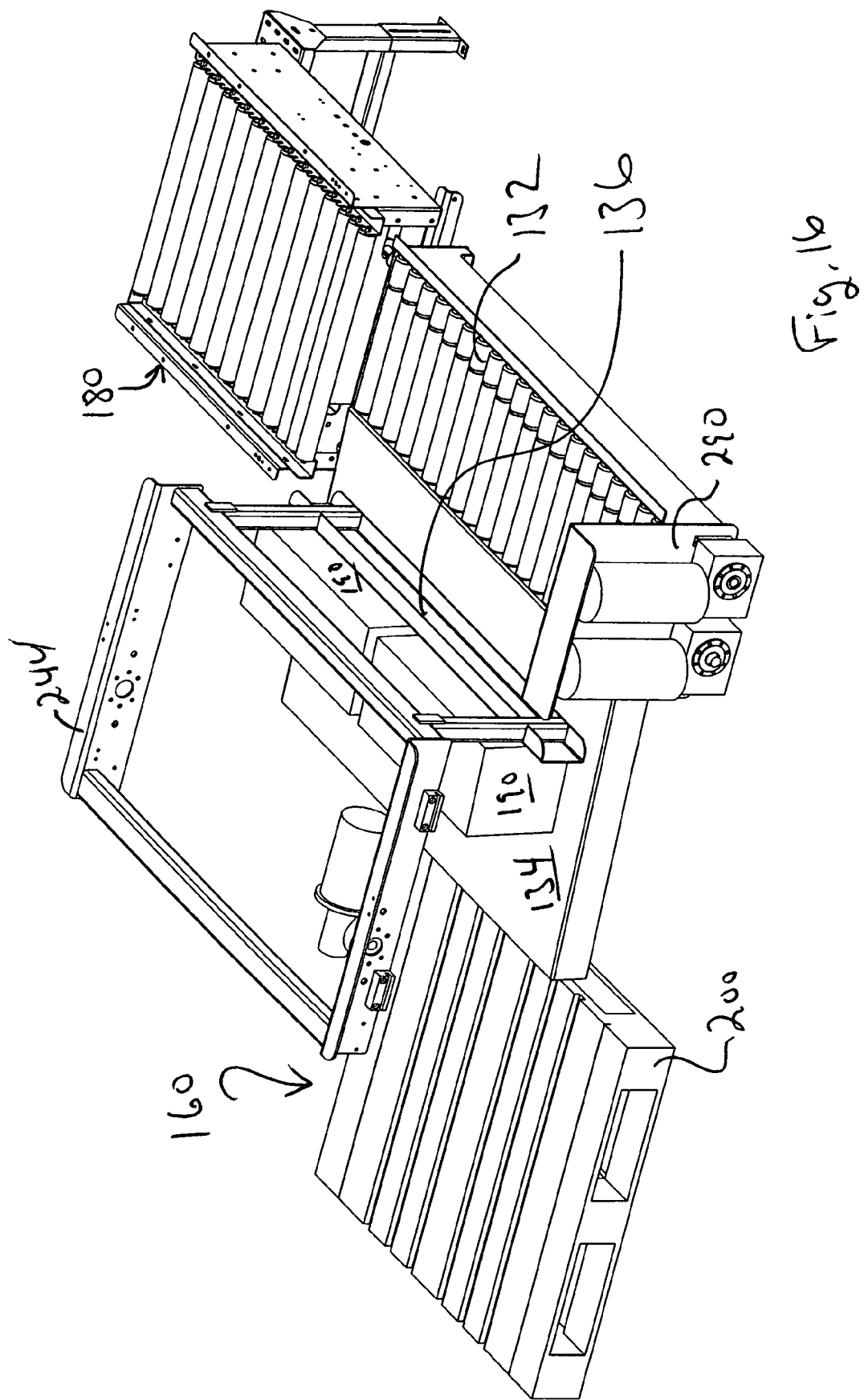
Figure 17:
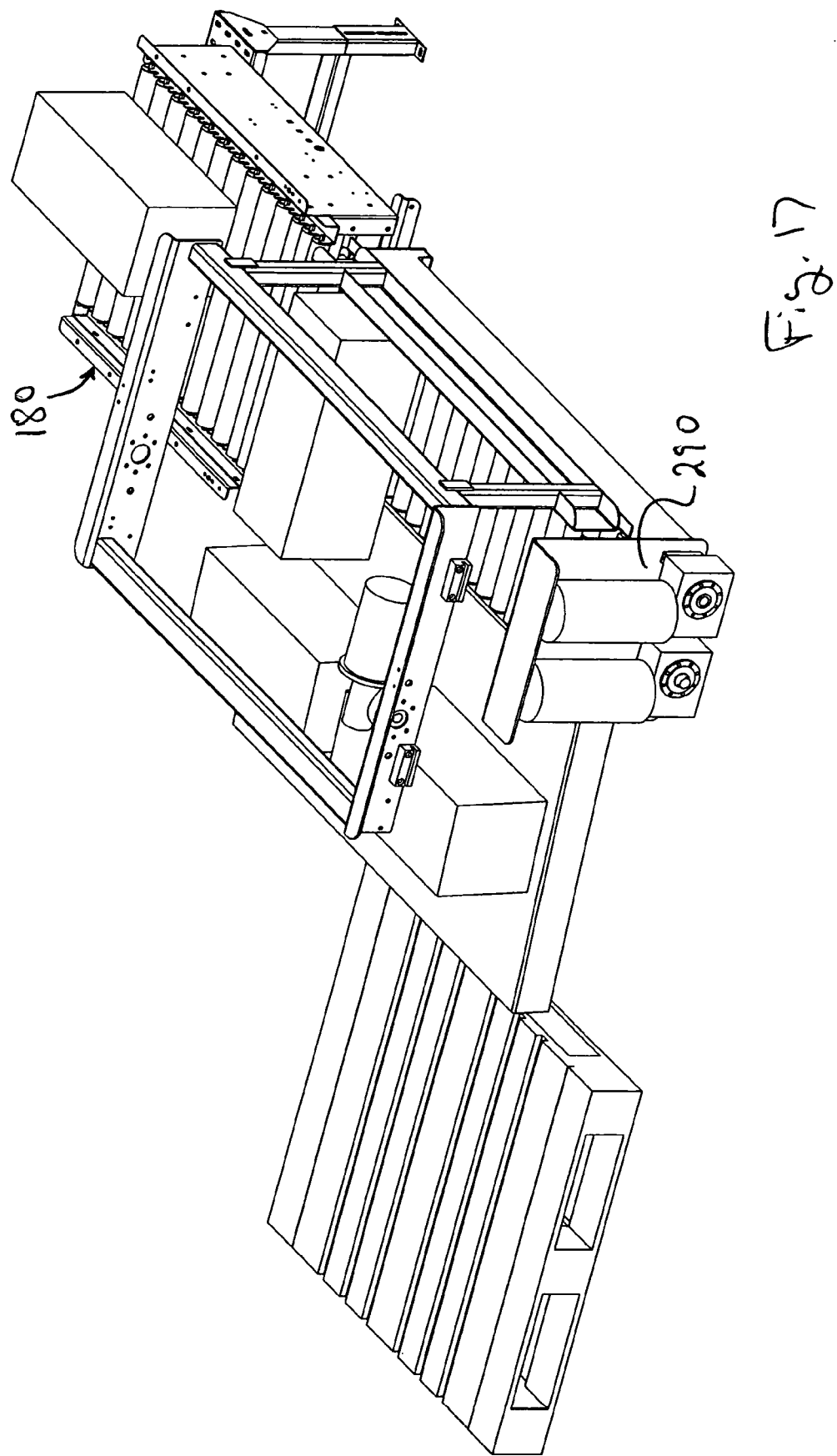

In FIG. 16, puller bar 136 advances to pull the first row of items 190 onto apron plate 134 and thereafter retracts to its position as illustrated in FIG. 17.

In FIG. 17, a first item 190 of the second row in the current item 190 layer travels onto apron conveyor 132.

Figure 18:
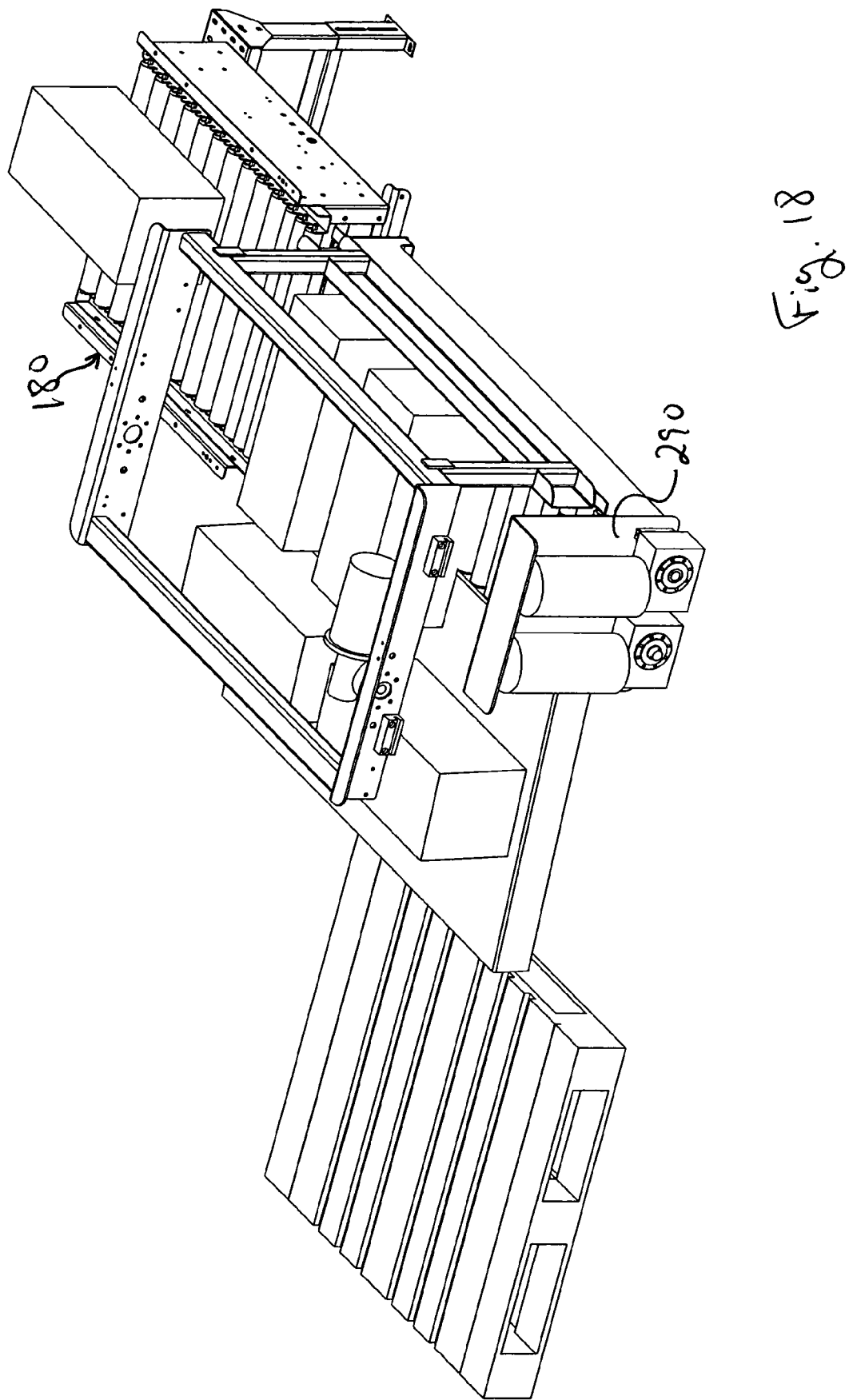

In FIG. 18, a second item 190 of the second row in the current item 190 layer travels onto apron conveyor 132. As maybe appreciated, this second item 190 has been turned relative to its orientation depicted in FIG. 17.

Figure 19:
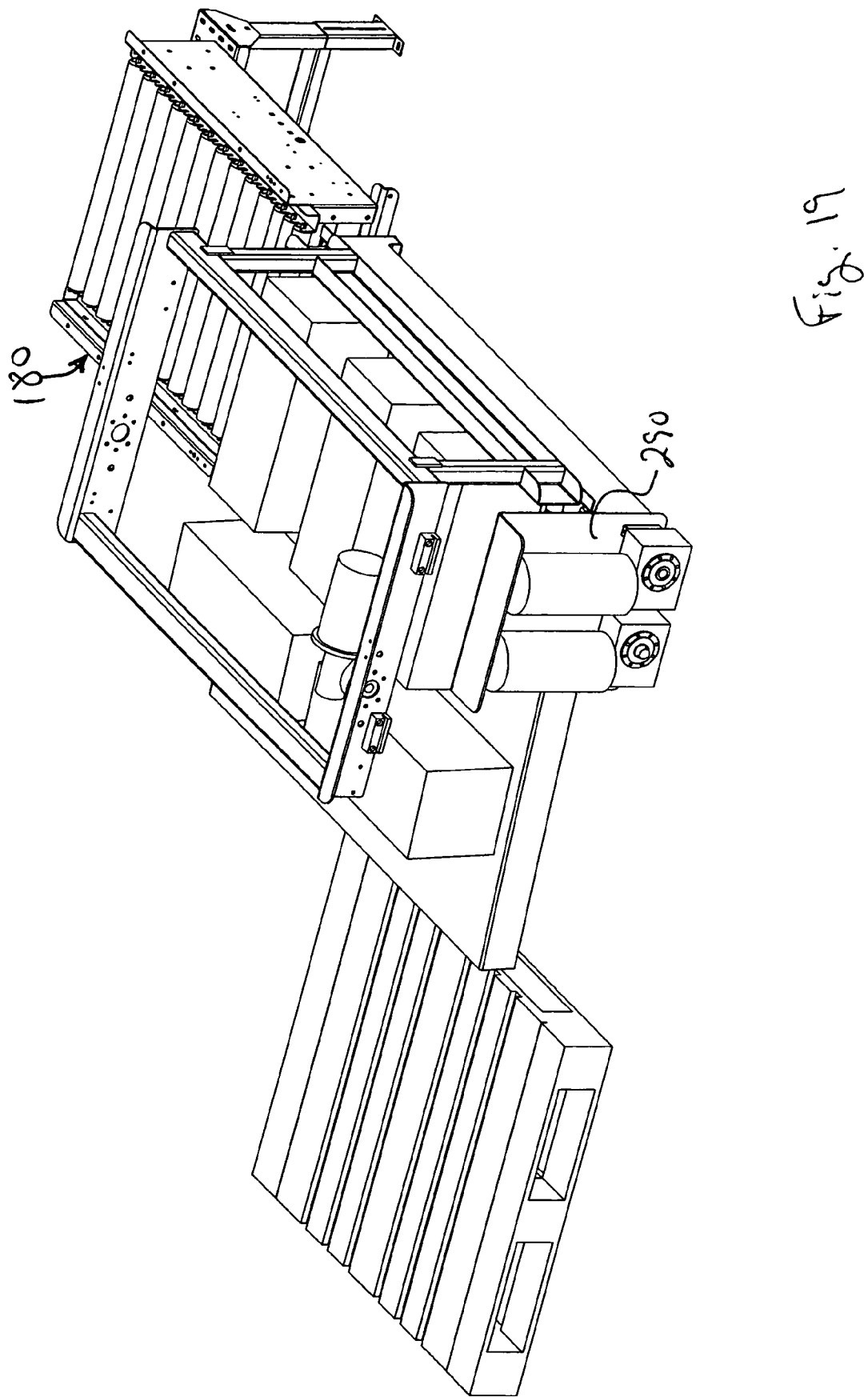

In FIG. 19, a third item 190 of the second row in the current item 190 layer travels onto apron conveyor 132.

According to this particular stacking pattern, an item 190 layer has now being formed in layer building area 140. Palletizer 100 then transfers the completed item 190 layer to the stack building area 160 as described more fully hereafter.

Figure 20:
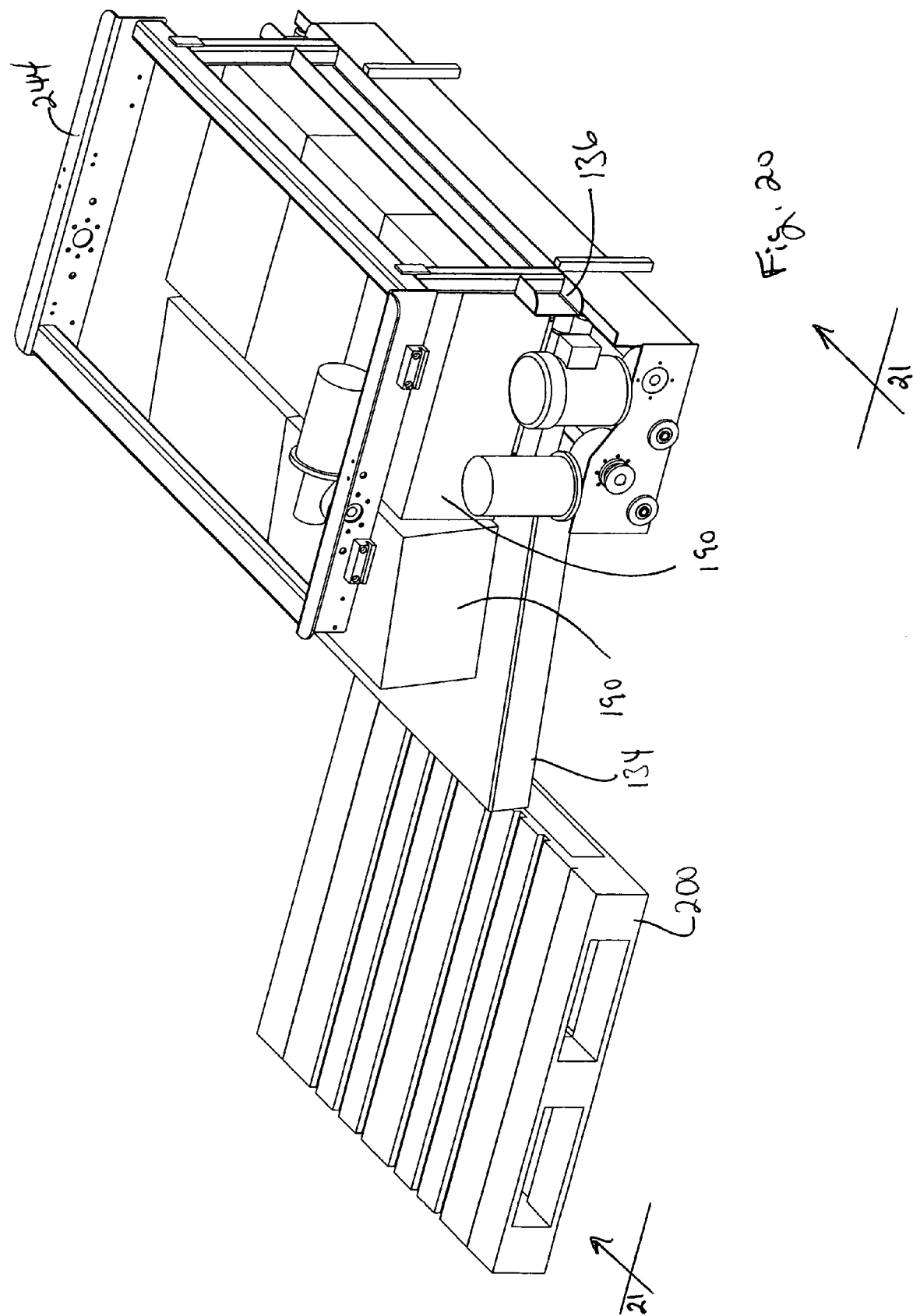
FIG. 20 illustrates in perspective a pallet in a stack building area the apron conveyor, apron plate, and puller bar of the apron carriage of FIGS. 1-13 just following formation of an item layer in the layer building area of the apron carriage and prior to deposit thereof upon the pallet.

The following algorithm may be used to implement one form of layer building possibly with palletizer 100:

Stack Build Sequence Description
(assumes empty pallet in stack build area)
1. retract and lower apron carriage
2. retract puller bar
3. activate infeed and apron conveyors to receive next item row on apron conveyor
4. last row?
   no—advance puller bar to position item row
      retract puller bar
      goto step 3.
   yes—goto step 5.
5. vertically position apron carriage relative to top of item stack
6. advance plate apron and apron conveyor to overhang stack build area
7. advance puller bar to layer blocking position
8. retract plate apron and apron conveyor to place item layer on stack
9. last layer?
   no—goto step 1.
   yes—goto step 10.
10. move pallet from stack build area to stack discharge area In FIGS. 20 and 21, apron carriage 130 has built an item 190 layer in layer build area 140 of apron carriage 130. A portion of the completed item 190 layer resides on apron conveyor 132 and a portion resides on apron plate 134. As may be appreciated, apron carriage 130, being selectively vertically positionable, builds the item 190 layer at, for example, the height of infeed conveyor 180, which is conventionally a fixed-height device, but can vertically move to a height corresponding to the top of a stack of items 190 in stack build area 160. In the present illustration, however, pallet 200 in stack build area 160 is empty and apron carriage moves vertically to a position suitable for deposit of the formed item 190 layer as the first layer on pallet 200. It will be understood, however, that as the stack of item 190 layers grows on pallet 200 apron carriage 130 suitably vertically positions itself according to a height necessary to place layer on a stack of layer resting on pallet 200.

Figure 22:
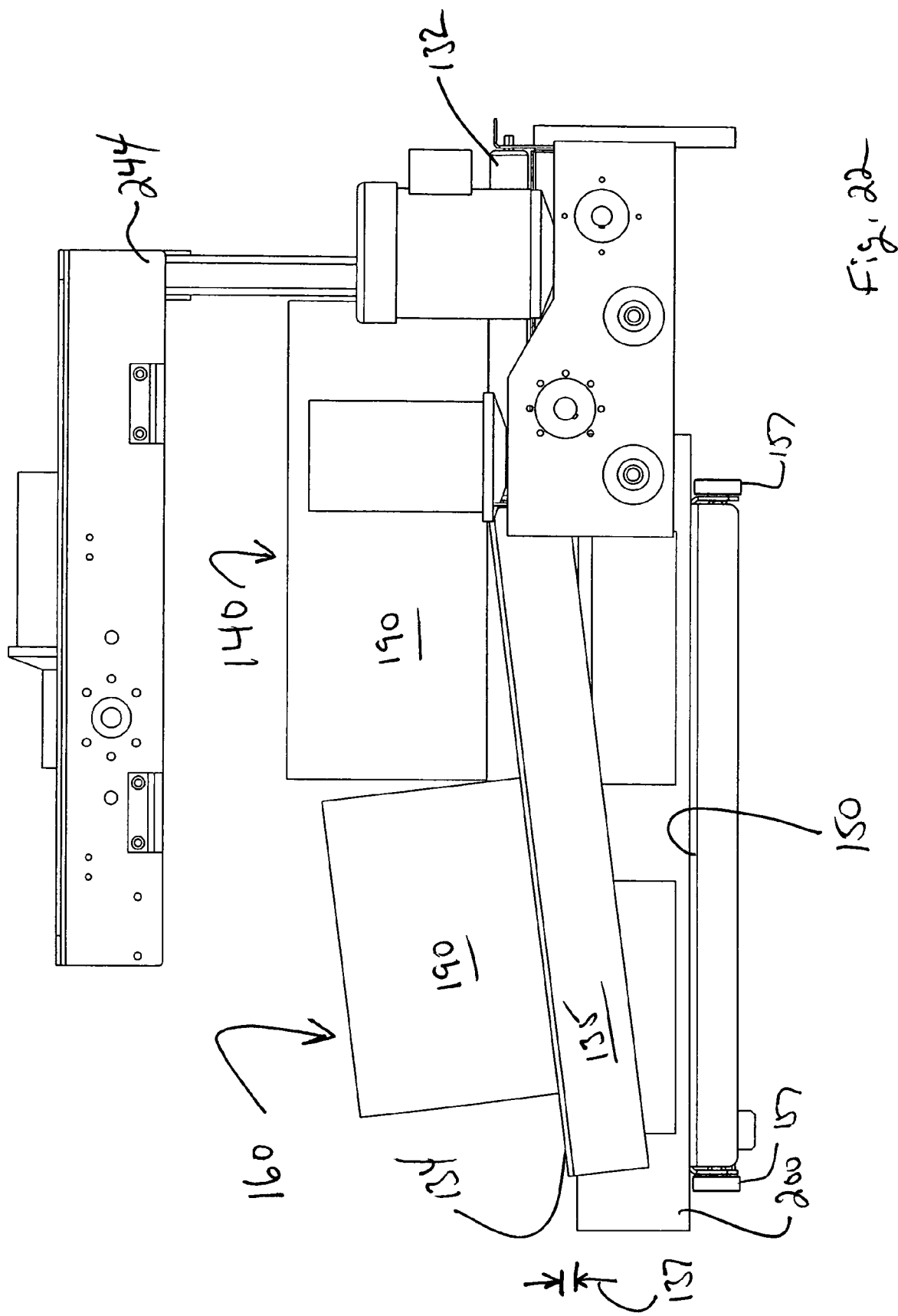
FIGS. 22-25 illustrate layer transfer from the apron carriage to an item stack.

FIG. 22 illustrates apron carriage 130 in position to deposit an item 190 layer. In the present example, apron carriage is positioned to deposit an item 190 layer directly upon a pallet 200 as the first item 190 layer in a stack if item 190 layers. Thus, relative to FIGS. 20 and 21, apron carriage 130 has moved vertically to match a height necessary to deposit an item 190 layer. Apron carriage 130 has also moved horizontally both layer build area 140, i.e., apron conveyor 132 and apron plate 134, and puller bar 160 to the position shown in FIG. 22. As seen in FIG. 22, apron plate 134 includes sidewalls 135, i.e., by way of a generally square U-Shaped cross-section, positionable outside the item 190 layer dimensions as well as that of pallet 200. Thus, sidewalls 135 establish structural rigidity for apron plate 134 and also extend below the height at which an item 190 layer is to be deposited. This establishes a relatively small height 137 through which an item 190 layer drops from apron carriage.

Figure 23:
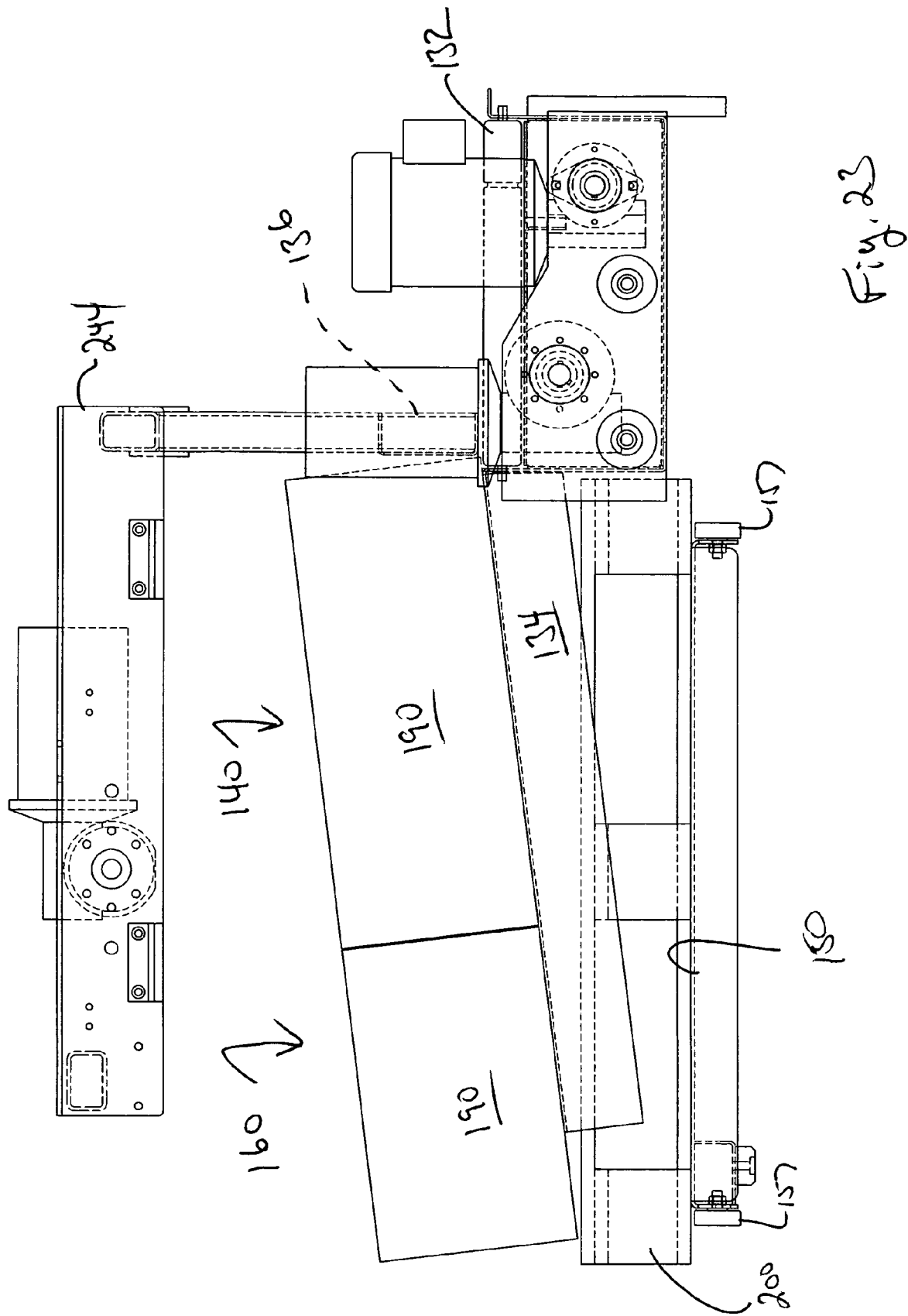
Figure 24:
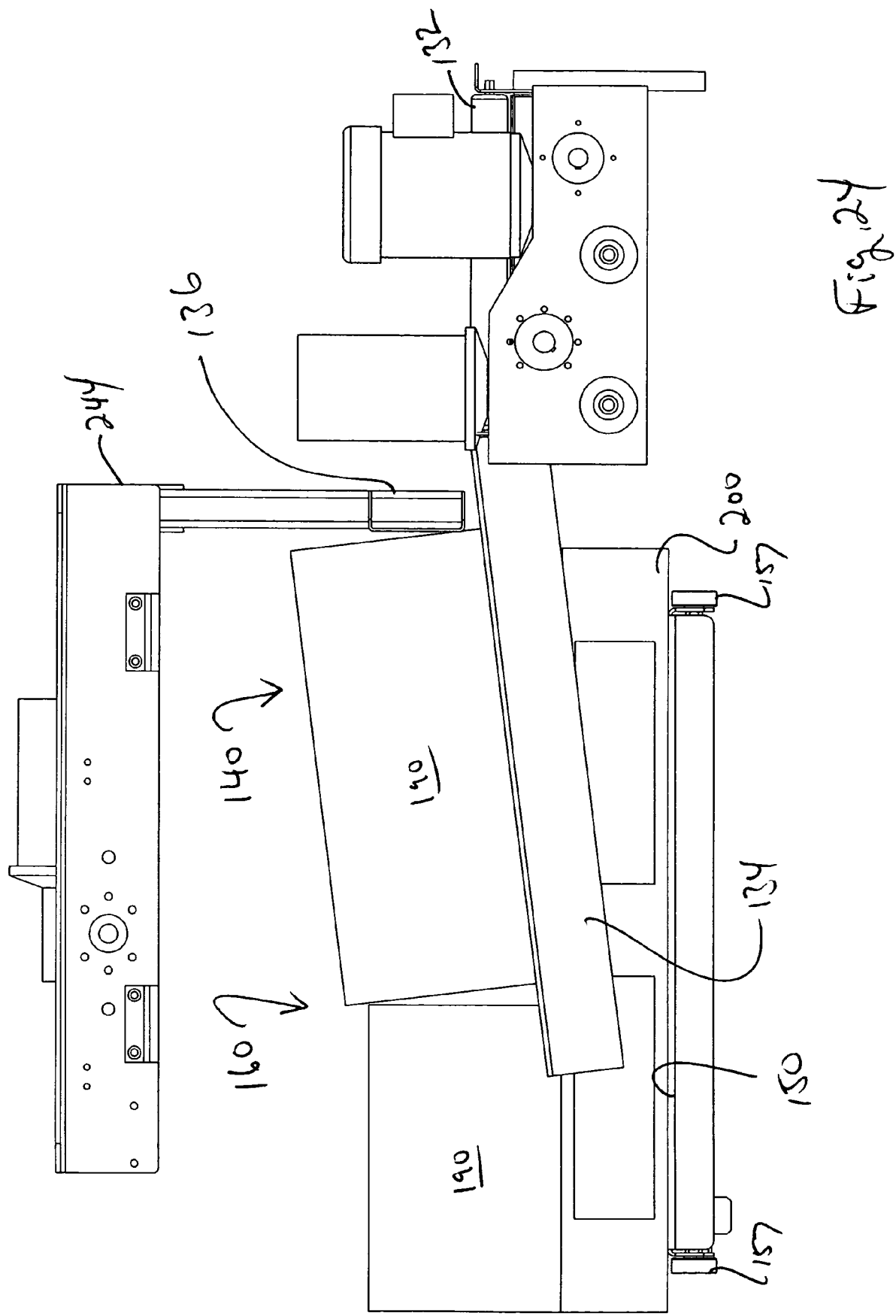
Figure 25:
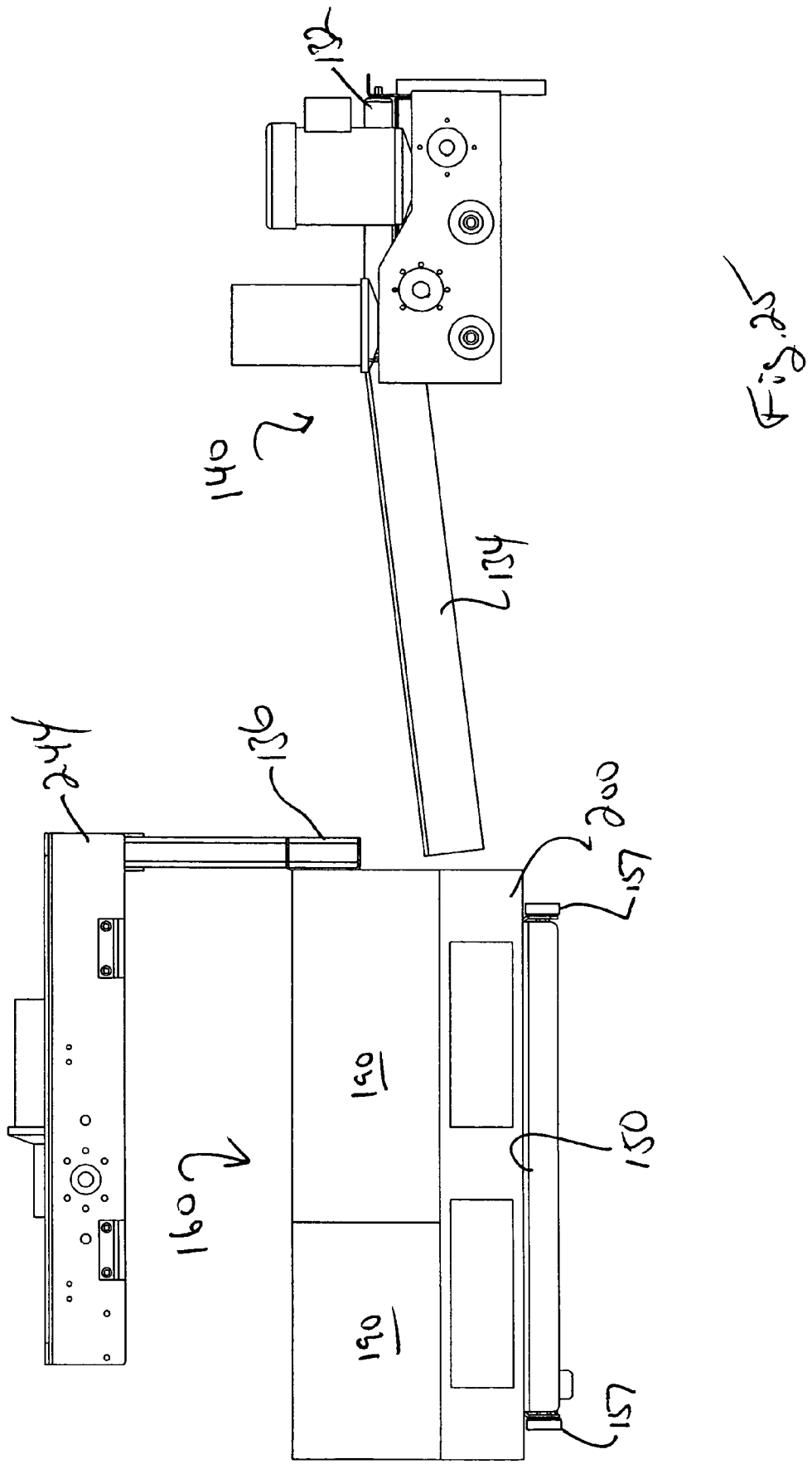

FIG. 23 illustrates the beginning of an item 190 layer drop-off wherein puller bar 136 has moved horizontally to a position adjacent stack build area to serve a backstop function as layer build area 140 retracts. As a result, the item 190 layer is in transition from layer build area 140 to stack build area 160. In FIG. 24, the process continues with layer build area 140 retracting and puller bar 136 remaining stationary relative to stack build area 160. In FIG. 25, layer build area 140 has retracted fully from stack build area 160 leaving the item 190 layer resting in stack build area 160.

Figure 26:
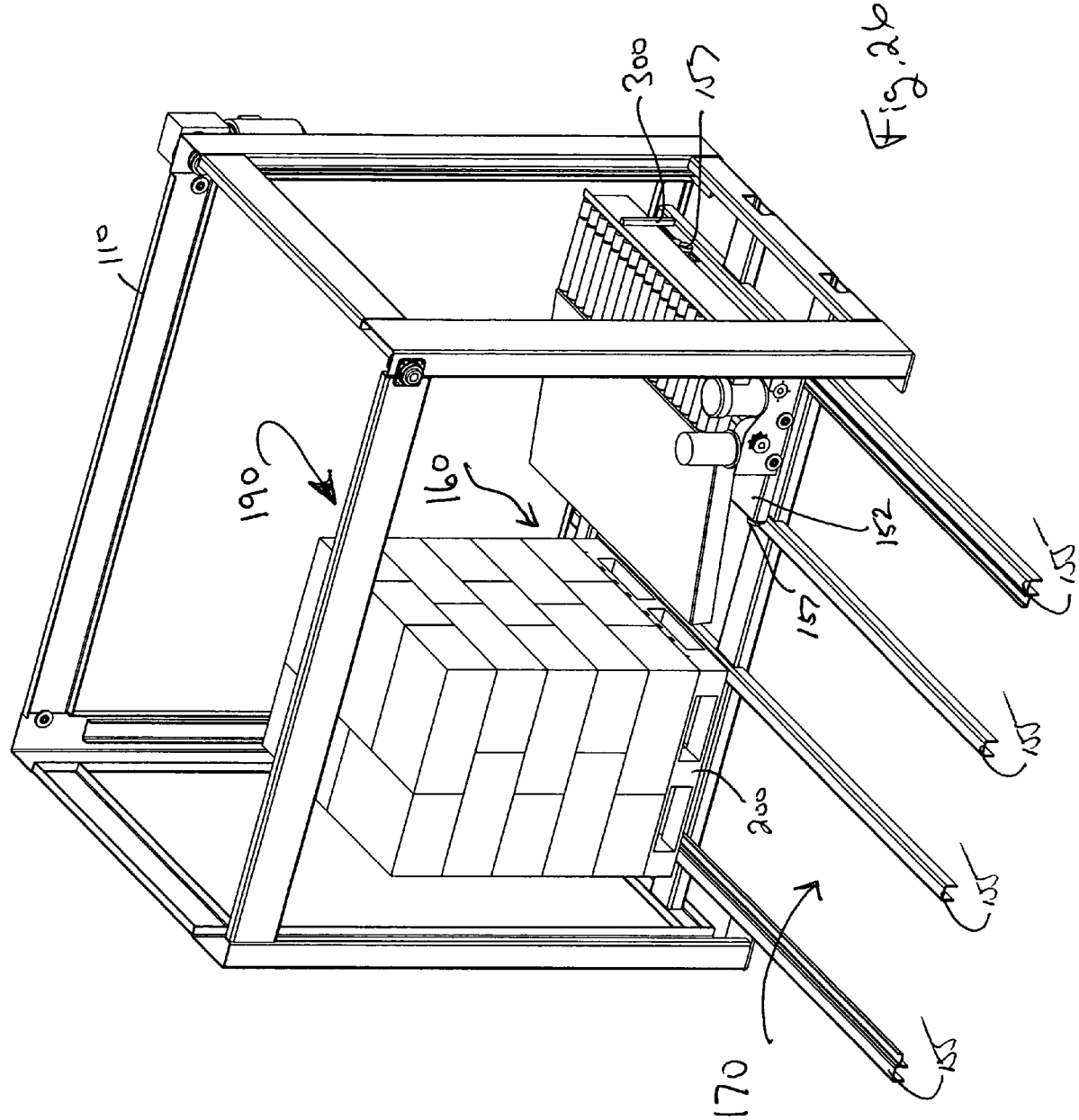
FIGS. 26 and 27 illustrate unified movement of pallet support platforms.
Figure 27:
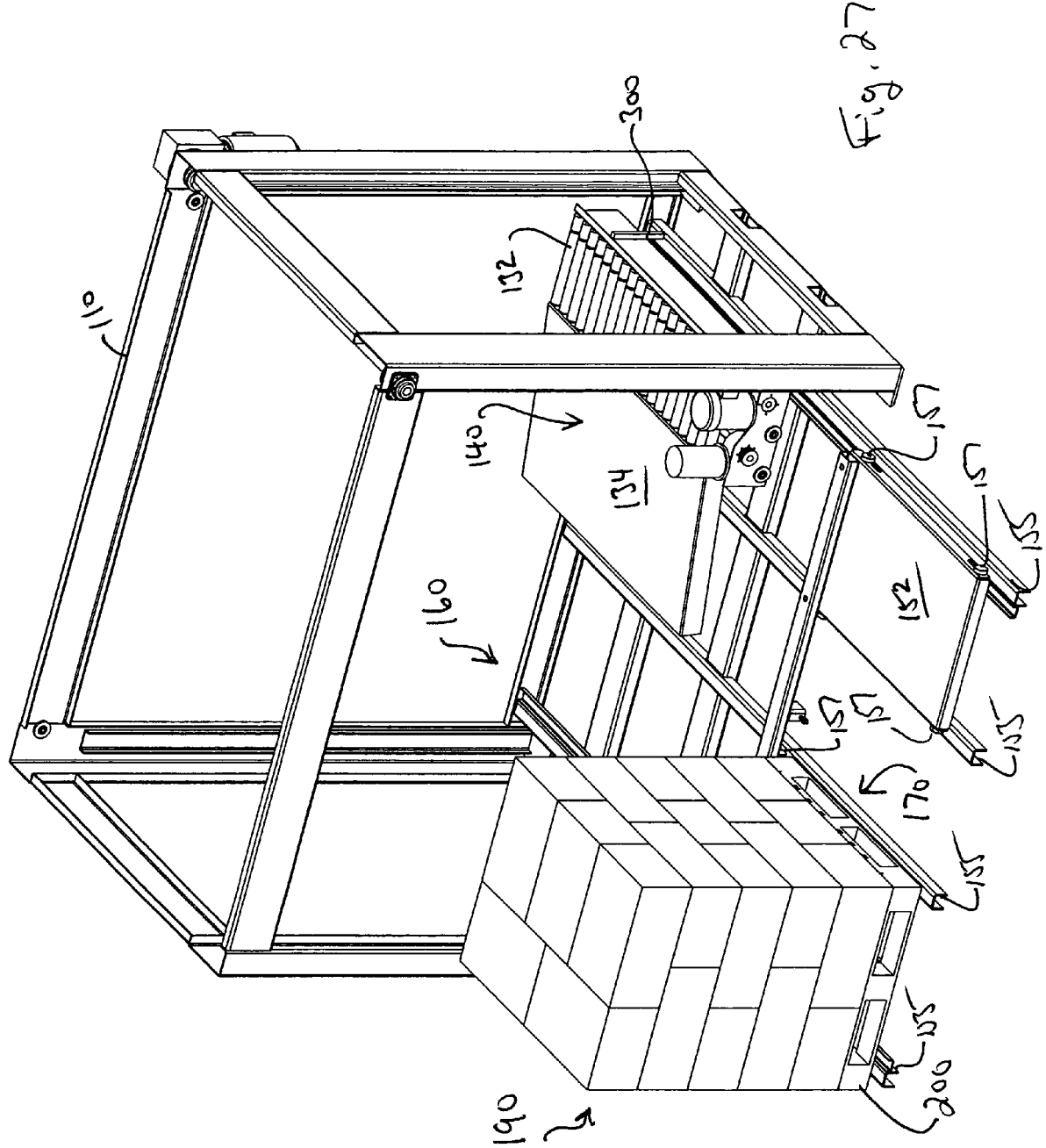

Apron carriage 130 then returns both layer build area 140 and puller bar 136 to their retracted positions and vertically positions itself relative to infeed conveyer 180 to build another item 190 layer upon layer build area 140. Once pallet 200 is complete, e.g., as shown in FIG. 26, platform 150 moves from stack build area 160 to stack discharge area 170, e.g., as shown in FIG. 27. The completed pallet 200 may be collected from discharge area 170 by way of forklift.

Returning to FIG. 26, each of platforms 150 and 152 move together inward and outward relative to frame 110 upon a pair of rails 155, e.g., as supported by rollers 157. A motor 420 (FIGS. 47 and 48) moves in unison platforms 150 and 152 between an inner position, e.g., as shown in FIG. 26, and an outer position, e.g., as shown in FIG. 27. With a full pallet 200, e.g., as shown in FIG. 26, activating motor 159 to move outward platforms 150 and 152 presents the full pallet 200 for discharge in discharge area 170 as well as positions platform 152 to receive an empty pallet from pallet cartridge 120.

Figure 28:
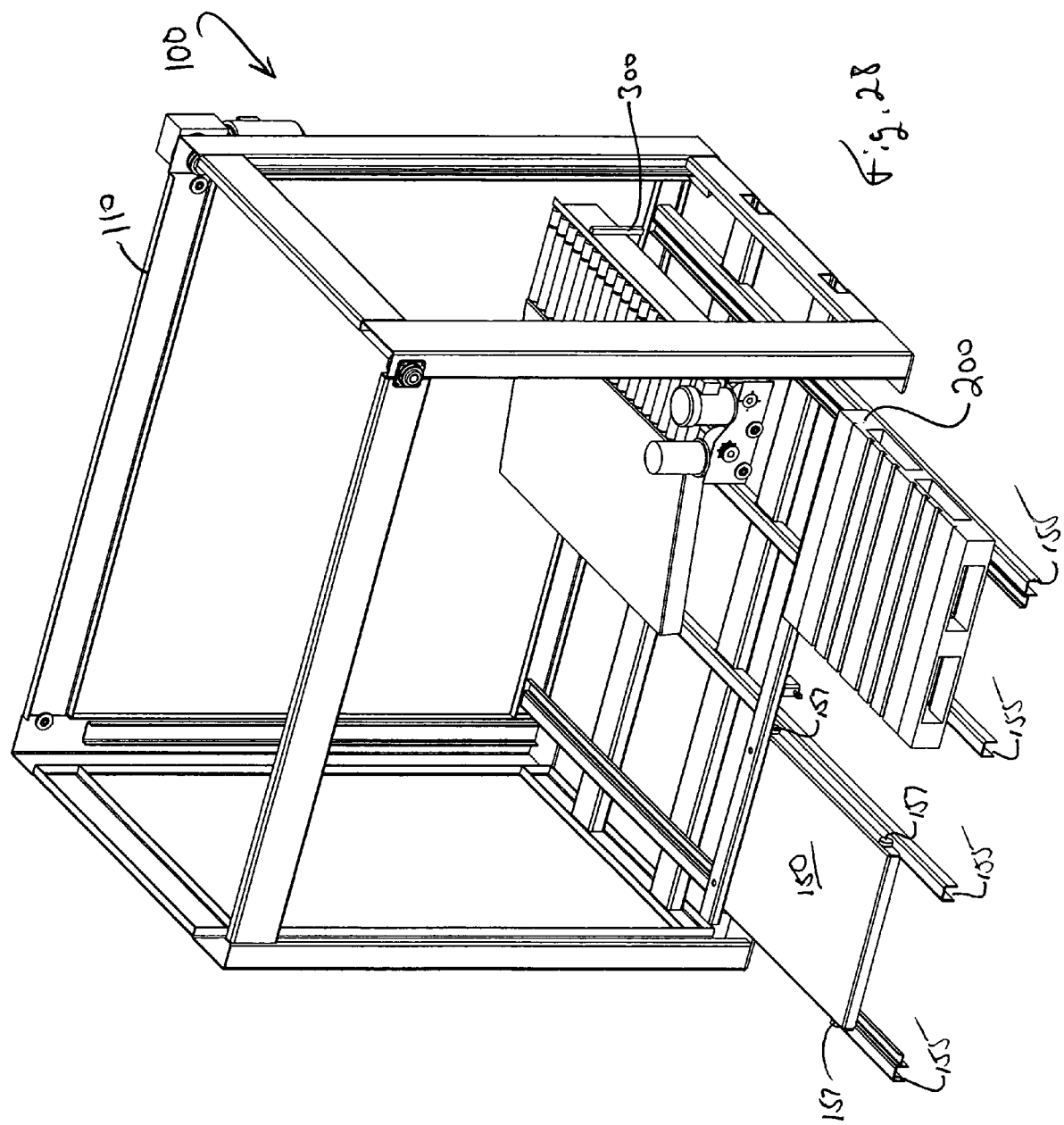
Figure 29:
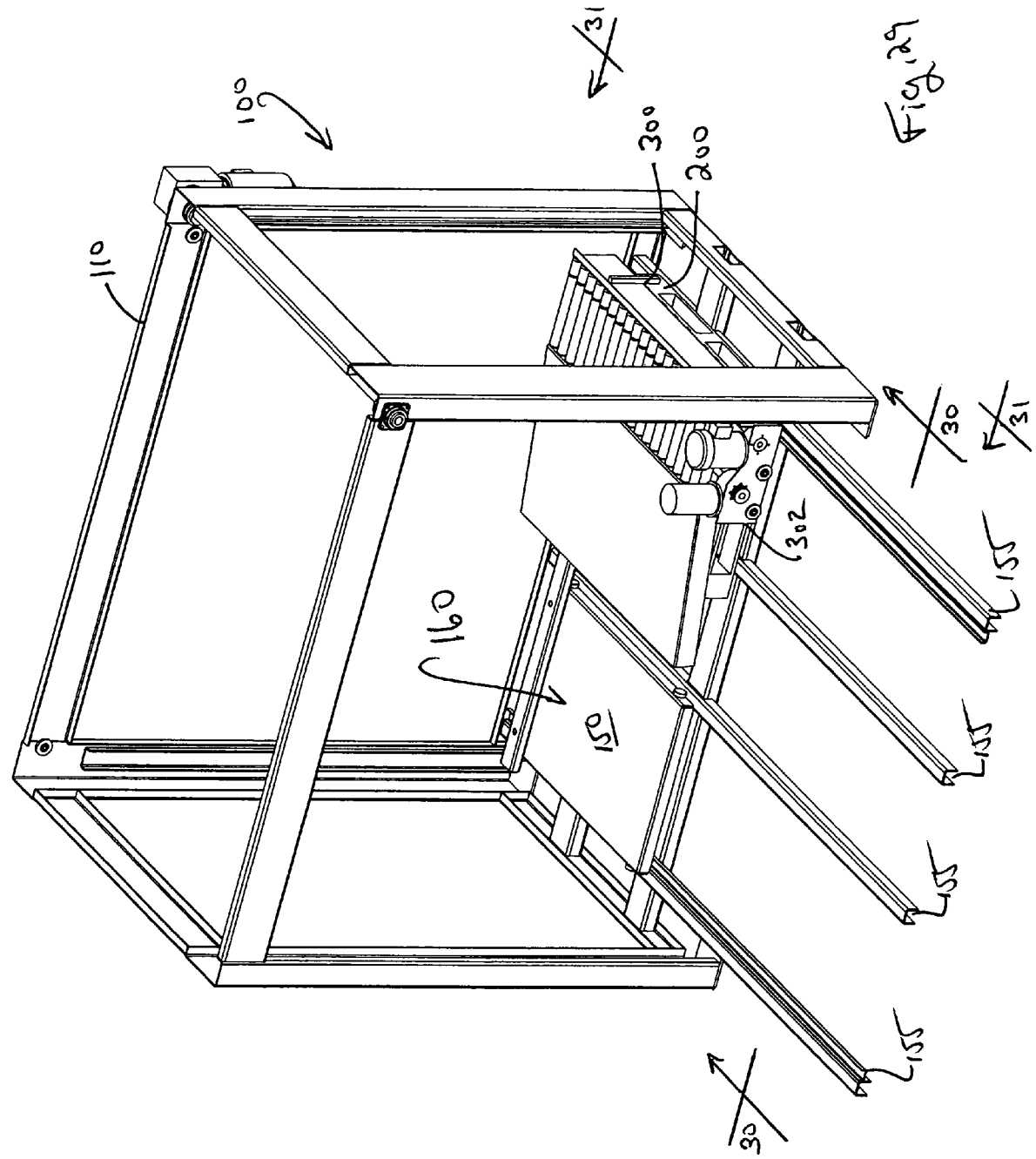
Figure 30:
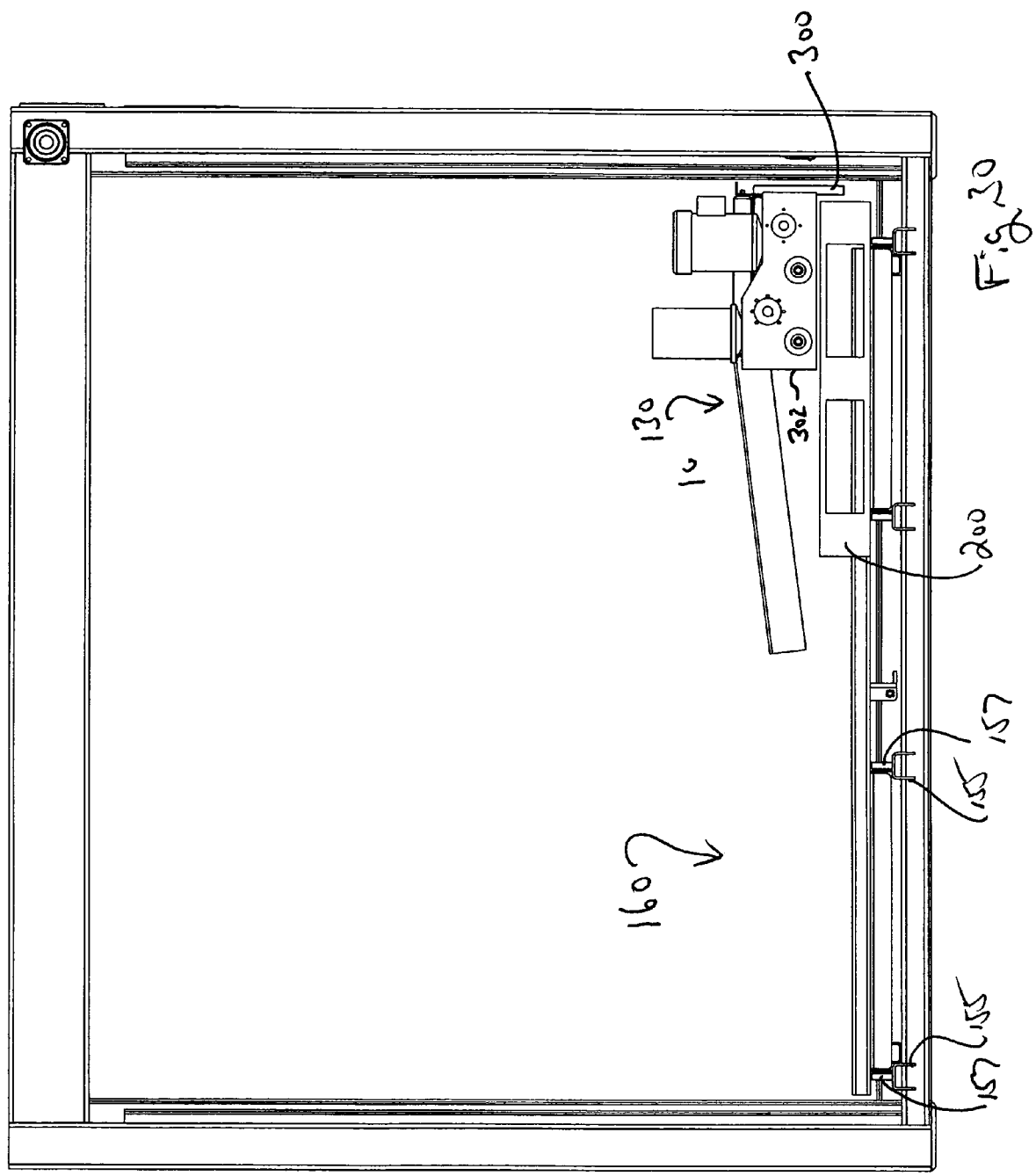
Figure 31:
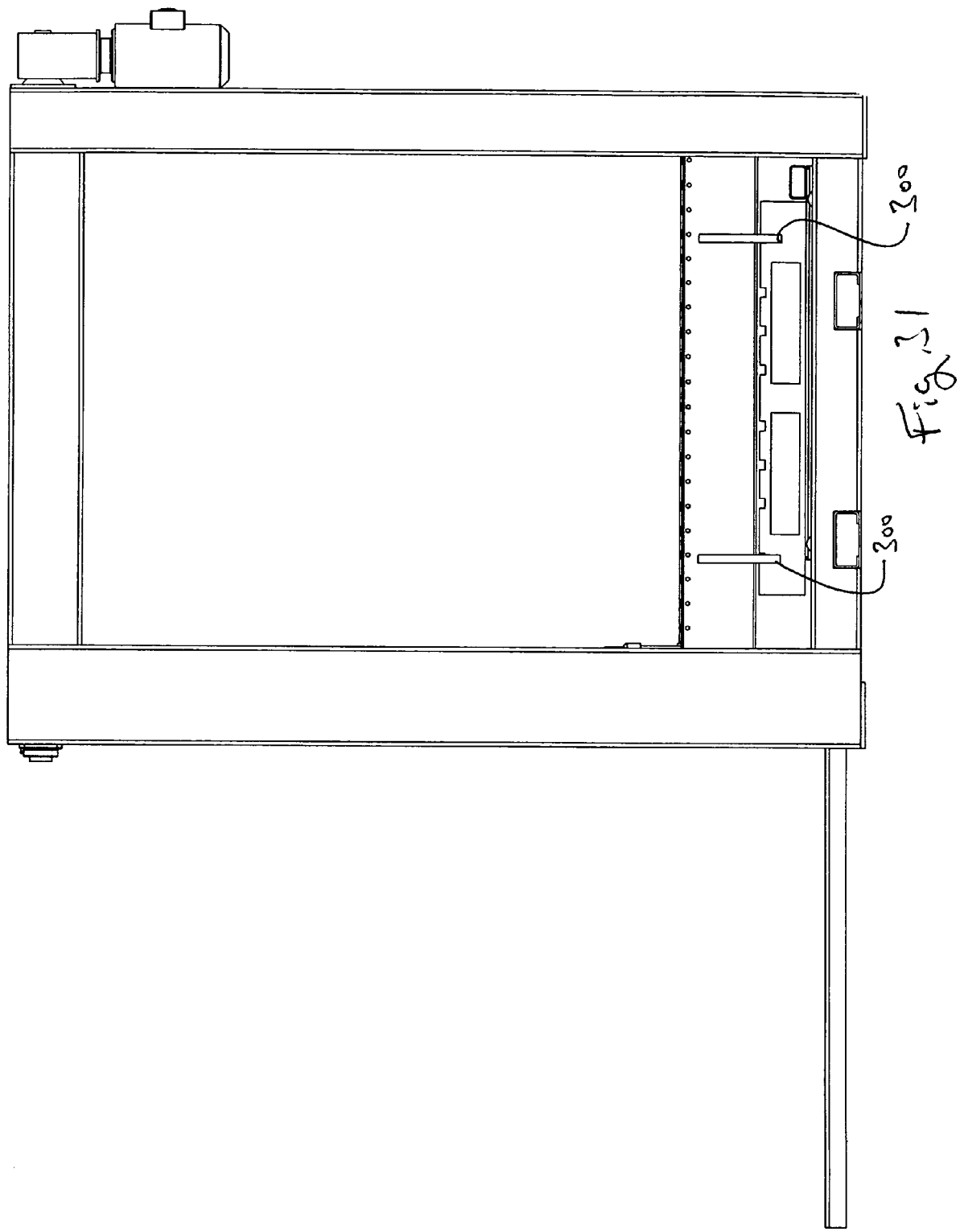

FIG. 28 illustrates palletizer 100 (absent illustration of empty pallet cartridge 120 for clarity) having just received from empty pallet cartridge 120 an empty pallet 200. A variety of pallet dispensing devices or cartridges and methods of operation thereof are well known in the art and capable of presenting an empty pallet 200 from the bottom of a stack of empty pallets 200. For simplicity in the present discussion, it will be understood that empty pallet cartridge 120 has placed a pallet 200 upon, or has made such available to, platform 152. Activation of motor 159 brings platforms 150 and 152 inward and within frame 110. In particular, and as shown in FIGS. 29-31, platform 152 brings the empty pallet 200 to a position under apron carriage 130. It may be noted that platform 150 is concurrently returned to stack build area 160.

Apron carriage 130 lowers toward the empty pallet 200 therebelow and a pair of dogs 300 extending downward from apron carriage 130 engage a trailing edge of empty pallet 200.

In FIG. 32, apron carriage 130 advances partially toward stack build area 160 and, with dogs 300 bearing against the trailing edge of empty pallet 200, empty pallet 200 advances partially toward stack build area 160.

In FIG. 33, apron carriage retracts sufficiently to bring a leading edge 302 thereof behind the trailing edge of empty pallet 200. Apron carriage 130 then lowers and advances slightly to engage the trailing edge of empty pallet 200 with its leading edge 302.

In FIG. 34, apron carriage 130 further advances to push the empty pallet 200 into the stack build area 160, specifically to place the empty pallet 200 onto platform 150.

Palletizer 100 is then ready to begin palletizing incoming items 190, i.e., reposition itself relative to infeed conveyor 180, begin layer building in layer building area 140, and stacking item 190 layers in stack build area 160.

FIGS. 35-39 illustrate a form of empty pallet dispenser 120, shown partially and designated by reference numeral 120' in FIGS. 35-39. Empty pallet dispenser 120' includes features squaring or registering an empty pallet 200 for proper alignment within palletizer 100. In other words, by properly squaring or registering an empty pallet 200, e.g., at stack build area 160, item 190 layers deposited thereon find alignment relative the supporting pallet 200. By squaring or registering an empty pallet 200 at transfer from dispenser 120' to platform 152, such alignment subsequently in stack build area 160 is improved as described hereafter.

A variety of empty pallet dispensers are know and include those capable of presenting an empty pallet 200 from the bottom of a stack of empty pallets 200 as described herein. For the present discussion, it will be understood that dispenser 120' isolates a pallet 200 from the bottom of a stack of pallets 200 by placement thereof upon a pair of support plates 340. In such presentation, the pallet 200 rests upon support plates 340 without encumbrance, e.g., can be pushed or slid along support plates 340 without interference, e.g., with interference from or contact with a pallet 200 in a stack of pallets 200 thereabove. As well know devices and methods useful for such pallet 200 presentation are known, FIGS. 35-39 illustrate empty pallet dispenser 120' partially, i.e., showing only vertical support bars 342 and support plates 340. As may be appreciated, vertical support bars 342 suitably position, e.g., lower, support plates 340 carrying an empty pallet 200 thereon. Unfortunately, many pallets 200 are skewed when presented by an empty pallet dispenser. In particular, not every empty pallet 200 rests squarely upon the support plates 340.

Figure 35:
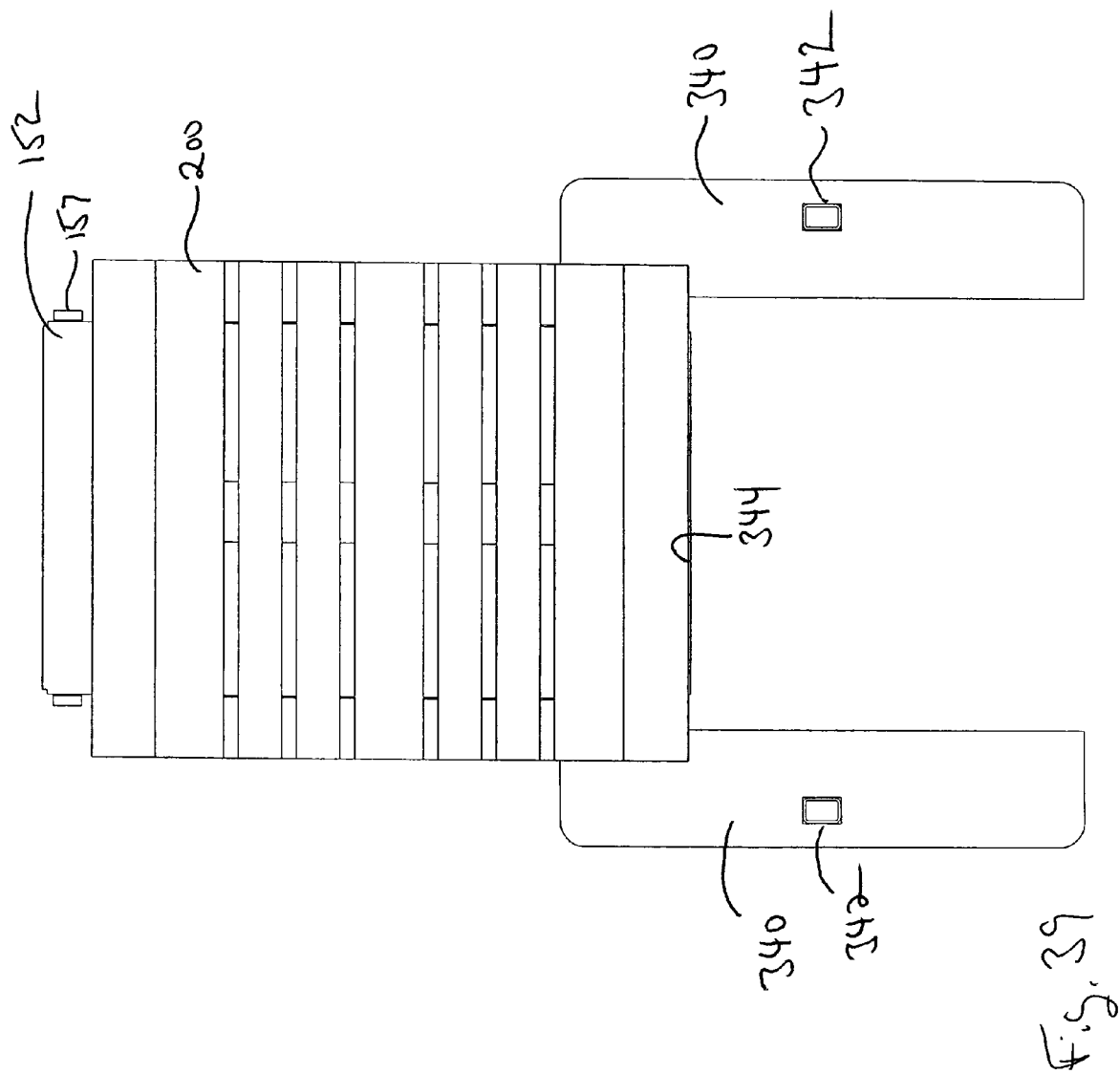

FIG. 35 illustrates an empty pallet 200 having been located upon support plates 340 but in a skewed orientation. With platform 152 located below empty pallet dispenser 120', support plates 340 hold empty pallet 200 just above the surface of platform 152. A trailing edge, e.g., most distant from frame 110, of platform 152 includes a stripping bar 344 extending above the surface of platform 152 and positioned behind the trailing edge of the empty pallet 200. As illustrated in FIG. 35, the empty pallet 200 presented for discharge is skewed relative to stripping bar 344.

Figure 38:
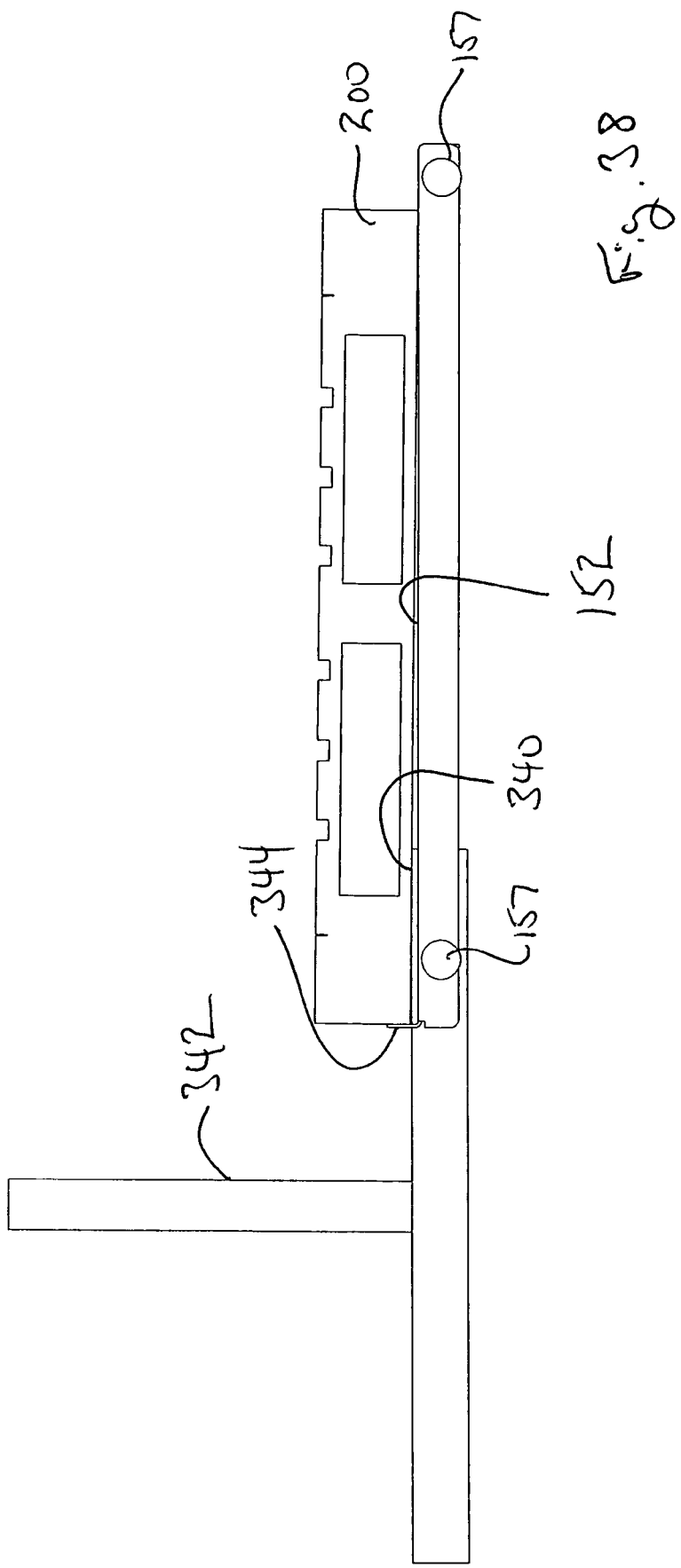

However, as platform 152 moves inward toward frame 110, as illustrated in FIGS. 36 and 37, stripping bar 344 engages the trailing edge of the empty pallet 200. Stripping bar 344 thereby initially squares the empty pallet 200, e.g., brings the trailing edge of pallet 200 in abutment with stripping bar 344. As platform 152 continues inward toward frame 110, as illustrated in FIGS. 38 and 39, pallet 200 remain squared, i.e., against stripping bar 344, and slides from support plates 340 onto platform 152. Eventually, as platform moves into frame 110, platform 152 fully supports pallet 200 in squared or registered orientation relative to frame 110.

As previously described, apron carriage 130 then moves the empty pallet 200 from platform 152 to platform 150 located in stack build area 160. The extent of travel in a given direction, e.g., travel inward upon platform 152 or travel onto platform 150 in stack build area 160, may be adjusted as a function of pallet 200 dimensions along that given direction and desired position relative to frame 110 along that given direction. Once well registered upon platform 152, an empty pallet 200 may be suitable positioned within stack build area 160 according to a desired registration within frame 110 by controlling travel distances for platform 152 and apron carriage 130 in ultimately positioning pallet 200 in stack build area 160.

Pallet dispenser 120' can handle pallets 200 of different widths and lengths or a fixed pallet 200 size. Because platform 152 presents the pallet 200 to apron carriage 130 with a pallet 200 edge in contact with the transport device, e.g., stripping bar 344, perpendicular to travel it is registered relative to its final position in stack build area 160 through control of the final stop position below apron carriage 130. Pallet 200 location relative to the right or left of the direction of travel caused by different width pallets being fed through, for example, a fixed oversized dispenser chute of the pallet dispenser 120', e.g., sized to handle the widest and longest pallet, is irrelevant because pallet travel positioning determines ultimate pallet 200 positioning or registration within stack build area 160. As such different width pallets and pallet position relative to the dispenser chute do not impact final pallet position. As may be appreciated, a control may be programmed to account for pallet 200 dimensions and thereby determine pallet 200 travel distances relative to frame 110. Thus, a combination of controlled pallet 200 travel distances, i.e., inward upon platform 150 and laterally as pushed by apron carriage 130, establish a well registered pallet 200 within stack build area 160 irrespective of pallet size.

In many palletizing applications a tie sheet placed between item 190 layers stabilizes the stack of item 190 layers. Tie sheets may be placed at the bottom of the stack of item 190 layers, between selected ones of item 190 layers, or between all item 190 layers. Preferably, tie sheet placement is automated and suitably interleaved with other palletizing operations to support overall productivity.

FIGS. 40-45 illustrate an automated tie sheet dispenser 360 which may be employed in conjunction with the palletizer 100 as described herein. Tie sheet dispenser 360 mounts to apron carriage 130 and, therefore, moves vertically in unison with layer build area 140 and puller bar 136. Tie sheet dispenser 360 includes a horizontal tie sheet bin 362 mounted in fixed relation to and just above puller bar 136, e.g., attaches to puller bar frame 244. As such, tie sheet bin 362 moves horizontally with puller bar 136. Tie sheet dispenser 360 further includes a motor 364 mounted to apron carriage 130, e.g., upon one of rails 244, and slide frame 366 slidably mounted upon rails 244. Operation of motor 364 moves slide rail between a retracted position and an advanced position. Slide frame 366 carries vertical positioner 368 and vertical positioner 368 caries a vacuum lift 370. Accordingly, vacuum lift 370 may be selectively vertically positioned relative to frame 366 and selectively horizontally positioned independent of layer build area 140 and puller bar 136.

FIG. 40 shows tie sheet dispenser 360 with slide frame 366 positioned over sheet bin 362, e.g., ready to pick a tie sheet 374 from bin 362. With independent horizontal positioning capability for both slide frame 366 and bin 362, tie sheet picking can occur at a selected and variety of horizontal locations. In FIG. 41, vacuum lift 370 has been lowered toward bin 362 and has engaged and partially lifted a tie sheet 374. In FIG. 42, slide frame 366 has moved over stack build area 160, taking with it vacuum lift 370 and the tie sheet 374 carried thereby. Moving apron carriage 130 vertically downward toward pallet 200, as shown in FIG. 43, allows placement of the tie sheet 374 upon the empty pallet 200. As may be appreciated, such vertical positioning of the tie sheet can include vertical movement of apron carriage 130 as well as operation of vertical positioner 368. Once suitably positioned, vacuum lift 370 releases tie sheet 374 for placement as shown in FIG. 44 and slide frame 366 and vacuum lift 370 withdraws.

FIG. 45 illustrates tie sheet 374 placement on the top of a stack of item 190 layers in stack build area 160. Thus, it will be understood that tie sheet dispenser may place tie sheets at the bottom of a stack of item 190 layers, between any two item 190 layers, or on the top of a stack of item 190 layers as desired and in coordinated fashion with item 190 layer stacking as described herein.

In general, prior tie sheet inserters have resided outside a palletizer footprint and have consequently required additional space and safety guarding. Such devices also have required separate vertical travel capability to place sheets at different levels of the load ranging from on top of the empty pallet to the top of the load. According to tie sheet dispenser 360, however, all components of tie sheet insertion are internal to the palletizer, i.e., within its footprint. Tie sheets 374 may be loaded into bin 362 at a convenient elevation and in a flat orientation. Tie sheet dispenser 360 enjoys independent vertical travel sufficient to reach an empty pallet and horizontal travel sufficient to park outside the "chimney" of an item 190 stack under construction. Tie dispenser 360 can reach the centerline of different sized item 190 stacks under construction. Normal vertical travel throughout the stack height is provided by the free travel obtained by attachment to apron conveyor 130. tie sheet dispenser 360 can travel from it's parked position, e.g., outside the stack or stack build area 160 vertical chimney, to a bin 362 stop position coincident with the row puller 136 when in its backstop position. This allows tie sheet dispenser 360 to retrieve a sheet 374 as the apron plate 134 is retracts and then travel only short distance to position a sheet at the current top of stack position as required for the stack under construction. After each item 190 is deposited, the tie sheet dispenser 360, having limited independent vertical travel, e.g., vacuum lift 370 relative to frame 366, can place a tie sheet 374 rapidly with minimal impact on overall throughput due to the common transport provided by apron carriage 130, e.g., providing coordinated motions and close proximity relationship available from the existing bin 362 movement and apron carriage 130 vertical travel. In other words, apron conveyor 130 provides advantageous vertical transport due to mounting all tie sheet dispenser 360 devices thereon and further provides a known relationship to the current stack height. Because tie sheet dispenser 360 parks outside the vertical space of the stack build area 160, picking and placing sheet 374 occurs with minimal travel in minimal time thereby reducing the chance for a tie sheet 374 to be dropped due to vacuum lift 370 failure.

FIG. 46 illustrates a form of layer compression wherein a pair of funnel walls 390 guide inward items 190 as an item 190 layer is transferred from layer build area 140 to stack build area 160. In FIG. 46, funnel walls 390 lay along the sides of apron plate 134, i.e., along the each side of apron plate 134 oriented perpendicular to puller bar 136. Funnel walls 390 lie closer to one another at the ends thereof closest to stack build area 160. As may be appreciated, funnel walls 390 are selectively positionable on apron plate 134 to accommodate item 190 layer building thereon. For example, each funnel wall couples to apron plate 134 at its end most distant from stack build area 160 by way of pivot pins 392. Slots 394 and set pins 396 at the other ends of funnel walls 390 allow selected relative positioning of funnel walls 390. Thus, funnel walls 390 are sufficiently separated at the ends thereof most distant from stack build area 160 so as to not interfere with item 190 layer building. Funnel walls 390 narrow toward stack build area 160, however, to bring together or compress an item 190 layer as relative movement of layer build area 140 and puller bar 136 force the item 190 layer across and off apron plate 134.

In the alternative, clamping mechanisms may be employed to condition, e.g., compact, an item 190 layer.

As described above, platform 150 may be used to present for discharge a full pallet 200 in discharge area 170, i.e., make available for collection by a forklift or. In many palletizing operations, however, it may be desirable to place a full pallet 200 in pallet discharge area 170 and return platform 150 to stack build area 160. As previously described, platforms 150 and 152 move in unison and by immediately returning platforms 150 and 152 to their inner positions, i.e., within frame 110, palletizing operations can continue without waiting for full pallet collection at pallet discharge area 170. In particular, moving platforms 150 and 152 inward following placement of a full pallet 200 at pallet discharge area allows platform 150 to transport the next empty pallet 200 to its position under apron carriage 130. Once apron carriage 130 builds the first item 190 layer, apron carriage 130 can concurrently move the next empty pallet 200 as well as the first item 190 layer to stack build area 160.

Figure 48:
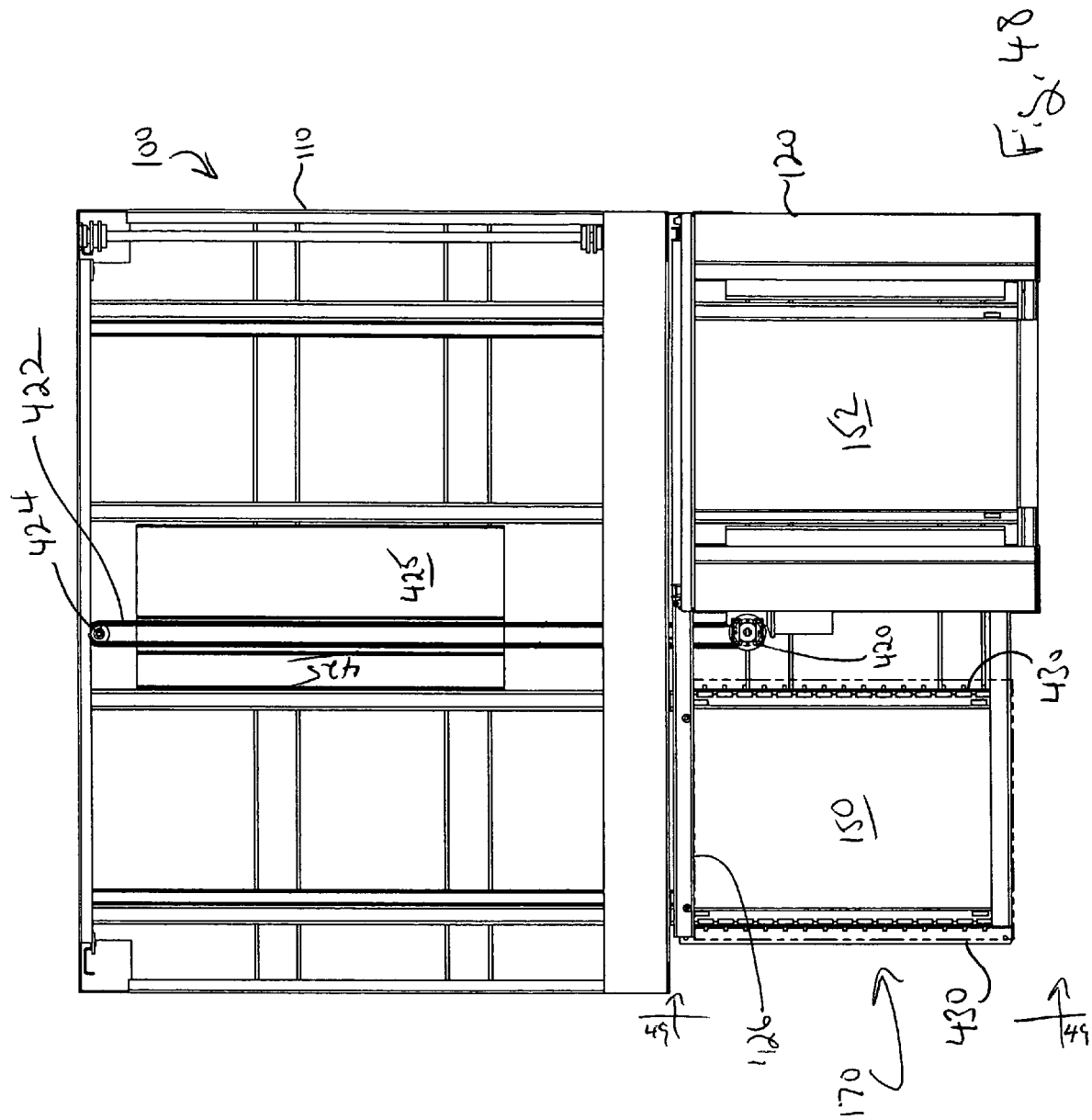

FIGS. 47 and 48 illustrate an alternative pallet discharge area 170' allowing platform 150 to deliver a full pallet 200 at discharge area 170 and immediately return to stack build area.

FIGS. 47 and 48 also illustrate details (omitted in previous drawings) for unified movement of platforms 150 and 152 between their inner and outer positions. While separate drive mechanisms could be used to move platforms 150 and 152, a common drive mechanism supports unified movement as previously described as well as simplified control and design. FIG. 47 shows platforms 150 and 152 in their inner positions, i.e., within frame 110 and with platform 150 located in stack build area 160 and platform 152 located below the location of apron carriage 130 when in its retracted position. FIG. 48 shows platforms 150 and 152 in their outer positions with platform 150 in position to discharge a full pallet 200 and platform 152 in position to accept an empty pallet 200 from pallet dispenser 120 (120').

A motor 420 drives chain 422 about an idler sprocket 424. A strongback bar 426 ties together platforms 150 and 152. Chain 422 couples to strongback bar 426 whereby operation of motor 420 in a first direction moves in unison platforms 150 and 152 toward frame 110 and operation in a second direction moves in unison platforms 150 and 152 away from frame 110. Also shown in FIGS. 47 and 48, skid plates 425 present angled upward-facing surfaces to facilitate movement for an empty pallet 200 into stack build area 160 as described above, i.e., as moved by apron carriage 130 from platform 152 to platform 150.

FIGS. 49 and 50 further illustrate the modified discharge area 170'. In FIGS. 47-50, discharge area 170' includes a pair of roller ramps 430 inclining upward in a direction moving away from frame 110. A lower portion of roller ramps 430, i.e., closest to frame 110, resides substantially at or slightly below the surface plane of platform 150 while the upper portion resides sufficiently above the plane of platform 150 to hold a pallet 200 above platform 150. Roller ramps 430 are located outside the path of platform 150 but within the width of a pallet 200 carried thereon. As platform 150, carrying a full pallet 200 thereon, enters the space between roller ramps 430 the leading edged of the pallet 200 rides up and onto the roller ramps 430. As platform 150 continues pallet 200 transfers onto roller ramps 430. Friction against the surface of platform 150 drives platform 200 onto roller ramps 430. As roller ramps 430 accept the weight of pallet 200, pallet 200 may roll back some distance as the force of friction against platform 150 subsides. Strongback bar 426 catches pallet 200 against further rollback (as shown in FIG. 49) and drives pallet 200 past a catch dog 428. Once so captured by catch dog 428, platform 150 is free to return to stack build area 160 (as shown in FIG. 50). In some applications, roller ramps 430 at slight incline may be sufficient to hold pallet 200 without need for catch dogs 428.

Thus, an improved palletizer has been shown and described. The inclusion of the apron conveyor 132 into the layer deliver apron, i.e., as part of the layer build area 140, allows for a smaller overall footprint. The width of the apron conveyor 132 is narrower than the corresponding dimension of a rectangular item 190 whereby turned items 190 overhang the roller surface of apron conveyor 132. In effect, this further merges item 190 conveyor functions with apron support functions, and thereby further supports an overall compact palletizer 100 footprint. The apron carriage 130 allows independent horizontal travel of the apron conveyor 132 and apron plate 134 as well as puller bar 136 and tie sheet vacuum lift 370 with common vertical travel thereof in support of coordinated actions therebetween between.

Puller bar 136 performs a variety of functions. It pulls formed item 190 rows off the apron conveyor 132 and onto apron plate 134. The pull distance can be varied depending on item 190 size. It can travel in unison with the layer build area 140 to act as a backstop when the apron plate 134 retracts to shear an item 190 layer the pallet stack. The backstop position can be controlled to register different sized layers relative to the pallet edge so that the layer edge is inline, inside the pallet edge or overhanging the pallet edge. Back stop positioning as above can be relative to different sized pallets. The sheet bin 362 can be moved with the puller bar 136 so that the bin 362 can be presented to the operator at an elevation for easy tie sheet 374 loading. The sheet bin 362 is presented to the vacuum lift 370 at the position the puller bar 136 stops when acting as a backstop, thereby minimizing the vacuum lift 370 horizontal travel requirement and providing a known tie sheet 374 pick position. Movement of the sheet bin 362 from an easy load position at the end of puller bar 136 travel, e.g., adjacent to the end of the machine, to the preferred tie sheet 374 picking position is a "free" movement due to the need for the puller bar 136 to travel to perform backstop function.

It will be appreciated that the present invention is not restricted to the particular embodiment that has been described and illustrated, and that variations may be made therein without departing from the scope of the invention as found in the appended claims and equivalents thereof.

What is claimed is:

1. An improved palletizer having a frame, the palletizer operable for stacking layer of items on a pallet having a pallet width, the items being received from an infeed conveyor having an infeed conveyor width, the improvement comprising:

a selectively vertically and horizontally positionable apron carriage including a plate apron and an apron conveyor collectively defining a compact layer build area, the compact layer build area further comprising the apron conveyor having an apron conveyor width that is substantially less than the infeed conveyor width, and a portion of the plate apron, the plate apron having a width substantially about the same width as the pallet width;

a stack build area located in relation to the apron carriage to allow positioning of the layer build area at least partially above the stack build area;

a puller bar moveably coupled to the apron carriage and adapted to be horizontally positionable relative to the compact layer build area whereby the puller bar is capable of independent horizontal reciprocation relative to the horizontal position of the apron carriage; and the apron carriage further comprising a tie sheet dispenser coupled to the carriage to be operable vertically in unison with the layer build area, the tie sheet dispenser further comprises a horizontal tie sheet bin mounted in fixed relation to and just above the puller bar and being operable to move horizontally with the puller bar, the tie sheet dispenser further comprises a motor mounted to a slide frame slideably mounted to the apron carriage operable for slideable movement from a retracted position and an advanced position, the slide frame further comprising a vertical positioner, and the tie sheet dispenser further comprises a vacuum lift carried by the vertical positioner wherein the vacuum lift is operable to be selectively vertically positioned relative to the carriage and horizontally positioned independent of the layer build area and puller bar.

2. The palletizer of claim 1 wherein:

the frame comprises vertical guides and a vertical drive motor coupled by way of drive shaft and interconnecting lift cables, the vertical drive motor operable in a first and second direction; and the apron carriage further comprises:

a pair of carriage support rails, each rail having a corresponding guide follower at each opposite end of the rail, the followers adapted to slideably engage the vertical guides, the carriage support rails further extending substantially to a length of the frame, the support rails further coupling to the lift cables whereby operation of the vertical drive motor in the first direction vertically lifts the carriage support rails and in the second direction to vertically lower the carriage support rails thereby selectively vertically position the apron carriage.

3. The palletizer of claim 1 wherein the carriage further comprises:

a puller bar motor operable to horizontally reciprocate the puller bar relative to the carriage.

4. The palletizer of claim 1 wherein the apron carriage further comprises:

a horizontal carriage apron motor operable to horizontally reciprocate the apron conveyor and plate apron in unison between a horizontally retracted position and a horizontally advanced position.

5. An improved palletizer having a frame, the palletizer operable for stacking layer of items on a pallet having a pallet width and the pallet being received by the palletizer from an empty pallet dispenser, and the items being received from an infeed conveyor having an infeed conveyor width, the improvement comprising:

a selectively vertically and horizontally positionable apron carriage including a plate apron and an apron conveyor collectively defining a compact layer build area, the compact layer build area further comprising the apron conveyor having an apron conveyor width that is substantially less than the infeed conveyor width, and a portion of the plate apron, the plate apron having a width substantially about the same width as the pallet width;

a puller bar moveably coupled to the apron carriage and adapted to be horizontally positionable relative to the compact layer build area whereby the puller bar is capable of independent horizontal reciprocation relative to the horizontal position of the apron carriage;

and wherein the apron carriage further comprises a leading edge extending vertically downward from a bottom surface of the carriage, the leading edge being operable to engage the pallet whereby the pallet is positioned from an empty pallet wait area adjacent to the pallet dispenser to a stack build area, and a tie sheet dispenser coupled to the carriage to be operable vertically in unison with the layer build area, the tie sheet dispenser further comprises a horizontal tie sheet bin mounted in fixed relation to and just above the puller bar and being operable to move horizontally with the puller bar, the tie sheet dispenser further comprises a motor mounted to a slide frame slideably mounted to the apron carriage operable for slideable movement from a retracted position and an advanced position, the slide frame further comprising a vertical positioner, and the tie sheet dispenser further comprises a vacuum lift carried by the vertical positioner wherein the vacuum lift is operable to be selectively vertically positioned relative to the carriage and horizontally positioned independent of the layer build area and puller bar.

6. The palletizer of claim 5 further comprising:

a pallet transfer motor operable in two directions, the pallet transfer motor further being operable to simultaneously advance the pallet to the empty pallet wait area and discharge a second pallet from the stack build area.

7. A method of stacking items in layers on a pallet using a compact palletizer, the method comprising:

providing an infeed conveyer having an infeed conveyer width;

providing a layer build area comprising an apron carriage having an apron conveyer, the apron conveyor having a width substantially less than the infeed conveyor width, the layer build area further comprising a portion of an apron plate having a plate width substantially the same as the infeed conveyor width;

receiving on the layer build area a series of the items row-by-row;

providing a puller bar mounted to the apron carriage, the puller bar operable to position horizontally on the layer build area the received row of items and positioning the row with the puller bar to form a stack layer;

positioning the stack layer over the pallet by horizontally and vertically moving the layer build area;

holding the stack layer over the pallet by using the puller bar;

retracting the apron conveyor and apron plate in unison thereby causing the stack layer to fall upon the pallet;

providing a tie sheet dispenser with a dispenser bin;

placing the tie sheet dispenser on top of the apron carriage whereby the dispenser bin moves in unison with the apron carriage; and providing a vacuum lift operable vertically and horizontally independent of the apron carriage.

8. The method of claim 7 further comprising:

extending the puller bar from a first position;

moving the puller bar in unison with the apron plate and apron conveyor;

holding the puller bar in fixed position relative to the pallet; and retracting the puller bar to the first position.

9. The method of claim 7 further comprising:

providing the apron carriage with a leading edge; and moving an empty pallet using the leading edge from a first position to a second, layer build position.

10. The method of claim 7 further comprising:

providing a single motor operable to simultaneously receive an empty pallet to a first position under the apron carriage and discharge a second pallet from a layer build position.

11. A method of stacking items in layers on a pallet using a compact palletizer, the method comprising:

providing an infeed conveyer having an infeed conveyer width;

providing a layer build area comprising an apron carriage having an apron conveyer, the apron conveyor having a width substantially less than the infeed conveyor width, the layer build area further comprising a portion of an apron plate having a plate width substantially the same as the infeed conveyor width;

receiving on the layer build area a series of the items row-by-row;

providing a puller bar mounted to the apron carriage, the puller bar operable to position horizontally on the layer build area the received row of items and positioning the row with the puller bar to form a stack layer;

positioning the stack layer over the pallet by horizontally and vertically moving the layer build area;

holding the stack layer over the pallet by using the puller bar;

retracting the apron conveyor and apron plate in unison thereby causing the stack layer to fall upon the pallet;

providing a tie sheet dispenser with a dispenser bin;

placing the tie sheet dispenser on top of the apron carriage whereby the dispenser bin moves in unison with the apron carriage;

providing a vacuum lift operable vertically and horizontally independent of the apron carriage;

providing a tie sheet in the dispenser bin;

extracting the tie sheet from the bin using the vacuum lift; and placing the tie sheet over the pallet.

12. The method of claim 11 further comprising:

releasing vacuum pressure from the vacuum lift thereby dropping the tie sheet.

13. An improved palletizer having a frame, the palletizer operable for stacking layer of items on a pallet having a pallet width, the items being received from an infeed conveyor having an infeed conveyor width, the improvement comprising:

a selectively vertically and horizontally positionable apron carriage including a plate apron and an apron conveyor collectively defining a compact layer build area, the compact layer build area further comprising the apron conveyor having an apron conveyor width that is defined by item width so that items when turned are reliably transported on the dynamic apron conveyor while overhanging the plate apron, a portion of the plate apron, the plate apron having a width substantially wider than as the pallet width;

a stack build area at a horizontally offset position in relation the layer build area, and a plane of the layer build area can be above or below the stack build area, a puller bar moveably coupled to the apron carriage and adapted to be horizontally positionable relative to the compact layer build area whereby the puller bar is capable of independent horizontal reciprocation relative to the horizontal position of the apron carriage; and the apron carriage further comprising a tie sheet dispenser coupled to the carriage to be operable vertically in unison with the layer build area, the tie sheet dispenser further comprises a horizontal tie sheet bin mounted in fixed relation to and just above the puller bar and being operable to move horizontally with the puller bar, the tie sheet dispenser further comprises a motor mounted to a slide frame slideably mounted to the apron carriage operable for slideable movement from a retracted position and an advanced position, the slide frame further comprising a vertical positioner, and the tie sheet dispenser further comprises a vacuum lift carried by the vertical positioner wherein the vacuum lift is operable to be selectively vertically positioned relative to the carriage and horizontally positioned independent of the layer build area and puller bar.

14. The palletizer of claim 13 further comprising:

a pallet transfer motor operable in two directions, the pallet transfer motor further being operable to advance the pallet to an empty pallet wait area and discharge a second pallet from the stack build area.

15. A method of stacking items in layers on a pallet using a compact palletizer, the method comprising:

providing an infeed conveyer having an infeed conveyer width;

providing a layer build area comprising an apron carriage having an apron conveyer, the apron conveyor having a width substantially less than the infeed conveyor width, the layer build area further comprising a portion of an apron plate having a plate width substantially the same as the infeed conveyor width;

receiving on the layer build area a series of the items row-by-row;

providing a puller bar mounted to the apron carriage, the puller bar operable to position horizontally on the layer build area the received row of items and positioning the row with the puller bar to form a stack layer;

positioning the stack layer over the pallet by horizontally and vertically moving the layer build area;

holding the stack layer over the pallet by using the puller bar;

retracting the apron conveyor and apron plate;

providing a tie sheet dispenser with a dispenser bin;

coupling the tie sheet dispenser to the apron carriage above the layer build area and moving the tie sheet dispenser in unison with the apron carriage; and providing a vacuum lift operable vertically and horizontally independent of the apron carriage.

* * * * *